(12) United States Patent
Sekiguchi et al.

(10) Patent No.: US 9,967,527 B2
(45) Date of Patent: May 8, 2018

(54) IMAGING DEVICE, IMAGE PROCESSING DEVICE, IMAGE PROCESSING METHOD, AND IMAGE PROCESSING PROGRAM

(71) Applicant: JVC KENWOOD Corporation, Yokohama-shi, Kanagawa (JP)

(72) Inventors: Satoru Sekiguchi, Yokohama (JP); Takayoshi Sasao, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 534 days.

(21) Appl. No.: 14/580,606

(22) Filed: Dec. 23, 2014

(65) Prior Publication Data

US 2015/0244995 A1 Aug. 27, 2015
US 2015/0358592 A9 Dec. 10, 2015

(30) Foreign Application Priority Data

Nov. 25, 2013 (JP) .................................. 2013-242542
Nov. 25, 2013 (JP) .................................. 2013-242544
(Continued)

(51) Int. Cl.
*H04N 9/04* (2006.01)
*H04N 5/33* (2006.01)
(Continued)

(52) U.S. Cl.
CPC ............. *H04N 9/045* (2013.01); *H04N 5/243* (2013.01); *H04N 5/265* (2013.01); *H04N 5/33* (2013.01); *H04N 9/04* (2013.01)

(58) Field of Classification Search
CPC .................................. H04N 5/33; H04N 5/265
See application file for complete search history.

(56) References Cited

U.S. PATENT DOCUMENTS

2009/0295906 A1* 12/2009 Kushimoto .......... B60Q 1/0023
348/36
2011/0181752 A1* 7/2011 Nakashima ............ H04N 9/045
348/223.1

FOREIGN PATENT DOCUMENTS

JP H4-7991 A 1/1992
JP 2004-120331 A 4/2004
(Continued)

OTHER PUBLICATIONS

Machine English translation for JP-04007991.*
Office Action dated Jul. 20, 2017 issued in corresponding Japanese Application No. 2014-078752.

*Primary Examiner* — Zhubing Ren
(74) *Attorney, Agent, or Firm* — Nath, Goldberg & Meyer; Jerald L. Meyer

(57) ABSTRACT

An imaging unit includes a color filter in which filter elements of R, G and B are arranged in a plane thereof. The imaging unit captures an object in a state where infrared light with three frequencies assigned to R, G and B are projected so as to generate first to third frames. A synthesizing unit in a pre-signal processing unit arranges pixel data for the three primary colors including pixel data for R in the first frame, pixel data for G in the second frame and pixel data for B in the third frame in such a manner as to have the same array as the filter elements in the color filter, so as to generate synthesized image signals synthesized in one frame. A demosaicing unit subjects the frame of the synthesized image signals to demosaicing so as to generate frames of the three primary colors.

7 Claims, 37 Drawing Sheets

(30) Foreign Application Priority Data

| | | |
|---|---|---|
| Jan. 24, 2014 | (JP) | 2014-011199 |
| Jan. 24, 2014 | (JP) | 2014-011200 |
| Apr. 7, 2014 | (JP) | 2014-078745 |
| Apr. 7, 2014 | (JP) | 2014-078748 |

(51) Int. Cl.
*H04N 5/265* (2006.01)
*H04N 5/243* (2006.01)

(56) References Cited

FOREIGN PATENT DOCUMENTS

| JP | 2010-98358 A | 4/2010 |
|---|---|---|
| JP | 2011-050049 A | 3/2011 |
| JP | 2012-195677 A | 10/2012 |

\* cited by examiner

| R | Gr | R | Gr | R | Gr | R | Gr |
|---|---|---|---|---|---|---|---|
| Gb | B | Gb | B | Gb | B | Gb | B |
| R | Gr | R | Gr | R | Gr | R | Gr |
| Gb | B | Gb | B | Gb | B | Gb | B |
| R | Gr | R | Gr | R | Gr | R | Gr |
| Gb | B | Gb | B | Gb | B | Gb | B |

32

FIG. 13
(a)
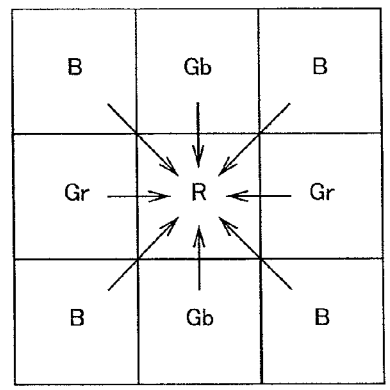
(b)
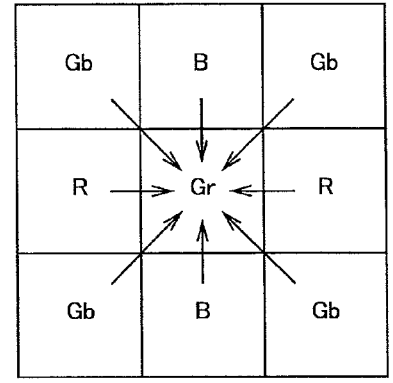
(c)
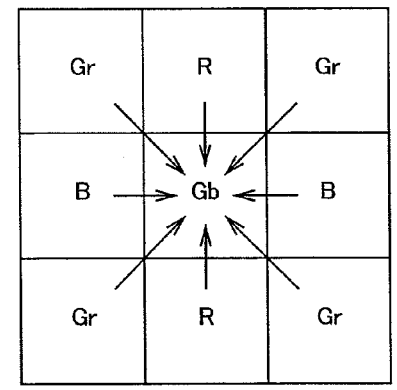
(d)
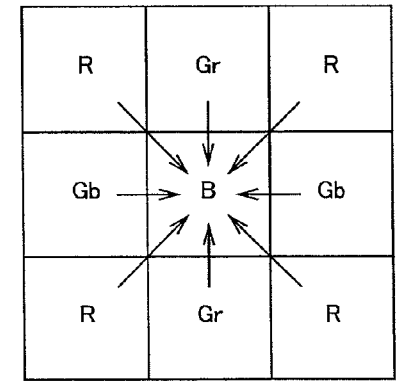

| B 100 | Gr 87 | B 100 |
| Gb 87 | R 100 | Gb 87 |
| B 100 | Gr 87 | B 100 |

Gr:IR2

| Gb 50 | B 70 | Gb 50 |
| R 70 | Gr 100 | R 70 |
| Gb 50 | B 70 | Gb 50 |

Gb:IR2

| Gr 50 | R 70 | Gr 50 |
| B 70 | Gb 100 | B 70 |
| Gr 50 | R 70 | Gr 50 |

B:IR3

| R 50 | Gr 70 | R 50 |
| Gb 70 | B 100 | Gb 70 |
| R 50 | Gr 70 | R 50 |

| B 100 | Gr 87 | B 100 |
| --- | --- | --- |
| Gb 87 | R 100 | Gb 87 |
| B 100 | Gr 87 | B 100 |

Gr:IR2

| Gb 50 | R 70 | Gb 50 |
| --- | --- | --- |
| B 70 | Gr 100 | B 70 |
| Gb 50 | R 70 | Gb 50 |

Gb:IR2

| Gr 50 | B 70 | Gr 50 |
| --- | --- | --- |
| R 70 | Gb 100 | R 70 |
| Gr 50 | B 70 | Gr 50 |

B:IR3

| R 50 | Gb 73 | R 50 |
| --- | --- | --- |
| Gr 73 | B 100 | Gr 73 |
| R 50 | Gb 73 | R 50 |

| B 0 | Gr 62 | B 0 |
|---|---|---|
| Gb 62 | R 100 | Gb 62 |
| B 0 | Gr 62 | B 0 |

Gr:IR2

| Gb 0 | R 50 | Gb 0 |
|---|---|---|
| B 50 | Gr 100 | B 50 |
| Gb 0 | R 50 | Gb 0 |

Gb:IR2

| Gr 0 | B 50 | Gr 0 |
|---|---|---|
| R 50 | Gb 100 | R 50 |
| Gr 0 | B 50 | Gr 0 |

B:IR3

| R 0 | Gb 50 | R 0 |
|---|---|---|
| Gr 50 | B 100 | Gr 50 |
| R 0 | Gb 50 | R 0 |

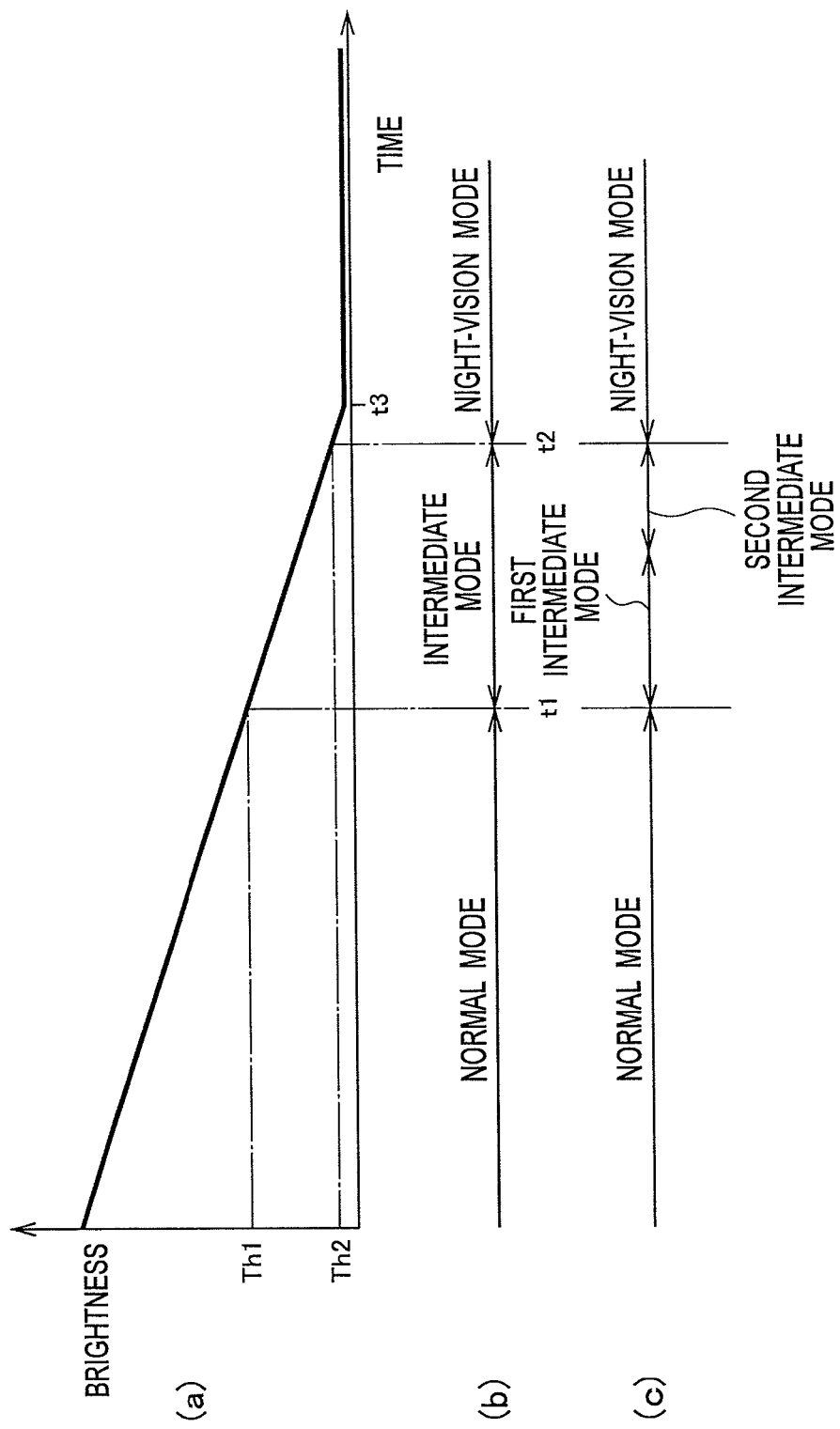

FIG. 23

| | INFRARED PROJECTOR 9 | PRE-SIGNAL PROCESSING UNIT 52 | | | DEMOSAICING UNIT 54 |
| --- | --- | --- | --- | --- | --- |
| | | SURROUNDING PIXEL ADDING UNIT 521 | SAME-POSITION PIXEL ADDING UNIT 522 | SYNTHESIZING UNIT 523 | |
| NORMAL MODE | OFF | INACTIVATED | INACTIVATED | INACTIVATED | ACTIVATED |
| FIRST INTERMEDIATE MODE | ON | INACTIVATED | ACTIVATED | ACTIVATED | |
| SECOND INTERMEDIATE MODE | ON | INACTIVATED | INACTIVATED | ACTIVATED | |
| FIRST NIGHT-VISION MODE | ON | ACTIVATED | ACTIVATED | ACTIVATED | |
| SECOND NIGHT-VISION MODE | ON | ACTIVATED | INACTIVATED | ACTIVATED | |

IMAGING DEVICE, IMAGE PROCESSING DEVICE, IMAGE PROCESSING METHOD, AND IMAGE PROCESSING PROGRAM

CROSS REFERENCE TO RELATED APPLICATION

This application is based upon and claims the benefit of priority under 35U.S.C. § 119 from Japanese Patent Applications No. P2013-242542, filed on Nov. 25, 2013, No. P2013-242544, filed on Nov. 25, 2013, No. 2014-011199, filed on Jan. 24, 2014, No. 2014-011200, filed on Jan. 24, 2014, No. 2014-078745, filed on Apr. 7, 2014, and No. 2014-078748, filed on Apr. 7, 2014, the entire contents of all of which are incorporated herein by reference.

BACKGROUND

The present disclosure relates to an imaging device, an image processing device, an image processing method, and an image processing program.

There is known a method for imaging an object under the condition that almost no visible light is available, such as during nighttime, by radiating infrared light onto the object from an infrared projector and imaging infrared light reflected by the object. This imaging method is effective in a case where lighting fixtures for radiating visible light cannot be used.

However, since an image obtained by imaging the object by this method is a monochromatic image, it is difficult to identify the object from the monochromatic image depending on circumstances. If a color image can be captured even under the condition that no visible light is available, the performance of identifying the object can be improved. For example, it is expected that surveillance cameras can capture color images under the condition that no visible light is available in order to improve performance for identifying objects.

Japanese Unexamined Patent Application Publication No. 2011-050049 (Patent Document 1) describes an imaging device capable of capturing color images under the condition that no visible light is available. The imaging device described in Patent Document 1 uses an infrared projector. Incorporating the technique described in Patent Document 1 into a surveillance camera can capture a color image of an object so as to improve the identification of the object.

SUMMARY

For example, visible light is slightly present in outdoor locations during the twilight time before sunrise or after sunset or in indoor locations where illumination is significantly weak. However, since the slightly-present visible light is not sufficient to capture color images, objects to be imaged are required to be irradiated with infrared light for night-vision imaging, as described above.

When infrared light for night-vision imaging is irradiated in a state where visible light is present, the visible light and the infrared light coexist. Patent Document 1 describes the imaging device on the assumption that imaging is carried out under the condition that no visible light is present. Thus, Patent Document 1 has a problem that fine color images may not be obtained under the condition that the visible light and the infrared light for night-vision imaging coexist.

An object of the embodiments is to provide an imaging device capable of capturing a fine color image even when visible light and infrared light for night-vision imaging coexist, and an image processing device, an image processing method, and an image processing program capable of generating color image signals based on a captured image even when visible light and infrared light for night-vision imaging coexist.

A first aspect of the embodiments provides an imaging device including: an imaging unit including a color filter in which filter elements of three primary colors of red, green and blue are arranged with a predetermined array in a plane thereof, the imaging unit being configured to generate a first frame of an image signal by capturing an object in a state where a first infrared light having a first wavelength assigned to the red is projected, generate a second frame of an image signal by capturing the object in a state where a second infrared light having a second wavelength assigned to the green is projected and generate a third frame of an image signal by capturing the object in a state where a third infrared light having a third wavelength assigned to the blue is projected; a same-position pixel adding unit configured to add pixel data for the red located at common pixel positions in the respective first to third frames to each other, add pixel data for the green located at common pixel positions in the respective first to third frames to each other and add pixel data for the blue located at common pixel positions in the respective first to third frames to each other so as to generate first added pixel data for the red, second added pixel data for the green and third added pixel data for the blue; a synthesizing unit configured to arrange pixel data for the three primary colors including the first added pixel data, the second added pixel data and the third added pixel data generated by the same-position pixel adding unit in such a manner as to have an array identical to the array of the filter elements in the color filter so as to generate a synthesized image signal synthesized in one frame; and a demosaicing unit configured to execute, based on the frame of the synthesized image signal generated by the synthesizing unit, demosaicing for generating a frame of the red in such a manner as to interpolate pixel data for the red in a pixel position where the pixel data for the red is not present, generating a frame of the green in such a manner as to interpolate pixel data for the green in a pixel position where the pixel data for the green is not present and generating a frame of the blue in such a manner as to interpolate pixel data for the blue in a pixel position where the pixel data for the blue is not present, so as to generate frames of the three primary colors.

A second aspect of the embodiments provides an image signal processing method including: by an imaging unit including a color filter in which filter elements of three primary colors of red, green and blue are arranged with a predetermined array in a plane thereof, generating a first frame of an image signal by capturing an object in a state where a first infrared light having a first wavelength assigned to the red is projected; generating, by the imaging unit, a second frame of an image signal by capturing the object in a state where a second infrared light having a second wavelength assigned to the green is projected; generating, by the imaging unit, a third frame of an image signal by capturing the object in a state where a third infrared light having a third wavelength assigned to the blue is projected; adding pixel data for the red located at common pixel positions in the respective first to third frames to each other, adding pixel data for the green located at common pixel positions in the respective first to third frames to each other and adding pixel data for the blue located at common pixel positions in the respective first to third frames to each other so as to generate first added pixel data for the red, second added pixel data for the green and third added pixel data for the blue; arranging pixel data for the three primary colors including the first added pixel data, the second added pixel data and the third added pixel data in such a manner as to have an array identical to the array of the filter elements in the color filter so as to generate a synthesized image signal synthesized in one frame; and executing, based on the frame of the synthesized image signal, demosaicing for generating a frame of the red in such a manner as to interpolate pixel data for the red in a pixel position where the pixel data for the red is not present, generating a frame of the green in such a manner as to interpolate pixel data for the green in a pixel position where the pixel data for the green is not present and generating a frame of the blue in such a manner as to interpolate pixel data for the blue in a pixel position where the pixel data for the blue is not present, so as to generate frames of the three primary colors.

A third aspect of the embodiments provides an image signal processing program recorded in a non-transitory storage medium including instructions executable by a computer to implement the steps of: obtaining pixel data composing a first frame of an image signal generated, by an imaging unit including a color filter in which filter elements of three primary colors of red, green and blue are arranged with a predetermined array in a plane thereof, by capturing an object in a state where a first infrared light having a first wavelength assigned to the red is projected; obtaining pixel data composing a second frame of an image signal generated by capturing the object by the imaging unit in a state where a second infrared light having a second wavelength assigned to the green is projected; obtaining pixel data composing a third frame of an image signal generated by capturing the object by the imaging unit in a state where a third infrared light having a third wavelength assigned to the blue is projected; adding pixel data for the red located at common pixel positions in the respective first to third frames to each other, adding pixel data for the green located at common pixel positions in the respective first to third frames to each other and adding pixel data for the blue located at common pixel positions in the respective first to third frames to each other so as to generate first added pixel data for the red, second added pixel data for the green and third added pixel data for the blue; arranging pixel data for the three primary colors including the first added pixel data, the second added pixel data and the third added pixel data in such a manner as to have an array identical to the array of the filter elements in the color filter so as to generate a synthesized image signal synthesized in one frame; and executing, based on the frame of the synthesized image signal, demosaicing for generating a frame of the red in such a manner as to interpolate pixel data for the red in a pixel position where the pixel data for the red is not present, generating a frame of the green in such a manner as to interpolate pixel data for the green in a pixel position where the pixel data for the green is not present and generating a frame of the blue in such a manner as to interpolate pixel data for the blue in a pixel position where the pixel data for the blue is not present, so as to generate frames of the three primary colors.

A fourth aspect of the embodiments provides an image processing device including: a means of generating pixel data for a predetermined color in an intermediate mode implemented based on pixel data obtained from a predetermined region in a light receiving element when an object is captured in a state where infrared light is projected; and a means of generating the pixel data for the predetermined color in a night-vision mode implemented based on pixel data obtained from a wider region than the predetermined region in the light receiving element when the object is captured in the state where the infrared light is projected, wherein the intermediate mode is configured to generate pixel data for red based on pixel data obtained from a first region in the light receiving element when the object is captured in a state where a first infrared light is projected, pixel data obtained from the first region in the light receiving element when the object is captured in a state where a second infrared light is projected and pixel data obtained from the first region in the light receiving element when the object is captured in a state where a third infrared light is projected, generate pixel data for green based on pixel data obtained from a second region in the light receiving element when the object is captured in the state where the first infrared light is projected, pixel data obtained from the second region in the light receiving element when the object is captured in the state where the second infrared light is projected and pixel data obtained from the second region in the light receiving element when the object is captured in the state where the third infrared light is projected, and generate pixel data for blue based on pixel data obtained from a third region in the light receiving element when the object is captured in the state where the first infrared light is projected, pixel data obtained from the third region in the light receiving element when the object is captured in the state where the second infrared light is projected and pixel data obtained from the third region in the light receiving element when the object is captured in the state where the third infrared light is projected.

A fifth aspect of the embodiments provides an imaging device including: an imaging unit configured to capture an object; and the aforementioned image processing device configured to process an image signal based on an imaging signal output from the imaging unit.

A sixth aspect of the embodiments provides an image processing method including the steps of: generating pixel data for a predetermined color in an intermediate mode implemented based on pixel data obtained from a predetermined region in a light receiving element when an object is captured in a state where infrared light is projected; and generating the pixel data for the predetermined color in a night-vision mode implemented based on pixel data obtained from a wider region than the predetermined region in the light receiving element when the object is captured in the state where the infrared light is projected, wherein the intermediate mode is configured to generate pixel data for red based on pixel data obtained from a first region in the light receiving element when the object is captured in a state where a first infrared light is projected, pixel data obtained from the first region in the light receiving element when the object is captured in a state where a second infrared light is projected and pixel data obtained from the first region in the light receiving element when the object is captured in a state where a third infrared light is projected, generate pixel data for green based on pixel data obtained from a second region in the light receiving element when the object is captured in the state where the first infrared light is projected, pixel data obtained from the second region in the light receiving element when the object is captured in the state where the second infrared light is projected and pixel data obtained from the second region in the light receiving element when the object is captured in the state where the third infrared light is projected, and generate pixel data for blue based on pixel data obtained from a third region in the light receiving element when the object is captured in the state where the first infrared light is projected, pixel data obtained from the third region in the light receiving element when the object is captured in the state where the captured in the state where the second infrared light is projected and pixel data obtained from the third region in the light receiving element when the object is captured in the state where the third infrared light is projected.

A seventh aspect of the embodiments provides an image processing program recorded in a non-transitory storage medium implementing functions executable by a computer serving as an image processing means, the functions including: a first function to generate pixel data for a predetermined color in an intermediate mode implemented based on pixel data obtained from a predetermined region in a light receiving element when an object is captured in a state where infrared light is projected; and a second function to generate the pixel data for the predetermined color in a night-vision mode implemented based on pixel data obtained from a wider region than the predetermined region in the light receiving element when the object is captured in the state where the infrared light is projected, wherein the first function implemented in the intermediate mode is configured to generate pixel data for red based on pixel data obtained from a first region in the light receiving element when the object is captured in a state where a first infrared light is projected, pixel data obtained from the first region in the light receiving element when the object is captured in a state where a second infrared light is projected and pixel data obtained from the first region in the light receiving element when the object is captured in a state where a third infrared light is projected, generate pixel data for green based on pixel data obtained from a second region in the light receiving element when the object is captured in the state where the first infrared light is projected, pixel data obtained from the second region in the light receiving element when the object is captured in the state where the second infrared light is projected and pixel data obtained from the second region in the light receiving element when the object is captured in the state where the third infrared light is projected, and generate pixel data for blue based on pixel data obtained from a third region in the light receiving element when the object is captured in the state where the first infrared light is projected, pixel data obtained from the third region in the light receiving element when the object is captured in the state where the second infrared light is projected and pixel data obtained from the third region in the light receiving element when the object is captured in the state where the third infrared light is projected.

BRIEF DESCRIPTION OF THE DRAWINGS

FIG. 13 is a view for explaining processing of adding surrounding pixels when the imaging device of the embodiment is operating in the night-vision mode.

FIG. 14 is a view showing a first weighting example of the processing of adding the surrounding pixels.

FIG. 15 is a view showing a second weighting example of the processing of adding the surrounding pixels.

FIG. 16 is a view showing a third weighting example of the processing of adding the surrounding pixels.

FIG. 22 is a view for explaining an example of a mode switch in the imaging device of the embodiment.

FIG. 23 is a view showing conditions of the respective members when the imaging device of the embodiment is set to the respective modes.

DETAILED DESCRIPTION

Hereinafter, an imaging device, an image processing device, an image processing method, and an image processing program according to at least one embodiment will be explained with reference to appended drawings.

<Configuration of Imaging Device>

First, the entire configuration of the imaging device of the embodiment is explained below with reference to FIG. 1. The imaging device of the embodiment shown in FIG. 1 is capable of capturing images in three modes including a normal mode suitable for imaging in a state where sufficient visible light is present such as during the day, a night-vision mode suitable for imaging in a state where almost no visible light is present such as at night, and an intermediate mode suitable for imaging in a state where visible light is slightly present.

The intermediate mode is a first infrared light radiating mode for imaging while radiating infrared under the condition that the amount of visible light is small. The night-vision mode is a second infrared light radiating mode for imaging while radiating infrared under the condition that the amount of visible light is smaller (almost no visible light is present).

Figure 1:
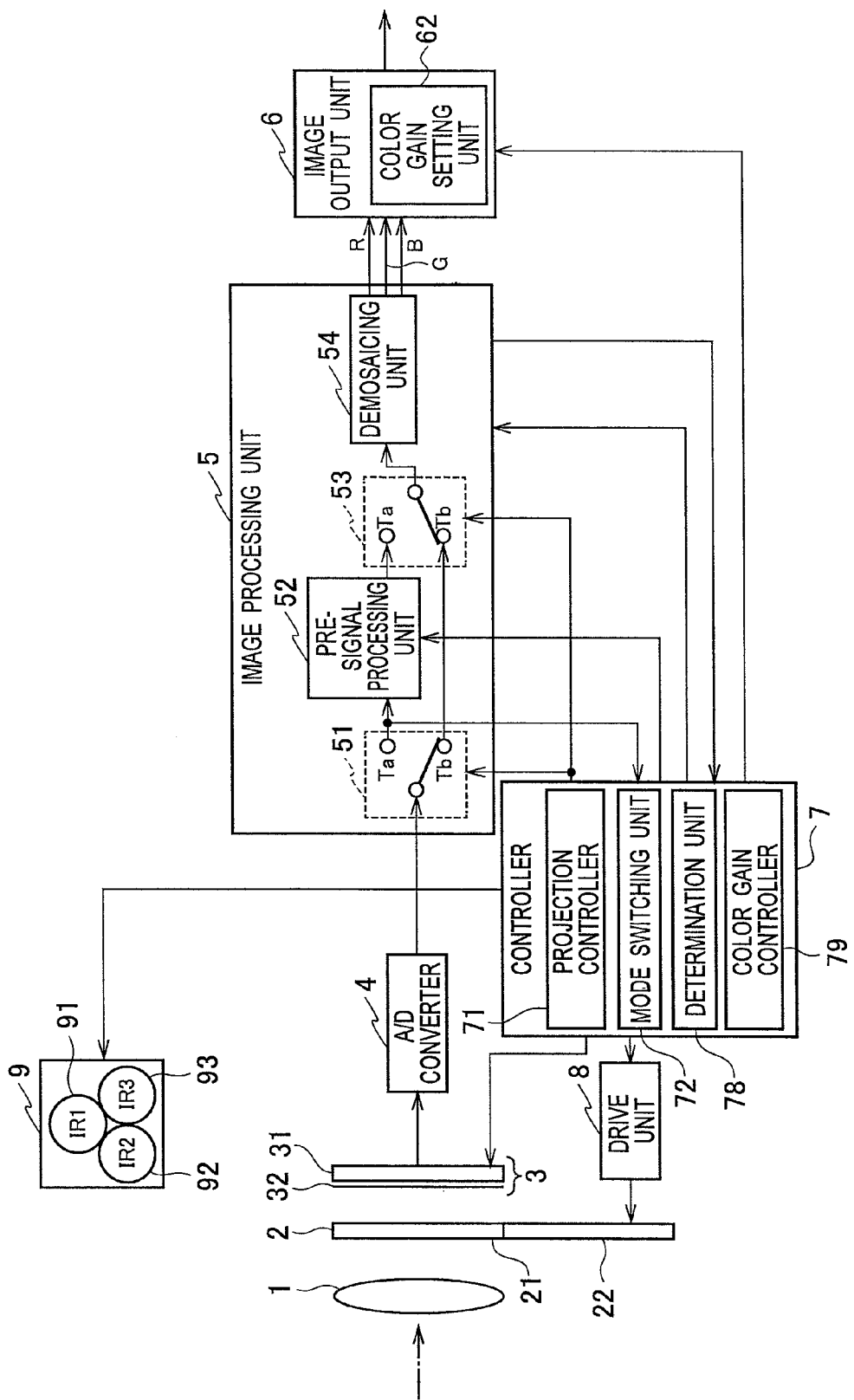
FIG. 1 is a block diagram showing an overall configuration of an imaging device of an embodiment.

As shown in FIG. 1, a light indicated by the dashed-dotted line reflected by an object is collected by an optical lens 1. Here, visible light enters the optical lens 1 under the condition that visible light is present sufficiently, and infrared light emitted from an infrared projector 9 described below and reflected by the object enters the optical lens 1 under the condition that almost no visible light is present.

In the state where visible light is slightly present, mixed light including both the visible light and the infrared light emitted from the infrared projector 9 and reflected by the object, enters the optical lens 1.

Although FIG. 1 shows only one optical lens 1 for reasons of simplification, the imaging device actually includes a plurality of optical lenses.

An optical filter 2 is interposed between the optical lens 1 and an imaging unit 3. The optical filter 2 includes two members; an infrared cut filter 21 and a dummy glass 22. The optical filter 2 is driven by a drive unit 8 in a manner such that the infrared cut filter 21 is inserted between the optical lens 1 and the imaging unit 3 or such that the dummy glass 22 is inserted between the optical lens 1 and the imaging unit 3.

The imaging unit 3 includes an imaging element 31 in which a plurality of light receiving elements (pixels) are arranged in both the horizontal direction and the vertical direction, and a color filter 32 in which filter elements of red (R), green (G) or blue (B) corresponding to the respective light receiving elements are arranged. The imaging element 31 may be either a charge coupled device (CCD) or a complementary metal oxide semiconductor (CMOS).

Figures 2, 3:
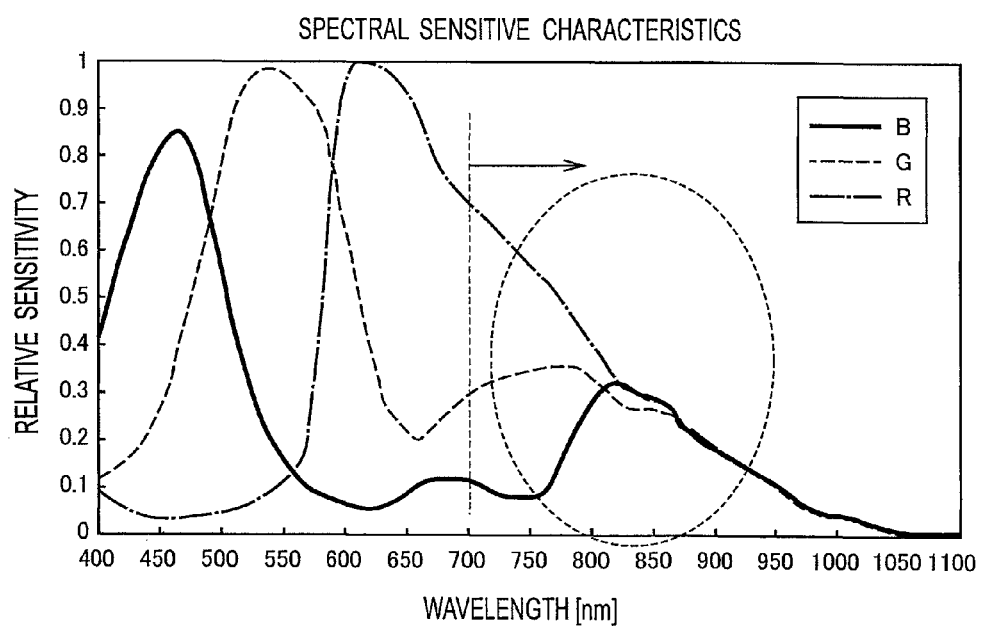
FIG. 2 is a view showing an example of an array of filter elements in a color filter used in the imaging device of the embodiment.
FIG. 3 is a characteristic diagram showing spectral sensitive characteristics of wavelengths and relative sensitivities of light of three primary colors in an imaging unit included in the imaging device of the embodiment.

In the color filter 32, for example, the filter elements of each of R, G and B are arranged in a pattern called a Bayer array, as shown in FIG. 2. The Bayer array is an example of predetermined arrays of the filter elements of R, G and B. In FIG. 2, each of the filter elements of G in each line held between the filter elements of R is indicated by Gr, and each of the filter elements of G held between the filter elements of B is indicated by Gb.

The Bayer array has a configuration in which the horizontal lines alternating the filter elements of R with the filter elements of Gr and the horizontal lines alternating the filter elements of B with the filter elements of Gb are aligned alternately with each other in the vertical direction.

FIG. 3 shows spectral sensitive characteristics of wavelengths and relative sensitivities of R light, G light and B light in the imaging unit 3. The maximum value of the relative sensitivities is normalized to 1. When the imaging device is operated in the normal mode, infrared light having a wavelength of 700 nm or greater is required to be blocked in order to capture fine color images with visible light.

The drive unit 8 is thus controlled by a controller 7 to drive the optical filter 2 in such a manner as to insert the infrared cut filter 21 between the optical lens 1 and the imaging unit 3.

As is apparent from FIG. 3, the imaging unit 3 shows the sensitivities in the area where the infrared light having the wavelength of 700 nm or greater is present. Therefore, when the imaging device is operated in the intermediate mode or in the night-vision mode, the drive unit 8 is controlled by the controller 7 to drive the optical filter 2 in such a manner as to remove the infrared cut filter 21 from between the optical lens 1 and the imaging unit 3 and insert the dummy glass 22 therebetween.

When the dummy glass 22 is inserted between the optical lens 1 and the imaging unit 3, the infrared light having the wavelength of 700 nm or greater is not blocked. Thus, the imaging device can obtain information of each of R, G and B by using the sensitivities in the oval region surrounded by the broken line in FIG. 3. The reason the dummy glass 22 is inserted is to conform the optical path length obtained when the dummy glass 22 is used to the optical path length obtained when the infrared cut filter 21 is used.

The infrared projector 9 includes projecting portions 91, 92 and 93 for projecting infrared light with wavelengths IR1, IR2 and IR3, respectively. In the case of the intermediate mode or the night-vision mode, a projection controller 71 in the controller 7 controls the projecting portions 91, 92 and 93 so as to selectively project the infrared light with the respective wavelengths IR1, IR2 and IR3 in a time division manner.

Figure 4:
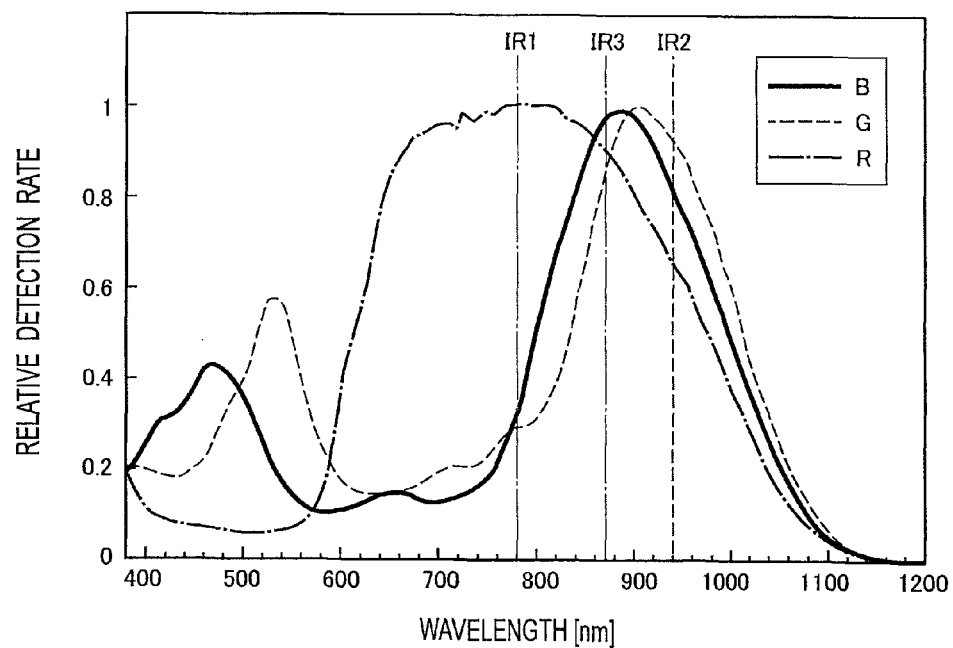
FIG. 4 is a characteristic diagram showing a relationship between wavelengths and relative detection rates when multiplying, by a light receiving sensitivity of silicon, a reflectance of light of each primary color obtained from a particular substance.

Here, a silicon wafer is used in the imaging element 31. FIG. 4 shows a relationship between wavelengths and relative detection rates when a reflectance at each wavelength is multiplied by a light receiving sensitivity of silicon in a case where a material consisting of each of the colors R, G and B is irradiated with white light. The maximum value of the relative detection rates in FIG. 4 is also normalized to 1.

For example, as shown in FIG. 4, in the infrared light area, the reflected light with the wavelength of 780 nm has a strong correlation with the reflected light of the material with color R, the reflected light with the wavelength of 870 nm has a strong correlation with the reflected light of the material with color B, and the reflected light with the wavelength of 940 nm has a strong correlation with the reflected light of the material with color G.

Thus, according to the present embodiment, the wavelengths IR1, IR2 and IR3 of infrared light projected from the projecting portions 91, 92 and 93 are set to 780 nm, 940 nm and 870 nm, respectively. These values are examples for the wavelengths IR1, IR2 and IR3, and other wavelengths other than 780 nm, 940 nm and 870 nm may also be employed.

The projecting portion 91 radiates the infrared light with the wavelength IR1 on an object, and an image signal obtained, in a manner such that light reflected by the object is captured, is assigned to an R signal. The projecting portion 93 radiates the infrared light with the wavelength IR2 on the object, and an image signal obtained, in a manner such that light reflected by the object is captured, is assigned to a G signal. The projecting portion 92 radiates the infrared light with the wavelength IR3 on the object, and an image signal obtained, in a manner such that light reflected by the object is captured, is assigned to a B signal.

Accordingly, even in the intermediate mode or in the night-vision mode, a color similar to that obtained when the object is imaged in the normal mode in the state where visible light is present, can be reproduced theoretically.

Alternatively, the wavelength IR1 of 780 nm may be assigned to the R light, the wavelength IR3 of 870 nm may be assigned to the G light, and the wavelength IR2 of 940 nm may be assigned to the B light, although in this case the color image would possess a color tone different from the actual color tone of the object. The wavelengths IR1, IR2 and IR3 may be assigned optionally to the R light, the G light and the B light.

According to the present embodiment, the wavelengths IR1, IR2 and IR3 are assigned to the R light, the G light and the B light, respectively, by which the color tone of the object can be reproduced most finely.

The controller 7 controls the imaging unit 3, the respective components in an image processing unit 5, and an image output unit 6. Image signals captured by the imaging unit 3 are subjected to A/D conversion by an A/D converter 4 and then input into the image processing unit 5. The internal configuration and operation of the image processing unit 5 will be explained below.

The image output unit 6 includes a color gain setting unit 62 that multiplies data for three primary colors R, G and B described below by each predetermined color gain. The specific operation of the color gain setting unit 62 will be explained below. The color gain setting unit 62 may be provided in the image processing unit 5.

The imaging unit 3 and the A/D converter 4 may be integrated together. The image processing unit 5 and the controller 7 may be integrated together.

The controller 7 includes a mode switching unit 72 that switches among the normal mode, the intermediate mode and the night-vision mode. The mode switching unit 72 switches the operations in the image processing unit 5 as appropriate, as described below, corresponding to the normal mode, the intermediate mode and the night-vision mode.

The controller 7 further includes a determination unit 78 that analyzes the relationship between the amount of environmental visible light and the amount of infrared light, and a color gain controller 79 that controls the color gain setting unit 62 to vary each color gain by which the data for the respective three primary colors is multiplied. Here, the infrared light is mostly composed of light emitted from the infrared projector 9 and reflected by an object to be captured.

The determination unit 78 is only required to, for example, determine whether the amount of visible light is greater than the amount of infrared light so that the visible light is the predominant light and the infrared light is the subordinate light, or whether the amount of infrared light is greater than the amount of visible light so that the infrared light is the predominant light and the visible light is the subordinate light. The determination unit 78 may analyze the relationship between the amount of environmental visible light and the amount of infrared light in such a manner as to calculate a ratio of the specific light amounts.

Here, the ratio of light amounts is not necessarily the ratio of the amount of visible light and the amount of infrared light itself as long as it represents a numerical value that varies depending on the relationship (the ratio or the like) between the amount of environmental visible light and the amount of infrared light.

When calculating the numerical value so as to analyze the relationship between the amount of environmental visible light and the amount of infrared light, it is not required to determine which of visible light and infrared light is present predominantly or subordinately. Hereinafter, for convenience of explanation, the relationship between the amount of environmental visible light and the amount of infrared light may simply be referred to as a "superior-subordinate relationship".

The color gain controller 79 controls the color gain setting unit 62 to vary each color gain by which the data for the respective three primary colors is multiplied according to the relationship between the amount of environmental visible light and the amount of infrared light analyzed by the determination unit 78.

The image processing unit 5 includes switches 51 and 53, a pre-signal processing unit 52, and a demosaicing unit 54. The switches 51 and 53 may be physical switches or may be logical switches for switching the pre-signal processing unit 52 between an active state and an inactive state. The controller 7 receives an imaging signal input from the image processing unit 5 in order to detect brightness of an image being captured.

Image data input into the pre-signal processing unit 52 is also input into the determination unit 78. The determination unit 78 analyzes the superior-subordinate relationship between the light amounts based on the image data input into the pre-signal processing unit 52.

The pre-signal processing unit 52 may possess a function of the determination unit 78. The pre-signal processing unit 52 possessing the function of the determination unit 78 notifies the color gain controller 79 of the determination result of the superior-subordinate relationship between the light amounts.

Figure 5:
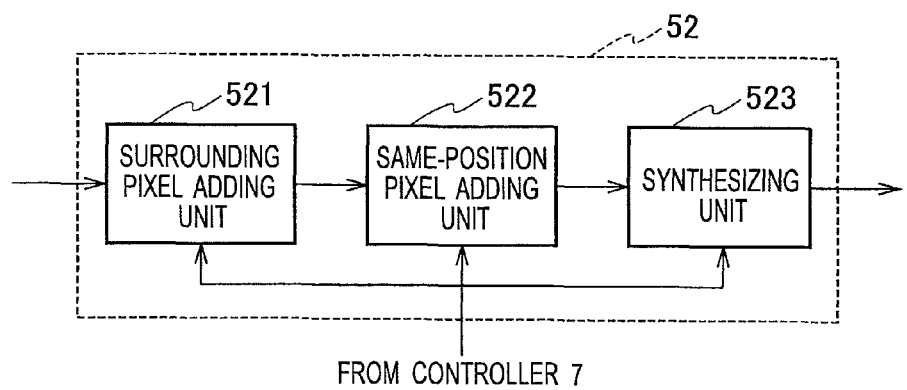
FIG. 5 is a block diagram showing a specific configuration example of a pre-signal processing unit 52 shown in FIG. 1.

As shown in FIG. 5, the pre-signal processing unit 52 includes a surrounding pixel adding unit 521, a same-position pixel adding unit 522, and a synthesizing unit 523.

The image processing unit 5 generates data for the respective three primary colors R, G and B and supplies the data to the image output unit 6. The image output unit 6 outputs the data for the three primary colors in a predetermined format to a display unit or the like (not shown in the drawing).

The image output unit 6 may directly output signals of the three primary colors R, G and B, or may convert the signals of the three primary colors R, G and B into luminance signals and color signals (or color difference signals) before outputting. The image output unit 6 may output composite image signals. The image output unit 6 may output digital image signals or output image signals converted into analog signals by a D/A converter.

When the image signals in a predetermined format are output from the image processing unit 5, the color gain setting unit 62 multiplies the data for the respective three primary colors R, G and B by the respective predetermined color gains in order to adjust white balance. Note that the color gain setting unit 62 may multiply the data by each color gain in order to reproduce an image at a predetermined color temperature, instead of multiplying in order to adjust the white balance.

The color gain setting unit 62 holds at least two sets of color gains used for multiplying the data for the three primary colors R, G and B. The color gains in one set used for the data for the respective colors R, G and B are all different from the color gains in the other set.

When the imaging device is set to the intermediate mode by the mode switching unit 72, the color gain controller 79 controls the color gain setting unit 62 to select one of the sets of color gains used for multiplying the three primary color data. The color gain setting unit 62 multiplies the three primary color data by the color gains of the selected set.

When the imaging device is set to the normal mode or the night-vision mode by the mode switching unit 72, the color gain setting unit 62 multiplies the three primary color data by a set of color gains fixed differently in each mode.

Next, the operations of each of the normal mode, the intermediate mode and the night-vision mode are explained in more detail.

<Normal Mode>

In the normal mode, the controller 7 directs the drive unit 8 to insert the infrared cut filter 21 between the optical lens 1 and the imaging unit 3. The projection controller 71 turns off the infrared projector 9 to stop projecting infrared light.

Image signals captured by the imaging unit 3 are converted into image data as digital signals by the A/D converter 4 and then input into the image processing unit 5. In the normal mode, the mode switching unit 72 connects the switches 51 and 53 to the respective terminals Tb.

Figure 6:
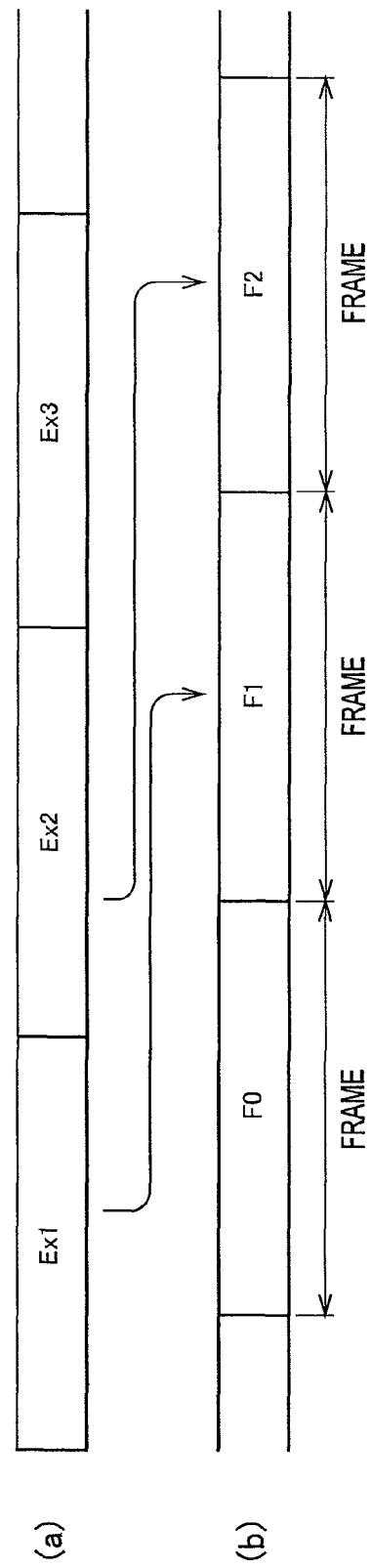
FIG. 6 is a view showing a relationship between exposures and frames of image signals when the imaging device of the embodiment is operating in a normal mode.

Item (a) of FIG. 6 shows exposures Ex1, Ex2, Ex 3, . . . of the imaging unit 3. Although the actual exposure time varies depending on conditions such as a shutter speed, each of the exposures Ex1, Ex2, Ex 3 shows the maximum exposure time.

Item (b) of FIG. 6 shows the timing at which each of frames of the image signals is obtained. Frame F0 of the image signals is obtained based on an exposure (not shown in the drawing) prior to the exposure Ex1 after a predetermined period of time. Frame F1 of the image signals is obtained based on the exposure Ex1 after a predetermined period of time. Frame F2 of the image signal is obtained based on the exposure Ex2 after a predetermined period of time. The same operations are repeated after the exposure Ex3. A frame frequency of the image signals is, for example, 30 frames per second.

The frame frequency of the image signals may be set to, for example, 30 frames per second or 60 frames per second in the NTSC format, or 25 frames per second or 50 frames per second in the PAL format. Alternatively, the frame frequency of the image signals may be 24 frames per second which is used for movies.

The image data of each frame output from the A/D converter 4 is input to the demosaicing unit 54 via the switches 51 and 53. The demosaicing unit 54 subjects the image data of each input frame to demosaicing. The image processing unit 5 subjects the data to other types of image processing in addition to the demosaicing and then outputs the data for the three primary colors R, G and B.

Figure 7:
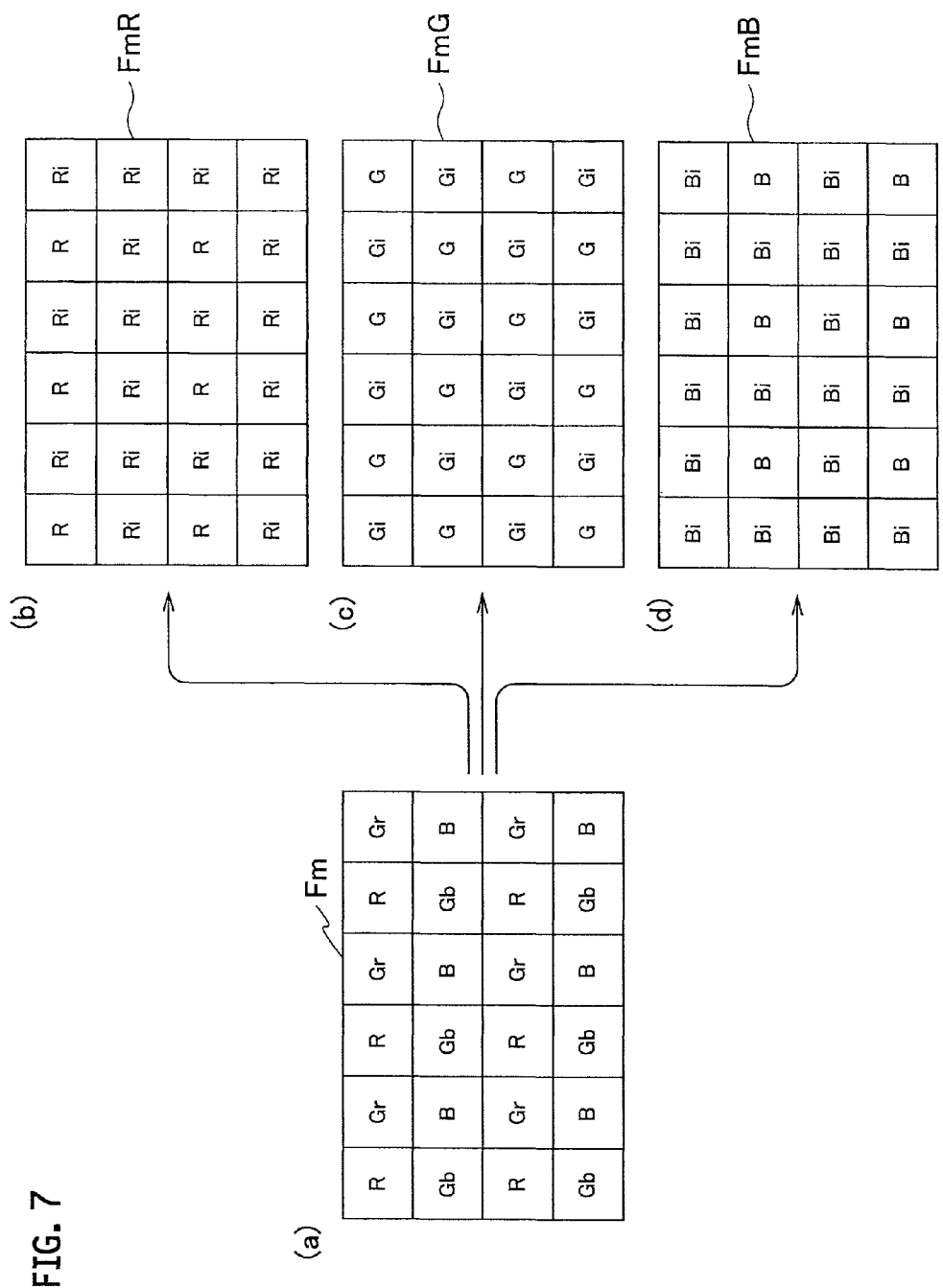
FIG. 7 is a view for explaining demosaicing when the imaging device of the embodiment is operating in the normal mode.

The demosaicing in the demosaicing unit 54 is explained below with reference to FIG. 7. Item (a) of FIG. 7 shows an arbitrary frame Fm of image data. The frame Fm is composed of pixels in an effective image period. The number of the pixels is, for example, 640 horizontal pixels and 480 vertical pixels in the VGA standard. For reasons of simplification, the number of the pixels in the frame Fm is greatly decreased so as to schematically show the frame Fm.

The image data generated by the imaging unit 3 having the Bayer array is data in which pixel data for R, G and B are mixed in the frame Fm. The demosaicing unit 54 computes pixel data for R for pixel positions where no pixel data for R is present by use of the surrounding pixel data for R so as to generate interpolated pixel data Ri for R. The demosaicing unit 54 generates R frame FmR in which all pixels in one frame shown in item (b) of FIG. 7 are composed of the pixel data for R.

The demosaicing unit 54 computes pixel data for G for pixel positions where no pixel data for G is present by use of the surrounding pixel data for G so as to generate interpolated pixel data Gi for G. The demosaicing unit 54 generates G frame FmG in which all pixels in one frame shown in item (c) of FIG. 7 are composed of the pixel data for G.

The demosaicing unit 54 computes pixel data for B for pixel positions where no pixel data for B is present by use of the surrounding pixel data for B so as to generate interpolated pixel data Bi for B. The demosaicing unit 54 generates B frame FmB in which all pixels in one frame shown in item (d) of FIG. 7 are composed of the pixel data for B.

The demosaicing unit 54 is only required to use at least the pixel data for R when interpolating the pixel data for R, use at least the pixel data for G when interpolating the pixel data for G, and use at least the pixel data for B when interpolating the pixel data for B. Alternatively, the demosaicing unit 54 may interpolate the pixel data for each of R, G and B to be generated by use of the pixel data of the different colors in order to improve the accuracy of the interpolation.

Since the imaging unit 3 further includes pixels outside the effective image period, pixel data for each of R, G and B can be interpolated with regard to the pixels located along the edges of top and bottom, left and right.

The R frame FmR, the G frame FmG and the B frame FmB generated by the demosaicing unit 54 are output as the data for the three primary colors R, G and B. Although the pixel data for each of R, G and B was explained per frame in FIG. 7 for ease of explanation, the pixel data for each of R, G and B is actually output sequentially per pixel.

<Intermediate Mode: First Intermediate Mode>

In the intermediate mode (first intermediate mode and second intermediate mode described below), the controller 7 directs the drive unit 8 to insert the dummy glass 22 between the optical lens 1 and the imaging unit 3. The projection controller 71 turns on the infrared projector 9 to project infrared light. The mode switching unit 72 connects the switches 51 and 53 to the respective terminals Ta.

Figure 8:
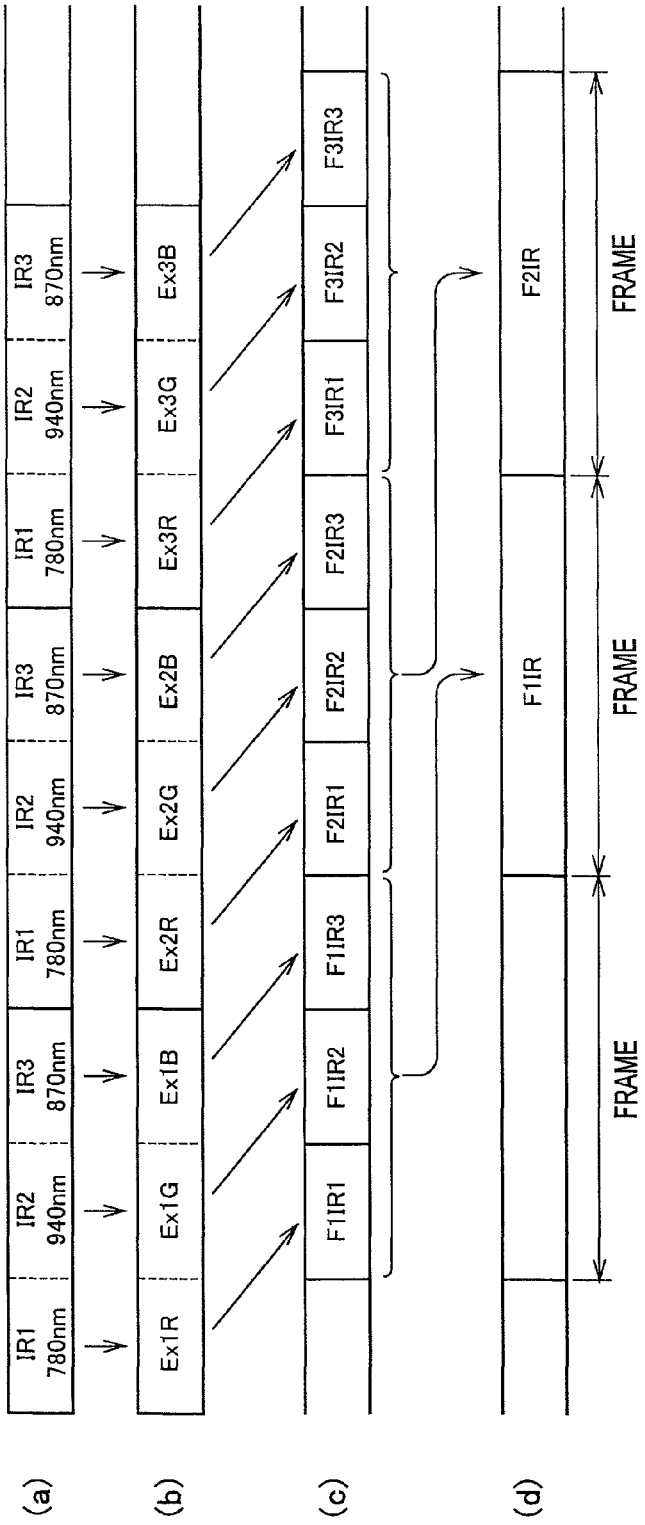
FIG. 8 is a view showing a relationship between exposures and frames of image signals when the imaging device of the embodiment is operating in an intermediate mode and in a night-vision mode.

Item (a) of FIG. 8 shows a state where infrared light is projected from the infrared projector 9. The controller 7 divides one frame period of the normal mode into three so as to control, for example, the projecting portions 91, 92 and 93 to sequentially project infrared light in this order.

In the example of item (a) of FIG. 8, the infrared light with the wavelength IR1 (780 nm) is radiated on the object in the first ⅓ period of the one frame. The infrared light with the wavelength IR2 (940 nm) is radiated on the object in the second ⅓ period of the one frame. The infrared light with the wavelength IR3 (870 nm) is radiated on the object in the last ⅓ period of the one frame. The order of radiation of the infrared light with the respective wavelengths IR1, IR2 and IR3 is optional. However, for the following reasons, the case in which the wavelength IR2 is located in the middle, and the wavelengths IR1, IR2 and IR3 are arranged in this order, is most preferable.

In the intermediate mode and the night-vision mode, as described below, image signals of one frame are generated based on imaging signals generated three times by the imaging unit 3 in the state where the infrared light of each of the wavelengths IR1, IR 2 and IR3 is projected. Therefore, when a moving object is imaged, a color shift or a blur on the outline may be caused.

In general, G signals among signals R, G and B have the greatest influence on luminance signals. Thus, the infrared light with the wavelength IR2 for generating the image signals (imaging signals) assigned to the G signals are preferably arranged in the middle so that the infrared light with the wavelengths IR1 and IR3 is respectively arranged in front of and behind the infrared light with the wavelength IR2.

As shown in item (b) of FIG. 8, exposure Ex1R which has a strong correlation with R light is executed by the imaging unit 3 at the point where the infrared light with the wavelength IR1 is being projected. Exposure Ex1G which has a strong correlation with G light is executed by the imaging unit 3 at the point where the infrared light with the wavelength IR2 is being projected. Exposure Ex1B which has a strong correlation with B light is executed by the imaging unit 3 at the point where the infrared light with the wavelength IR3 is being projected.

Note that, since an image is captured in the intermediate mode in a state where visible light is slightly present, visible light and infrared light projected from the infrared projector 9 coexist. Therefore, in the intermediate mode, exposures Ex1R, Ex1G, Ex1B, Ex2R, Ex2G, Ex2B, etc., are each obtained in a manner such that exposure of visible light and exposure of infrared light are combined together.

As shown in item (c) of FIG. 8, frame F1IR1 corresponding to the exposure Ex1R, frame F1IR2 corresponding to the exposure Ex1G and frame F1IR3 corresponding to the exposure Ex1B are obtained based on the exposures Ex1R, Ex1G and Ex1B after a predetermined period of time.

Further, frame F2IR1 corresponding to the exposure Ex2R, frame F2IR2 corresponding to the exposure Ex2G and frame F2IR3 corresponding to the exposure Ex2B are obtained based on the exposures Ex2R, Ex2G and Ex2B after a predetermined period of time. The same operations are repeated after the exposures Ex3R, Ex3G, and Ex3B.

The frame frequency of the imaging signals in item (c) of FIG. 8 is 90 frames per second. In the intermediate mode, one frame of the imaging signals in the normal mode is subjected to time division so as to project the infrared light with the respective wavelengths IR1 to IR3. Thus, in order to output the imaging signals in the same format as the normal mode, the frame frequency of the imaging signals in item (c) of FIG. 8 is three times as many as that in the normal mode.

As described below, based on the imaging signals of the three frames in item (c) of FIG. 8, one frame of imaging signals having a frame frequency of 30 frames per second as shown in item (d) of FIG. 8 is generated. For example, frame F1IR is generated based on the frames F1IR1, F1IR2 and F1IR3, and frame F2IR is generated based on the frames F2IR1, F2IR2 and F2IR3.

The operation of generating the imaging signals of each frame in item (d) of FIG. 8 in the intermediate mode based on the imaging signals of the three frames in item (c) of FIG. 8, is explained in detail below.

The image data for the respective frames corresponding to the imaging signals shown in item (c) of FIG. 8 output from the A/D converter 4 is input into the pre-signal processing unit 52 via the switch 51.

Figure 9:
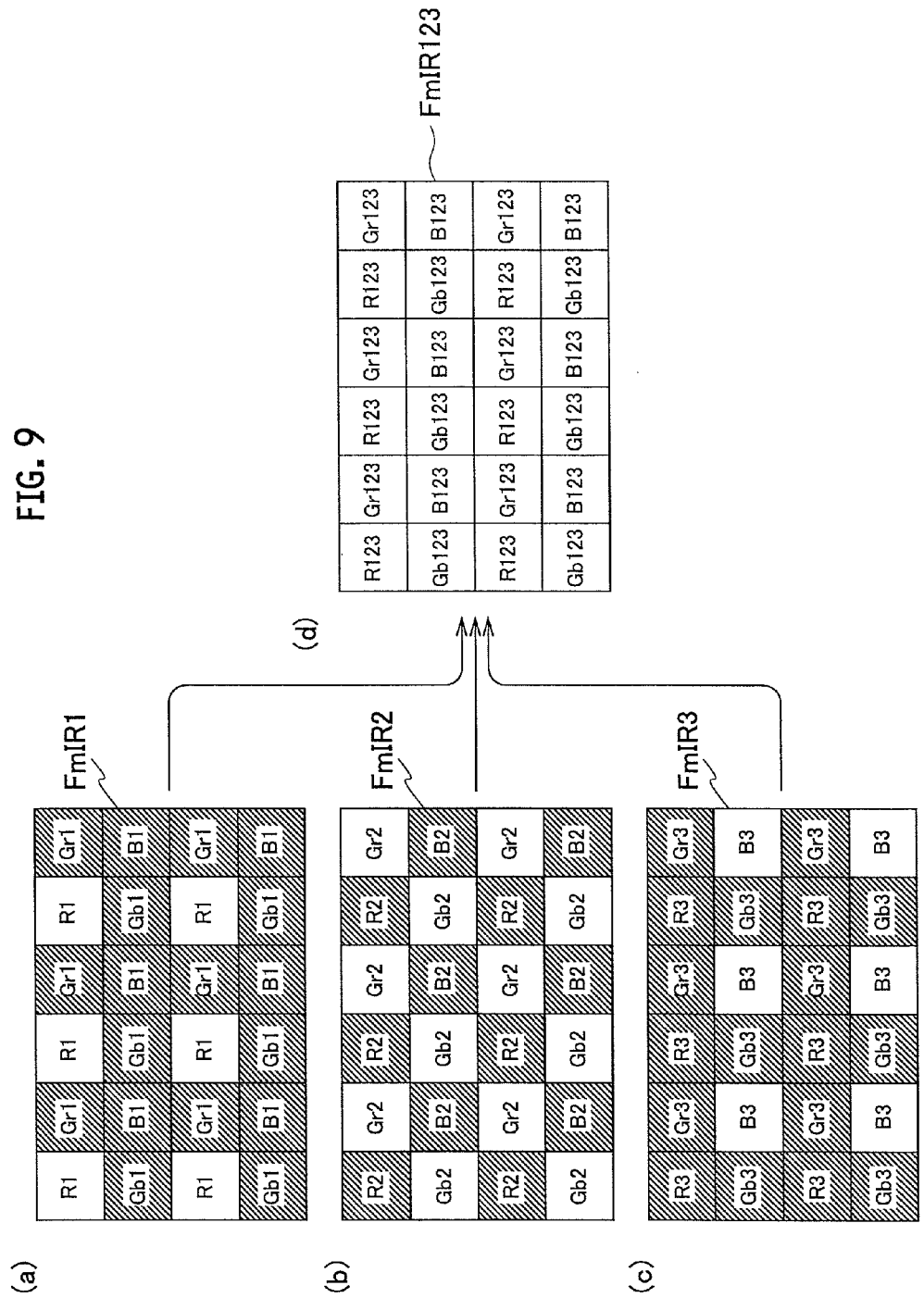
FIG. 9 is a view for explaining pre-signal processing when the imaging device of the embodiment is operating in a first intermediate mode.

Pre-signal processing in the pre-signal processing unit 52 is explained below with reference to FIG. 9. Item (a) of FIG. 9 shows an arbitrary frame FmIR1 of image data generated at the point where the infrared light with the wavelength IR1 is being projected. The pixel data for each of R, B, Gr and Gb in the frame FmIR1 is added with an index "1" indicating that all data is generated in the state where the infrared light with the wavelength IR1 is projected.

Item (b) of FIG. 9 shows an arbitrary frame FmIR2 of image data generated at the point where the infrared light with the wavelength IR2 is being projected. The pixel data for each of R, B, Gr and Gb in the frame FmIR2 is added with an index "2" indicating that all data is generated in the state where the infrared light with the wavelength IR2 is projected.

Item (c) of FIG. 9 shows an arbitrary frame FmIR3 of image data generated at the point where the infrared light with the wavelength IR3 is being projected. The pixel data for each of R, B, Gr and Gb in the frame FmIR3 is added with an index "3" indicating that all data is generated in the state where the infrared light with the wavelength IR3 is projected.

Since the frame FmIR1 shown in item (a) of FIG. 9 includes the image data generated in the state where the infrared light with the wavelength IR1 having a strong correlation with R light is projected, the pixel data for R is pixel data corresponding to the projected infrared light, and the pixel data for B and G are pixel data not corresponding to the projected infrared light. The hatching added to the pixel data for each of B, Gr and Gb represents that the pixel data does not correspond to the projected infrared light.

Since the frame FmIR2 shown in item (b) of FIG. 9 includes the image data generated in the state where the infrared light with the wavelength IR2 having a strong correlation with G light is projected, the pixel data for G is pixel data corresponding to the projected infrared light, and the pixel data for R and B are pixel data not corresponding to the projected infrared light. The hatching added to the pixel data for each of R and B represents that the pixel data does not correspond to the projected infrared light.

Since the frame FmIR3 shown in item (c) of FIG. 9 includes the image data generated in the state where the infrared light with the wavelength IR3 having a strong correlation with B light is projected, the pixel data for B is pixel data corresponding to the projected infrared light, and the pixel data for R and G are pixel data not corresponding to the projected infrared light. The hatching added to the pixel data for each of R, Gr and Gb represents that the pixel data does not correspond to the projected infrared light.

The same-position pixel adding unit 522 in the pre-signal processing unit 52 individually adds the pixel data for each of R, Gr, Gb and B located at the same pixel positions according to the following formulae (1) to (3) so as to generate added pixel data R123, Gr123, Gb123, and B123. In the intermediate mode, the surrounding pixel adding unit 521 in the pre-signal processing unit 52 is inactive.

$$R123 = ka \times R1 + kb \times R2 + kc \times R3 \quad (1)$$

$$G123 = kd \times G1 + Ke \times G2 + kf \times G3 \quad (2)$$

$$B123 = kg \times B1 + Kh \times B2 + ki \times R3 \quad (3)$$

In the formulae (1) to (3), R1, G1 and B1 are pixel data for R, G and B in the frame FmIR1, R2, G2 and B2 are pixel data for R, G and B in the frame FmIR2, and R3, G3 and B3 are pixel data for R, G and B in the frame FmIR3. In addition, ka to ki are predetermined coefficients. The data G123 in the formula (2) is either Gr123 or Gb123.

The same-position pixel adding unit 522 adds the hatched pixel data for each of R, Gr, Gb and B to the pixel data for each of R, Gr, Gb and B located at the same pixel positions not hatched.

In particular, the same-position pixel adding unit 522 adds, to the pixel data for R located in the frame FmIR1, the pixel data for R located at the same pixel positions in each of the frames FmIR2 and FmIR3 so as to generate the added pixel data R123 according to the formula (1). That is, the same-position pixel adding unit 522 only uses the pixel data in the region corresponding to the red color filter in the light receiving elements and generates the added pixel data R123 for red.

The same-position pixel adding unit 522 adds, to the pixel data for Gr, Gb located in the frame FmIR2, the pixel data for Gr, Gb located at the same pixel positions in each of the frames FmIR1 and FmIR3 so as to generate the added pixel data G123 according to the formula (2). That is, the same-position pixel adding unit 522 only uses the pixel data in the region corresponding to the green color filter in the light receiving elements and generates the added pixel data G123 for green.

The same-position pixel adding unit 522 adds, to the pixel data for B located in the frame FmIR3, the pixel data for B located at the same pixel positions in each of the frames FmIR1 and FmIR2 so as to generate the added pixel data B123 according to the formula (3). That is, the same-position pixel adding unit 522 only uses the pixel data in the region corresponding to the blue color filter in the light receiving elements and generates the added pixel data B123 for blue.

The synthesizing unit 523 in the pre-signal processing unit 52 generates frame FmIR123 of synthesized image signals shown in item (d) of FIG. 9 based on the respective added pixel data R123, Gr123, Gb123 and B123 generated at the respective pixel positions.

More particularly, the synthesizing unit 523 selects the added pixel data R123 in the frame FmIR1, the added pixel data Gr123 and Gb123 in the frame FmIR2, and the added pixel data B123 in FmIR3 and synthesizes the respective added pixel data. The synthesizing unit 523 thus generates the frame FmIR123 of the synthesized image signals.

As described above, the synthesizing unit 523 generates the frame FmIR123 in which the respective added pixel data R123, Gr123, Gb123 and B123 are arranged so as to have the same array as the filter elements in the color filter 32.

In the first intermediate mode, the image data in the frame FmIR123 are generated in such a manner as to use the pixel data not hatched and the pixel data hatched.

The reason the same-position pixel adding unit 522 adds the respective pixel data located at the same pixel positions is that, since an image is captured in the intermediate mode in the state where visible light is present, although the amount thereof is small, the hatched pixel data contains the components of the respective colors based on the exposure by the visible light. Therefore, the respective pixel data located at the same pixel positions are added to each other so that the sensitivity to the respective colors can be improved.

When the amount of visible light is relatively large in the state where visible light and infrared light coexist, the exposure by the visible light is predominant. In such a case, the image data in the frame FmIR123 mainly contains the components based on the image signals exposed by the visible light. When the amount of infrared light is relatively large in the state where infrared light and visible light coexist, the exposure by the infrared light is predominant. In such a case, the image data in the frame FmIR123 mainly contains the components based on the image signals exposed by the infrared light.

When the amount of visible light is relatively small, the coefficients ka, kb and kc in the formula (1) preferably fulfill the relationship of ka>ab, kc, the coefficients kd, ke and kf in the formula (2) preferably fulfill the relationship of ke>kd, kf, and the coefficients kg, kh and ki in the formula (3) preferably fulfill the relationship of ki>kg, kh. This is because the wavelength IR1 has a strong correlation with the R light, the wavelength IR2 has a strong correlation with the G light, and the wavelength IR3 has a strong correlation with the B light.

Accordingly, the pixel data for R can be the main data in the frame FmIR1, the pixel data for G can be the main data in the frame FmIR2, and the pixel data for B can be the main data in the frame FmIR3.

The image data in the frame FmIR123 output from the pre-signal processing unit 52 is input into the demosaicing unit 54 via the switch 53. The demosaicing unit 54 subjects the input image data in the frame FmIR123 to demosaicing in the same manner as the normal mode. The image processing unit 5 subjects the image data to other types of image processing in addition to the demosaicing and then outputs the data for the three primary colors R, G and B.

Figure 10:
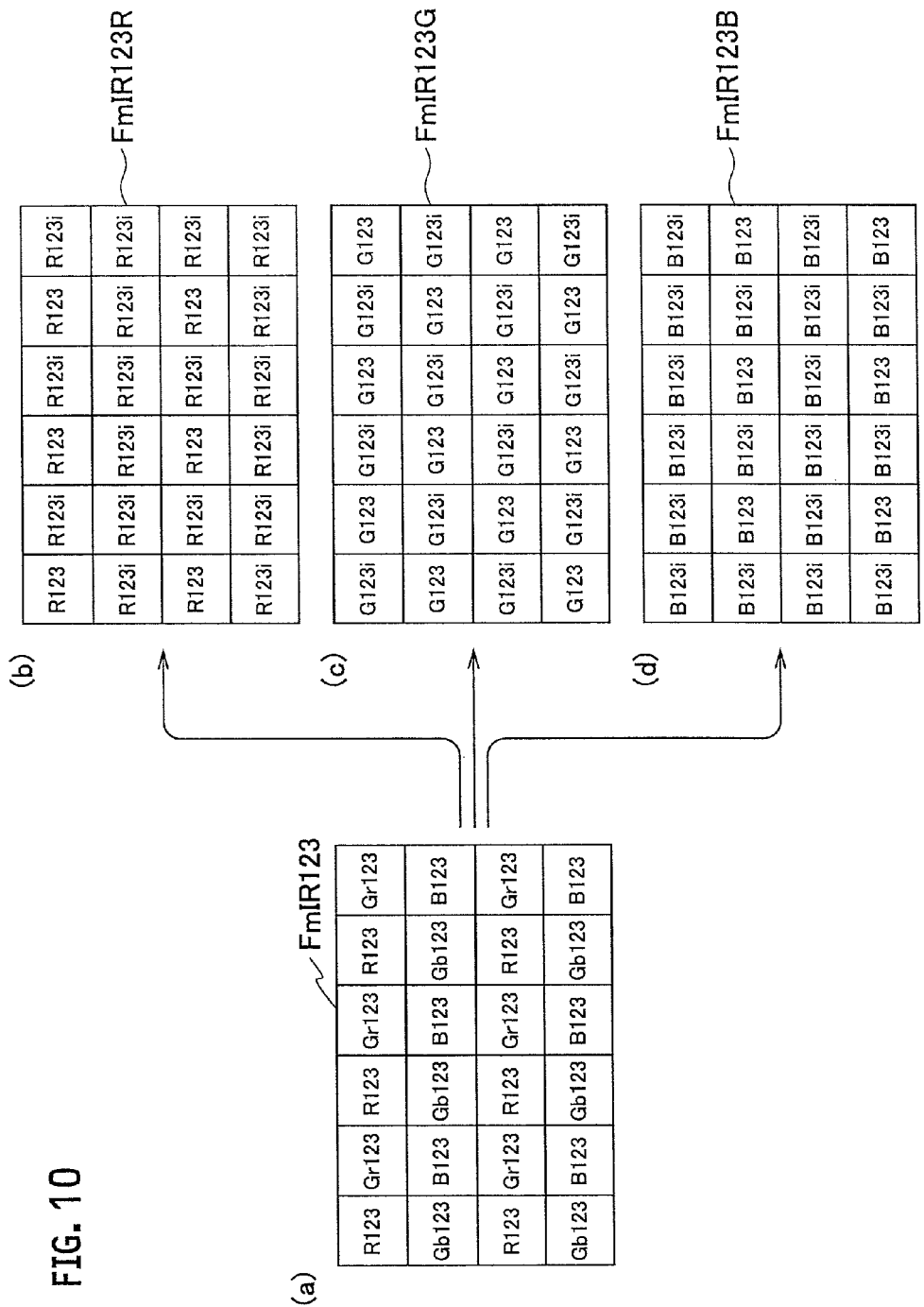
FIG. 10 is a view for explaining demosaicing when the imaging device of the embodiment is operating in the first intermediate mode.

The demosaicing in the demosaicing unit 54 is explained below with reference to FIG. 10. Item (a) of FIG. 10 shows the frame FmIR123. The demosaicing unit 54 computes pixel data for R for pixel positions where no pixel data for R is present by use of the surrounding pixel data for R so as to generate interpolated pixel data R123$i$ for R. The demosaicing unit 54 generates R frame FmIR123R in which all pixels in one frame shown in item (b) of FIG. 10 are composed of the pixel data for R.

The demosaicing unit 54 computes pixel data for G for pixel positions where no pixel data for G is present by use of the surrounding pixel data for G so as to generate interpolated pixel data G123$i$ for G. The demosaicing unit 54 generates G frame FmIR123G in which all pixels in one frame shown in item (c) of FIG. 10 are composed of the pixel data for G.

The demosaicing unit 54 computes pixel data for B for pixel positions where no pixel data for B is present by use of the surrounding pixel data for B so as to generate interpolated pixel data B123$i$ for B. The demosaicing unit 54 generates B frame FmIR123B in which all pixels in one frame shown in item (d) of FIG. 10 are composed of the pixel data for B.

As is apparent from the operation of the demosaicing unit 54 in the normal mode shown in FIG. 7 and the operation of the demosaicing unit 54 in the intermediate mode shown in FIG. 10, both operations are substantially the same. Thus, the operation of the demosaicing unit 54 does not differ between the normal mode and the intermediate mode.

The pre-signal processing unit 52 is only required to be activated in the intermediate mode except for the surrounding pixel adding unit 521, while the pre-signal processing unit 52 is inactivated in the normal mode. The normal mode and the intermediate mode may share the signal processing unit such as the demosaicing unit 54 in the image processing unit 5.

<Intermediate Mode: Second Intermediate Mode>

Figure 11:
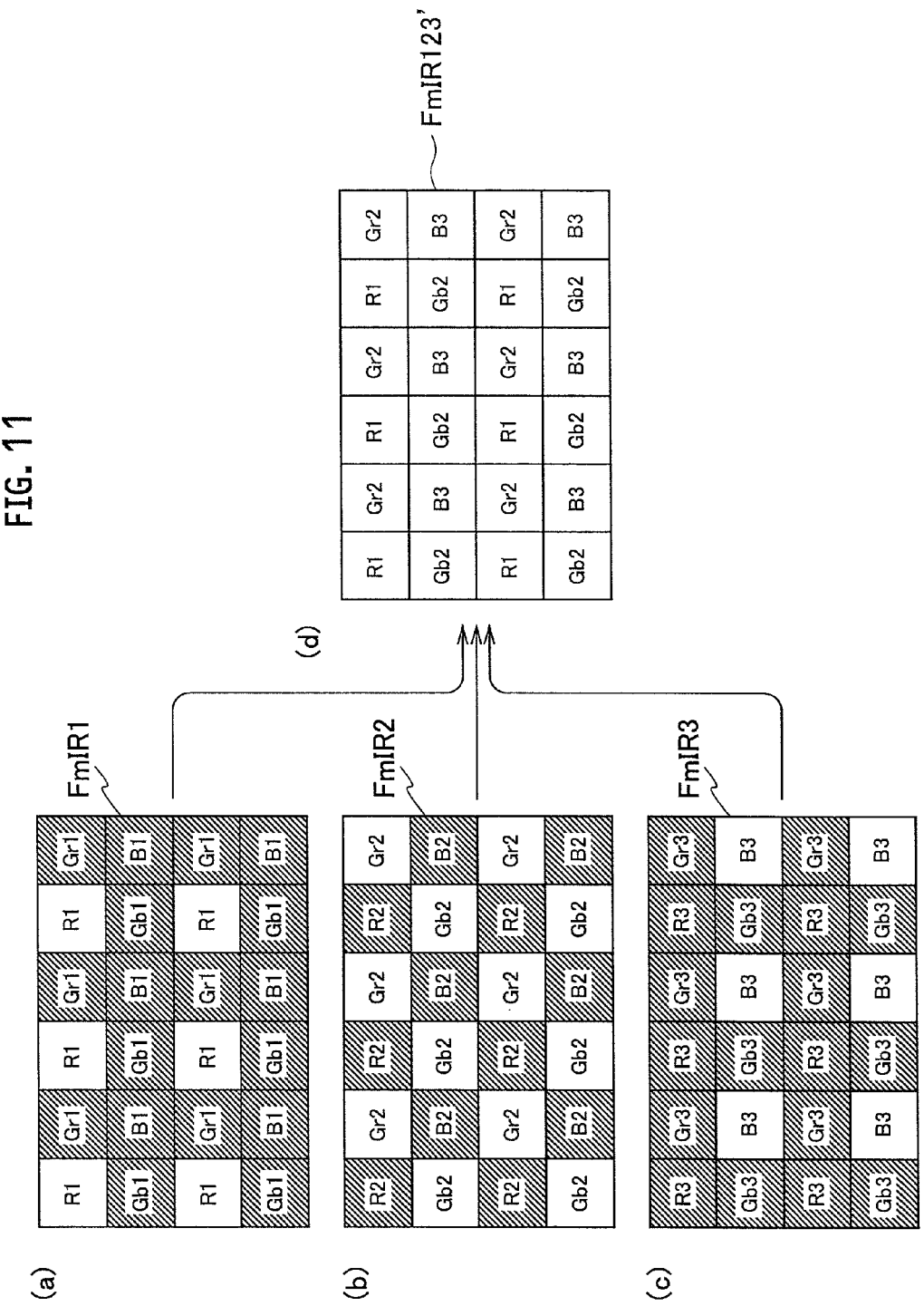
FIG. 11 is a view for explaining pre-signal processing when the imaging device of the embodiment is operating in a second intermediate mode.
Figure 12:
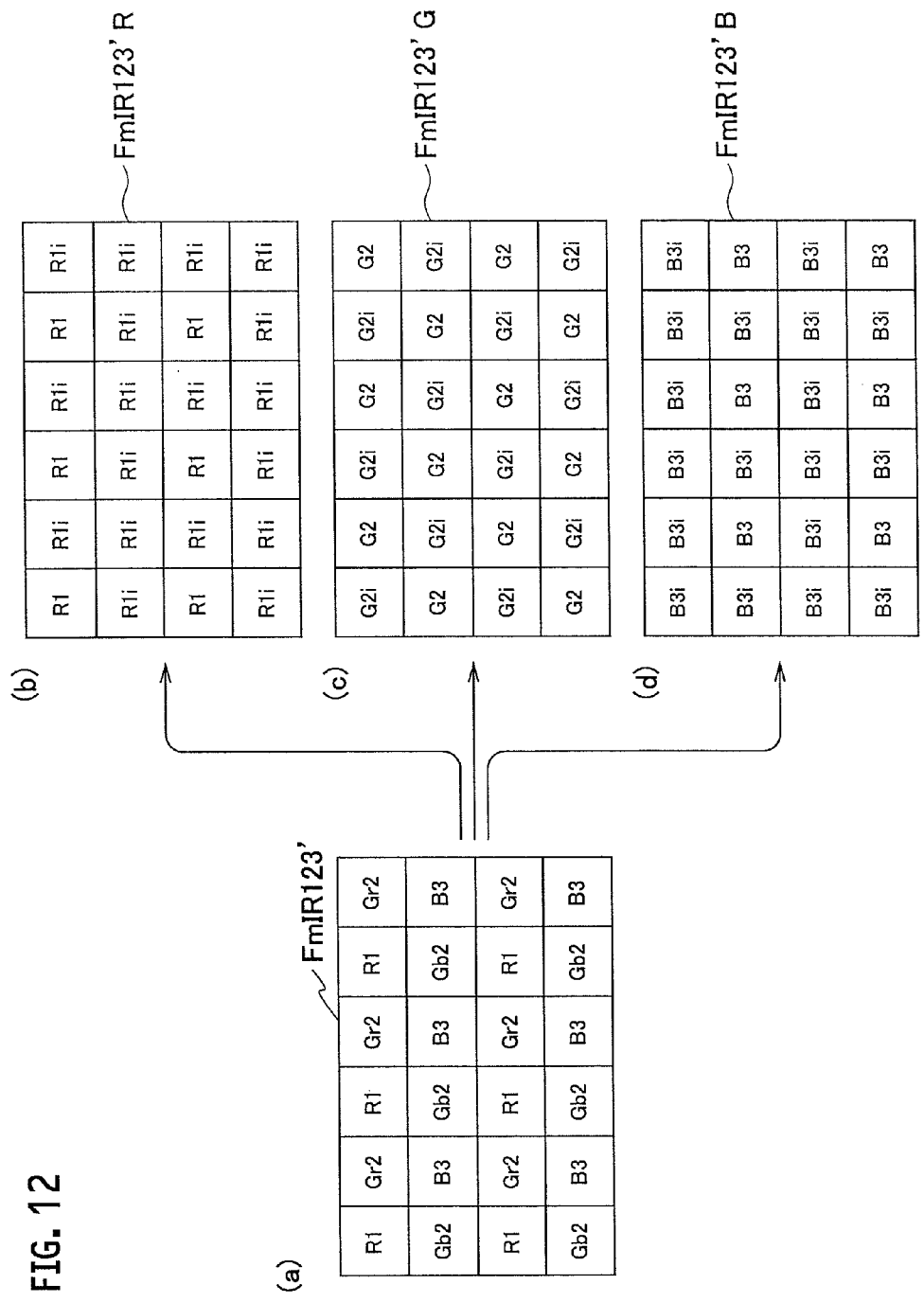
FIG. 12 is a view for explaining demosaicing when the imaging device of the embodiment is operating in the second intermediate mode.

Operations in the second intermediate mode are explained below with reference to FIG. 11 and FIG. 12. Note that the same operations as those in the first intermediate mode are not repeated in the second intermediate mode. Here, the frame FmIR1, the frame FmIR2 and the frame FmIR3 shown in items (a) to (c) in FIG. 11 are the same as the frame FmIR1, the frame FmIR2 and the frame FmIR3 shown in items (a) to (c) in FIG. 9.

The synthesizing unit 523 selects pixel data R1 for R in the frame FmIR1, pixel data Gr2 and Gb2 for G in the frame FmIR2, and pixel data B3 for B in FmIR3 and synthesizes the respective pixel data. The synthesizing unit 523 thus generates frame FmIR123' of the synthesized image signals shown in item (d) of FIG. 11.

That is, the frame FmIR123' is image data in which the pixel data for R, Gr, Gb and B not hatched in each of the frames FmIR1, FmIR2 and FmIR3 are collected in one frame.

Thus, the frame FmIR123' contains the pixel data for red only using the pixel data in the region corresponding to the red color filter in the state where the infrared light with the wavelength IR1 is projected, the pixel data for green only using the pixel data in the region corresponding to the green color filter in the state where the infrared light with the wavelength IR2 is projected, and the pixel data for blue only using the pixel data in the region corresponding to the blue color filter in the state where the infrared light with the wavelength IR3 is projected.

As described above, the synthesizing unit 523 generates the frame FmIR123' in which the respective pixel data R1, Gr2, Gb2 and B3 are arranged so as to have the same array as the filter elements in the color filter 32.

In the second intermediate mode, the same-position pixel adding unit 522 defines the coefficients ka in the formula (1) as 1 and the other coefficients kb and kc as 0, defines the coefficient ke in the formula (2) as 1 and the other coefficients kd and kf as 0, and defines the coefficient ki in the formula (3) as 1 and the other coefficients kg and kh as 0.

Therefore, the value of the pixel data for R in the frame FmIR1, the values of the pixel data for Gr and Gb in the frame FmIR2 and the value of the pixel data for B in the frame FmIR3 each remain as is.

Accordingly, the synthesizing unit 523 can generate the frame FmIR123' by selecting the pixel data for R in the frame FmIR1, the pixel data for Gr and Gb in the frame FmIR2 and the pixel data for B in the frame FmIR3, in the same manner as the operations in the first intermediate mode.

In the second intermediate mode, the pre-signal processing unit 52 only uses the pixel data (the pixel data not hatched) generated in the state where the infrared light for generating the pixel data with the same color is projected so as to generate the frame FmIR123'.

According to the second intermediate mode, although the sensitivity or color reproduction performance decreases compared with the first intermediate mode, the calculation processing can be simplified or the frame memory can be reduced.

The demosaicing in the demosaicing unit 54 is explained below with reference to FIG. 12. Item (a) of FIG. 12 shows the frame FmIR123'. The demosaicing unit 54 computes pixel data for R for pixel positions where no pixel data for R is present by use of the surrounding pixel data for R so as to generate interpolated pixel data R1$i$ for R. The demosaicing unit 54 generates R frame FmIR123'R in which all pixels in one frame shown in item (b) of FIG. 12 are composed of the pixel data for R.

The demosaicing unit 54 computes pixel data for G for pixel positions where no pixel data for G is present by use of the surrounding pixel data for G so as to generate interpolated pixel data G2$i$ for G. The demosaicing unit 54 generates G frame FmIR123'G in which all pixels in one frame shown in item (c) of FIG. 12 are composed of the pixel data for G.

The demosaicing unit 54 computes pixel data for B for pixel positions where no pixel data for B is present by use of the surrounding pixel data for B so as to generate interpolated pixel data B3$i$ for B. The demosaicing unit 54 generates B frame FmIR123'B in which all pixels in one frame shown in item (d) of FIG. 12 are composed of the pixel data for B.

Accordingly, in the intermediate mode, the pixel data for red is generated from the pixel data obtained from the region corresponding to the red color filter in the light receiving elements, the pixel data for green is generated from the pixel data obtained from the region corresponding to the green color filter in the light receiving elements, and the pixel data for blue is generated from the pixel data obtained from the region corresponding to the blue color filter in the light receiving elements.

<Night-Vision Mode: First Night-Vision Mode>

In the night-vision mode (first night-vision mode and second night-vision mode described below), the controller 7 directs the drive unit 8 to insert the dummy glass 22 between the optical lens 1 and the imaging unit 3, as in the case of the intermediate mode. The projection controller 71 turns on the infrared projector 9 to project infrared light. The mode switching unit 72 connects the switches 51 and 53 to the respective terminals Ta.

The general operations in the night-vision mode are the same as those shown in FIG. 8. However, since an image is captured in the night-vision mode in a state where almost no visible light is present, the exposures Ex1R, Ex1G, Ex1B, Ex2R, Ex2G, Ex2B, etc., shown in item (b) of FIG. 8 are assumed to be exposure only by infrared light.

Under the condition that there is almost no visible light but only infrared light, the characteristics of the respective filter elements in the color filter 32 differ from each other. Thus, the imaging unit 3 can be considered as a single-color imaging device.

Therefore, in the night-vision mode, the surrounding pixel adding unit 521 in the pre-signal processing unit 52 adds surrounding pixel data to all pixel data in order to improve the sensitivity of infrared light.

More particularly, when the R pixel is the target pixel as shown in item (a) of FIG. 13, the surrounding pixel adding unit 521 adds, to the pixel data for R as the target pixel, the pixel data of the surrounding eight pixels of G (Gr, Gb) and B.

That is, while the pixel data for red is generated from the pixel data obtained from the region corresponding to the red color filter in the light receiving elements in the intermediate mode, the pixel data for red is generated, in the night-vision mode, from the pixel data obtained from a wider region than the region in the intermediate mode. The respective examples shown in items (a) to (d) of FIG. 13 use the pixel data obtained from the region of the nine pixels including the target pixel.

When the Gr pixel is the target pixel as shown in item (b) of FIG. 13, the surrounding pixel adding unit 521 adds, to the pixel data for Gr as the target pixel, the pixel data of the surrounding eight pixels of R, Gb and B. When the Gb pixel is the target pixel as shown in item (c) of FIG. 13, the surrounding pixel adding unit 521 adds, to the pixel data for Gb as the target pixel, the pixel data of the surrounding eight pixels of R, Gr and B.

That is, while the pixel data for green is generated from the pixel data obtained from the region corresponding to the green color filter in the light receiving elements in the intermediate mode, the pixel data for green is generated, in the night-vision mode, from the pixel data obtained from a wider region than the region in the intermediate mode.

When the B pixel is a target pixel as shown in item (d) of FIG. 13, the surrounding pixel adding unit 521 adds, to the pixel data for B as the target pixel, the pixel data of the surrounding eight pixels of R and G.

That is, while the pixel data for blue is generated from the pixel data obtained from the region corresponding to the blue color filter in the light receiving elements in the intermediate mode, the pixel data for blue is generated, in the night-vision mode, from the pixel data obtained from a wider region than the region in the intermediate mode.

The surrounding pixel adding unit 521 may simply add the pixel data of the nine pixels together including the target pixel and the surrounding eight pixels, or may add, to the pixel data of the target pixel, the pixel data of the surrounding eight pixels after being subjected to particular weighting processing.

An example of the weighting processing performed on the pixel data of the surrounding pixels is explained below. As is apparent from FIG. 3 or FIG. 32 described below, R, G and B show the same sensitivity at the wavelength IR2 assigned to G light and the wavelength IR3 assigned to B light.

Therefore, when the pixel of G or B is the target pixel as shown in items (b) to (d) of FIG. 13, and the surrounding pixel adding unit 521 adds the pixel data of the surrounding eight pixels without weighting processing to the pixel data for G or B, the sensitivity is increased by approximately 9 times.

On the other hand, R, G and B greatly differ in sensitivity at the wavelength IR1 assigned to R light, as is apparent from FIG. 3 or FIG. 32 described below.

Thus, when the pixel of R is the target pixel as shown in item (a) of FIG. 13, and the surrounding pixel adding unit 521 adds the pixel data of the surrounding eight pixels without weighting processing to the pixel data for R, the sensitivity is increased, not by 9 times, but by a smaller multiple.

Therefore, the color balance is lost if the surrounding pixel adding unit 521 adds the pixel data of the surrounding eight pixels without weighting processing to the pixel data of the target pixel since the R signal and the G or B signal differ in sensitivity.

Accordingly, the surrounding pixel adding unit 521 preferably adds, to the pixel data of the target pixel, the pixel data of the surrounding eight pixels after being subjected to the weighting processing. The surrounding pixel adding unit 521 preferably performs the weighting processing differently between the case where the pixel of R is the target pixel and the case where the pixel of G or B is the target pixel. The surrounding pixel adding unit 521 may perform the weighting processing differently between the case where the pixel of G is the target pixel and the case where the pixel of B is the target pixel.

FIG. 14 shows a first example of the weighting processing. The numbers indicated below the respective pixels of R, Gb, Gr and B shown in FIG. 14 are weighting coefficients.

The ratio of the spectral sensitivities of R, G and B of the imaging unit 3 is set to R:G:B=1:0.8:0.5 at the wavelength IR1, and set to R:G:B=1:1:1 at the wavelengths IR2 and IR3. The basic weighting coefficients are set to, for example, the target pixel:the vertical-horizontal pixels:the diagonal pixels=100:70:50.

In such a case, when the pixel of Gr, Gb or B is the target pixel as shown in FIG. 14, the pixel data of the surrounding eight pixels may be multiplied by the basic weighting coefficients.

When the pixel of R is the target pixel, as the infrared light with the wavelength IR1 is projected, it is preferable to use the weighting coefficients within the ratio of the spectral sensitivities of R, G and B described above. At the wavelength IR1, the spectral sensitivity of R/the spectral sensitivity of G, which is 1/0.8, is 1.25, and the spectral sensitivity of R/the spectral sensitivity of B, which is 1/0.5, is 2.0.

Accordingly, when the pixel of R is the target pixel as shown in FIG. 14, the weighting coefficient of 87, which is obtained by 70×1.25, is preferably used for the vertical-horizontal pixel data for G, and the weighting coefficient of 100, which is obtained by 50×2.0, is preferably used for the diagonal pixel data for B.

The ratio of the spectral sensitivities of R, G and B of the imaging unit 3 varies depending on the type of the imaging element 31 used or a manufacturer which manufactures the device. The weighting coefficients are preferably determined depending on the type of the imaging element 31 to be used.

FIG. 15 shows a second example of the weighting processing. The ratio of the spectral sensitivities of R, G and B of the imaging unit 3 is set to R:G:B=1:0.08:0.5 at the wavelength IR1, set to R:G:B=1:1:1: at the wavelength IR2, and set to R:G:B=1:0.95:1 at the wavelength IR3. The basic weighting coefficients are the same as those in the first example.

As shown in FIG. 15, when the pixel of Gr or Gb is the target pixel, the pixel data of the surrounding eight pixels may be multiplied by the basic weighting coefficients.

When the pixel of R is the target pixel, it is preferable to use the weighting coefficients within the ratio of the spectral sensitivities of R, G and B as in the case of the first example. As shown in FIG. 15, when the pixel of R is the target pixel, the weighting coefficients are the same as those in the first example.

When the pixel of B is the target pixel, as the infrared light with the wavelength IR3 is projected, it is preferable to use the weighting coefficients within the ratio of the spectral sensitivities of R, G and B described above. At the wavelength IR3, the spectral sensitivity of B/the spectral sensitivity of G, which is 1/0.95, is 1.05.

Accordingly, when the pixel of B is the target pixel as shown in FIG. 15, the weighting coefficient of 73, which is obtained by 70×1.05, is preferably used for the vertical-horizontal pixel data for G. The weighting coefficient for the pixel data for R may be the basic weighting coefficient of 50.

Some of the weighting coefficients for the pixel data of the surrounding eight pixels may be zero. In other words, the surrounding pixel adding unit 521 does not necessarily add all of the pixel data of the surrounding eight pixels to the pixel data of the target pixel.

For example, the surrounding pixel adding unit 521 does not necessarily add the pixel data of the diagonal pixels but may only add the pixel data of the vertical and horizontal pixels to the pixel data of the target pixel.

FIG. 16 shows a third example of the weighting processing, in which the weighting coefficient for the diagonal pixels is zero. The basic weighting coefficients are set to, for example, the target pixel:the vertical-horizontal pixels:the diagonal pixels=100:50:0.

The ratio of the spectral sensitivities of R, G and B of the imaging unit 3 is conceived to be the same as that in the first example. As shown in FIG. 16, when the pixel of R is the target pixel, the weighting coefficient of 62, which is obtained by 50×1.25, is preferably used for the vertical-horizontal pixel data for G.

The values of the weighting coefficients shown in FIG. 14 to FIG. 16 are merely examples for ease of recognition of the weighting processing performed on the surrounding pixels. Actual weighting coefficients may be determined as appropriate in view of a dynamic range of image signals output from the image output unit 6 or the like.

Here, there is a known imaging element capable of reading out a plurality of pixels as a single pixel, which is called binning. When the imaging element possessing the binning function is used as the imaging element 31, the adding processing may be performed not by the surrounding pixel adding unit 521 but by the imaging element with this binning function. The binning processing by the imaging element is substantially equivalent to the adding processing by the surrounding pixel adding unit 521.

Figure 17:
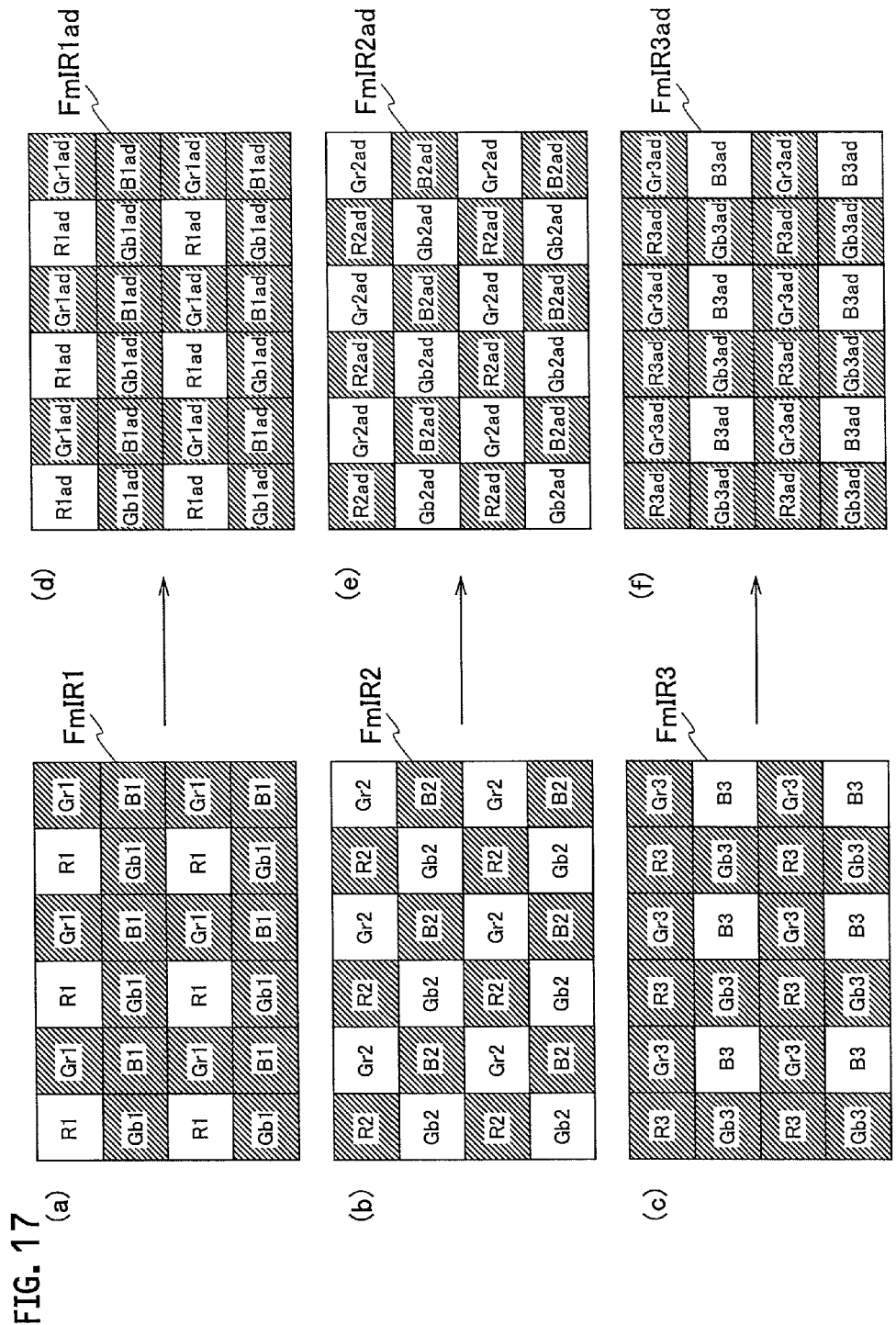
FIG. 17 is a view showing frames on which the processing of adding the surrounding pixels is performed.

The frame FmIR1, the frame FmIR3, and the frame FmIR2 shown in items (a) to (c) of FIG. 17 are the same as the frame FmIR1, the frame FmIR3, and the frame FmIR2 shown in items (a) to (c) of FIG. 9, respectively. In items (d) to (f) of FIG. 17, each of added pixel data R1ad, Gr1ad, Gb1ad, B1ad, R2ad, Gr2ad, Gb2ad, B2ad, R3ad, Gr3ad, Gb3ad and B3ad is obtained in a manner such that the pixel data of the surrounding eight pixels are added to the pixel data for each of R, Gr, Gb, and B.

The surrounding pixel adding unit 521 subjects the pixel data in each of the frames FmIR1, FmIR3 and FmIR2 to adding processing shown in FIG. 13 so as to generate frame FmIR1ad, frame FmIR2ad and frame FmIR3ad shown in items (d) to (f) of FIG. 17.

Figure 18:
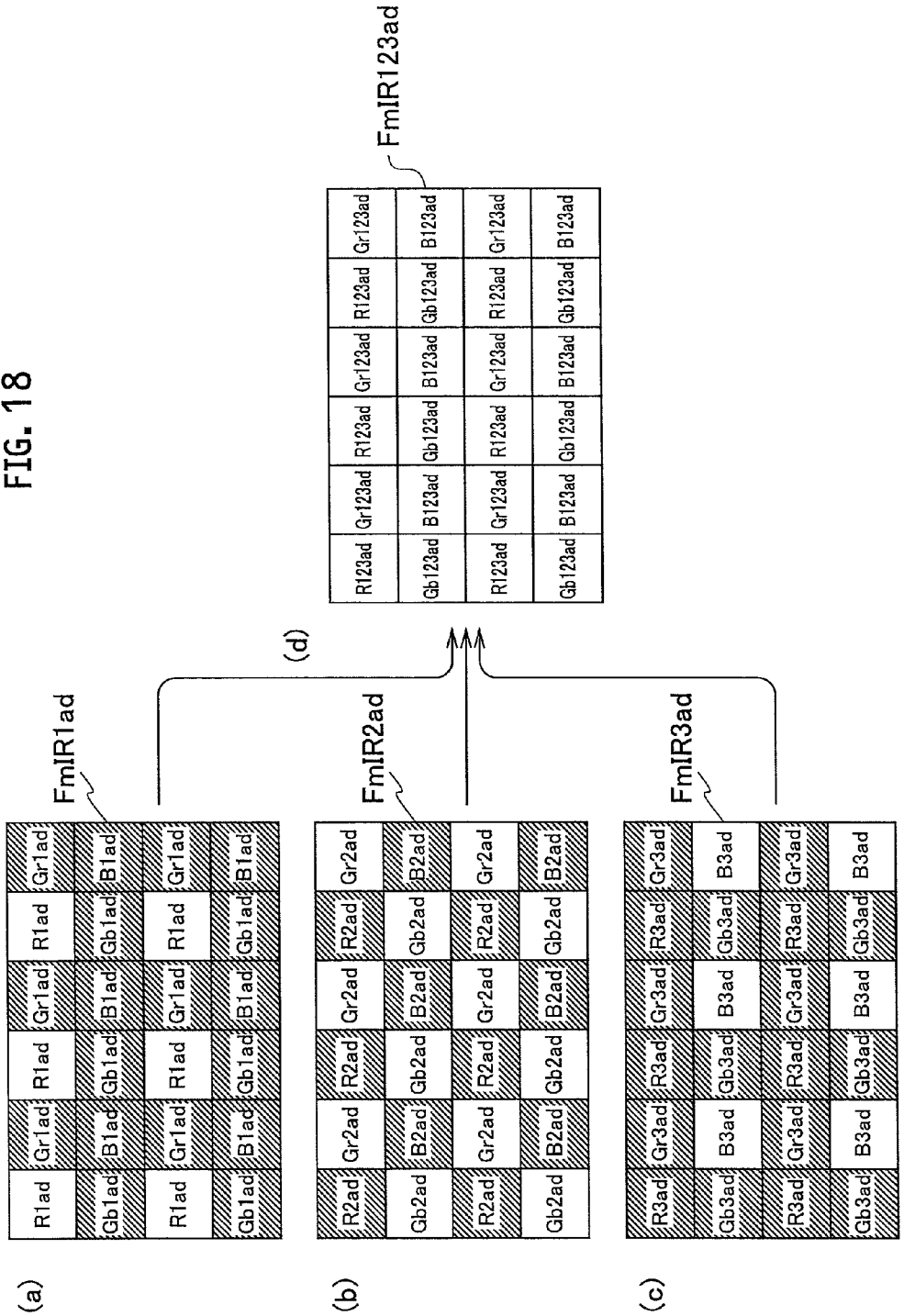
FIG. 18 is a view for explaining pre-signal processing when the imaging device of the embodiment is operating in a first night-vision mode.

The frames FmIR1ad, FmIR2ad and FmIR3ad shown in items (a) to (c) of FIG. 18 are the same as the frames FmIR1ad, FmIR2ad and FmIR3ad shown in items (d) to (f) of FIG. 17, respectively.

As in the case of the first intermediate mode, the same-position pixel adding unit 522 adds, to the pixel data R1ad located in the frame FmIR1ad, the pixel data R2ad and R3ad located at the same pixel positions in the respective frames FmIR2ad and FmIR3ad so as to generate added pixel data R123ad according to the formula (1).

The same-position pixel adding unit 522 adds, to the pixel data Gr2ad, Gb2ad located in the frame FmIR2ad, the pixel data Gr1ad, Gb1ad, Gr3ad, and Gb3ad located at the same pixel positions in the respective frames FmIR1ad and FmIR3ad so as to generate added pixel data Gr123ad and Gb123ad according to the formula (2).

The same-position pixel adding unit 522 adds, to the pixel data B3ad located in the frame FmIR3ad, the pixel data B1ad and B2ad located at the same pixel positions in the respective frames FmIR1ad and FmIR2ad so as to generate added pixel data B123ad according to the formula (3).

As in the case of the first intermediate mode, the synthesizing unit 523 selects the added pixel data R123ad in the frame FmIR1ad, the added pixel data Gr123ad and Gb123ad in the frame FmIR2ad and the added pixel data B123ad in FmIR3ad and synthesizes the respective added pixel data. The synthesizing unit 523 thus generates frame FmIR123ad of the synthesized image signals shown in item (d) of FIG. 18.

The synthesizing unit 523 generates the frame FmIR123ad in which the respective added pixel data R123ad, Gr123ad, Gb123ad and B123ad are arranged so as to have the same array as the filter elements in the color filter 32.

Figure 19:
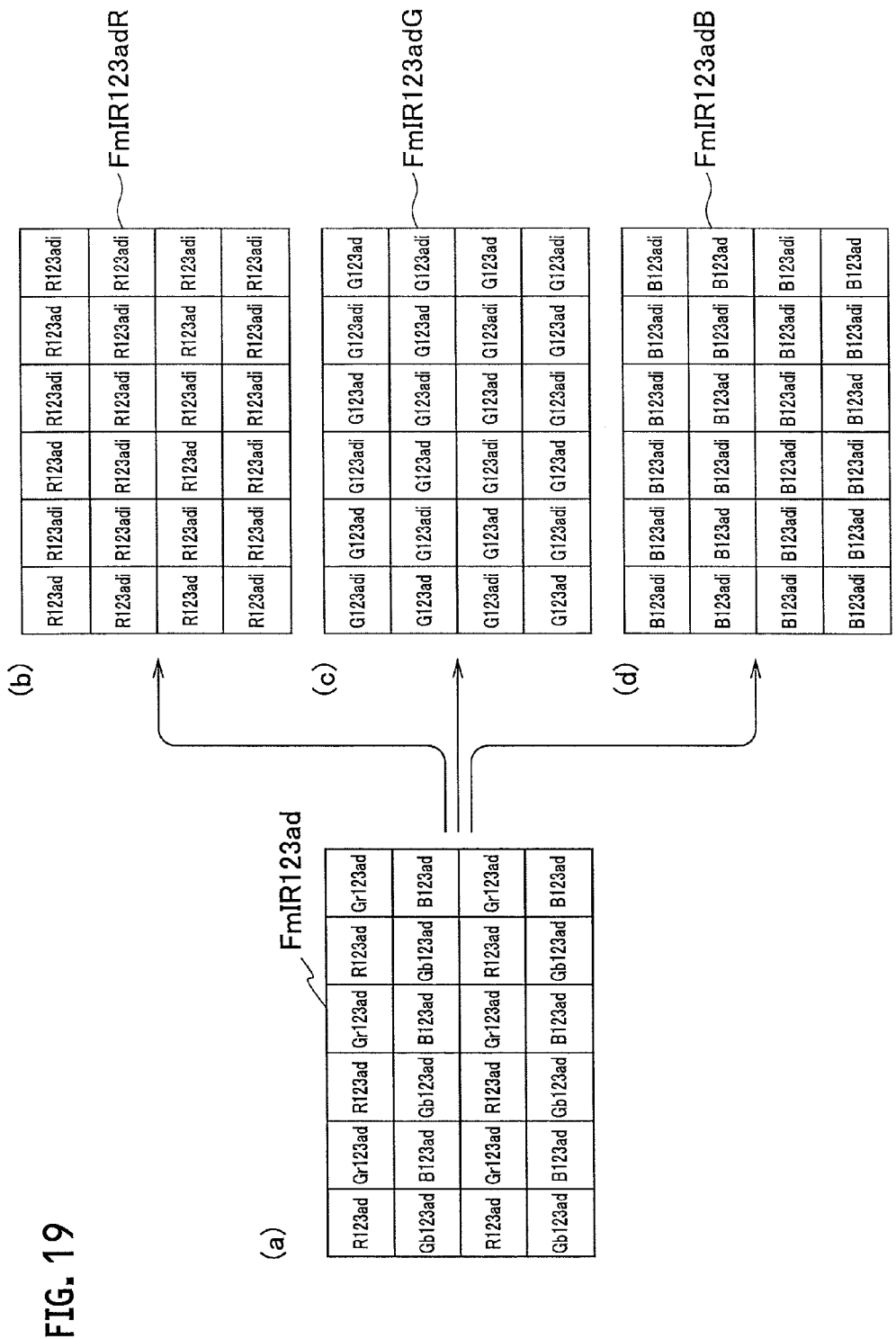
FIG. 19 is a view for explaining demosaicing when the imaging device of the embodiment is operating in the first night-vision mode.

Item (a) of FIG. 19 shows the frame FmIR123ad. The demosaicing unit 54 computes pixel data for R for pixel positions where no pixel data for R is present by use of the surrounding pixel data for R so as to generate interpolated pixel data R123adi for R. The demosaicing unit 54 generates R frame FmIR123adR in which all pixels in one frame shown in item (b) of FIG. 19 are composed of the pixel data for R.

The demosaicing unit 54 computes pixel data for G for pixel positions where no pixel data for G is present by use of the surrounding pixel data for G so as to generate interpolated pixel data G123adi for G. The demosaicing unit 54 generates G frame FmIR123adG in which all pixels in one frame shown in item (c) of FIG. 19 are composed of the pixel data for G.

The demosaicing unit 54 computes pixel data for B for pixel positions where no pixel data for B is present by use of the surrounding pixel data for B so as to generate interpolated pixel data B123adi for B. The demosaicing unit 54 generates B frame FmIR123adB in which all pixels in one frame shown in item (d) of FIG. 19 are composed of the pixel data for B.

The first intermediate mode and the first night-vision mode differ from each other in that the surrounding pixel adding unit 521 is inactive in the first intermediate mode, and the surrounding pixel adding unit 521 is active in the first night-vision mode. The mode switching unit 72 is only required to activate the surrounding pixel adding unit 521 when in the night-vision mode.

The operation of the demosaicing unit 54 in the night-vision mode is substantially the same as that in the normal mode and in the intermediate mode. The normal mode, the intermediate mode and the night-vision mode may share the signal processing unit such as the demosaicing unit 54 in the image processing unit 5.

<Night-Vision Mode: Second Night-Vision Mode>

Figure 20:
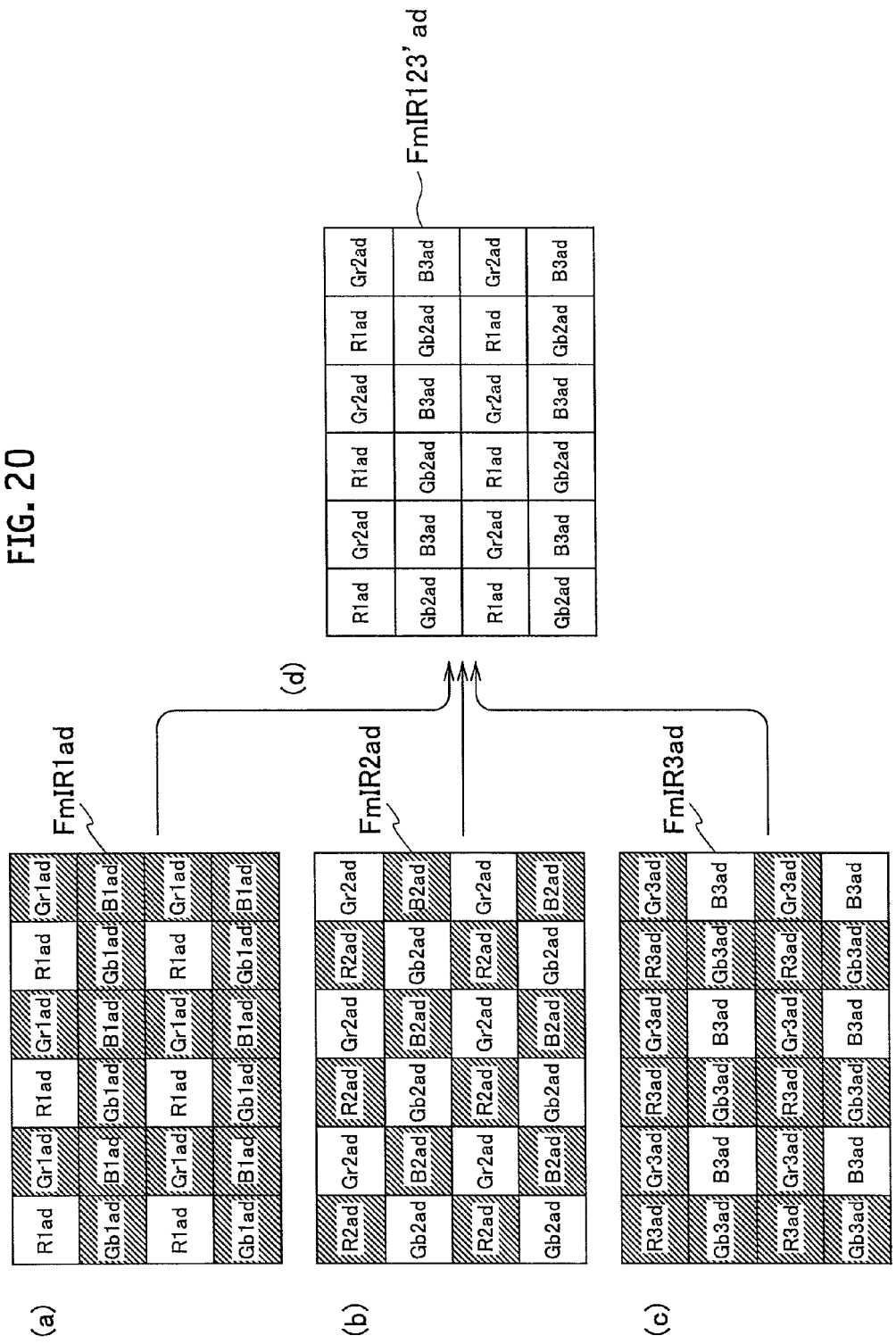
FIG. 20 is a view for explaining pre-signal processing when the imaging device of the embodiment is operating in a second night-vision mode.
Figure 21:
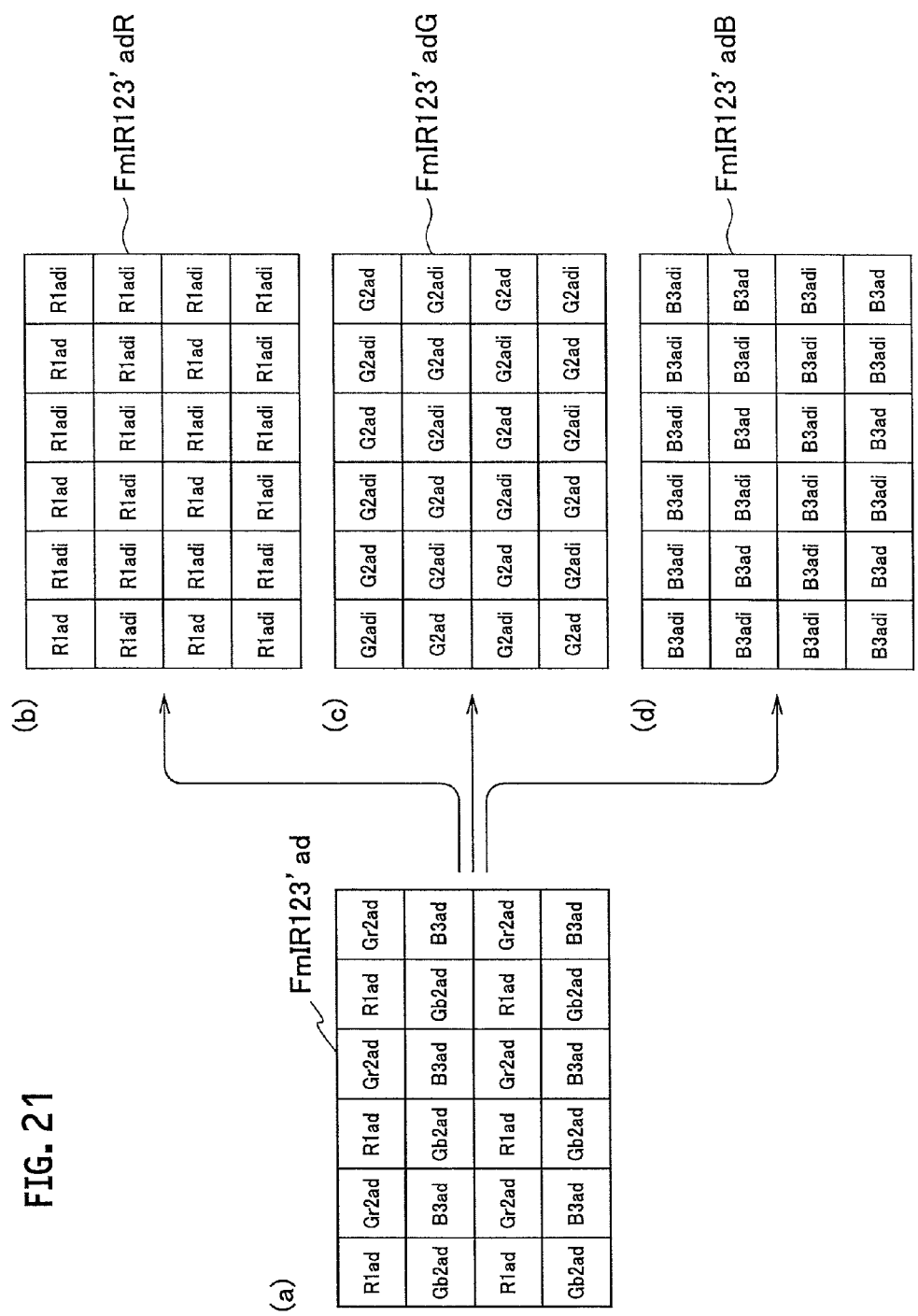
FIG. 21 is a view for explaining demosaicing when the imaging device of the embodiment is operating in the second night-vision mode.

Operations in the second night-vision mode are explained below with reference to FIG. 20 and FIG. 21. Note that the same operations as those in the first night-vision mode are not repeated in the second night-vision mode. Here, the frames FmIR1*ad*, FmIR2*ad* and FmIR3*ad* shown in items (a) to (c) in FIG. 20 are the same as the frames FmIR1*ad*, FmIR2*ad* and FmIR3*ad* shown in items (a) to (c) in FIG. 18.

The synthesizing unit 523 selects pixel data R1*ad* for R in the frame FmIR1*ad*, pixel data Gr2*ad* and Gb2*ad* for G in the frame FmIR2*ad*, and pixel data B3*ad* for B in FmIR3*ad* and synthesizes the respective pixel data. The synthesizing unit 523 thus generates frame FmIR123'*ad* of the synthesized image signals shown in item (d) of FIG. 20.

The synthesizing unit 523 generates the frame FmIR123'*ad* in which the respective pixel data R1*ad*, Gr2*ad*, Gb2*ad* and B3*ad* are arranged so as to have the same array as the filter elements in the color filter 32.

As explained with reference to FIG. 13, the pixel data R1*ad* for red in the frame FmIR123'*ad* is generated from the pixel data obtained from a wider region than the region used for generating the pixel data for red when in the intermediate mode.

The pixel data Gr2*ad* for green in the frame FmIR123'*ad* is generated from the pixel data obtained from a wider region than the region used for generating the pixel data for green when in the intermediate mode.

The pixel data B3*ad* for blue in the frame FmIR123'*ad* is generated from the pixel data obtained from a wider region than the region used for generating the pixel data for blue when in the intermediate mode.

As in the case of the second intermediate mode, the same-position pixel adding unit 522 in the second night-vision mode defines the coefficient ka in the formula (1) as 1 and the other coefficients kb and kc as 0, defines the coefficient ke in the formula (2) as 1 and the other coefficients kd and kf as 0, and defines the coefficient ki in the formula (3) as 1 and the other coefficients kg and kh as 0.

Therefore, the value of the pixel data R1*ad* in the frame FmIR1*ad*, the values of the pixel data Gr2*ad* and Gb2*ad* in the frame FmIR2*ad* and the value of the pixel data B3*ad* in the frame FmIR3*ad* each remain as is.

Accordingly, the synthesizing unit 523 can generate the frame FmIR123'*ad* by selecting the pixel data R1*ad* in the frame FmIR1*ad*, the pixel data Gr2*ad* and Gb2*ad* in the frame FmIR2*ad* and pixel data B3*ad* in the frame FmIR3*ad*, in the same manner as the operations in the first night-vision mode.

The demosaicing in the demosaicing unit 54 is explained below with reference to FIG. 21. Item (a) of FIG. 21 shows the frame FmIR123'*ad*. The demosaicing unit 54 computes pixel data for R for pixel positions where no pixel data for R is present by use of the surrounding pixel data R1*ad* so as to generate interpolated pixel data R1*adi* for R. The demosaicing unit 54 generates R frame FmIR123'*ad*R in which all pixels in one frame shown in item (b) of FIG. 21 are composed of the pixel data for R.

The demosaicing unit 54 computes pixel data for G for pixel positions where no pixel data for G is present by use of the surrounding pixel data Gr2*ad* and Gb2*ad* so as to generate interpolated pixel data G2*adi* for G. The demosaicing unit 54 generates G frame FmIR123'*ad*G in which all pixels in one frame shown in item (c) of FIG. 21 are composed of the pixel data for G.

The demosaicing unit 54 computes pixel data for B for pixel positions where no pixel data for B is present by use of the surrounding pixel data B3*ad* so as to generate interpolated pixel data B3*adi* for B. The demosaicing unit 54 generates B frame FmIR123'*ad*B in which all pixels in one frame shown in item (d) of FIG. 21 are composed of the pixel data for B.

The second intermediate mode and the second night-vision mode differ from each other in that the surrounding pixel adding unit 521 is inactive in the second intermediate mode, and the surrounding pixel adding unit 521 is active in the second night-vision mode.

While the pixel data for each color is generated from the pixel data obtained from the region corresponding to each color filter in the light receiving elements in the intermediate mode, the pixel data for each color is generated, in the night-vision mode, from the pixel data obtained from a wider region than the region used for generating the pixel data for each color in the intermediate mode, as the surrounding pixels are added in the night-vision mode.

<Example of Mode Switch>

An example of the mode switch by the mode switching unit 72 is explained below with reference to FIG. 22. Item (a) of FIG. 22 is an example schematically showing a state of change in environmental brightness with the passage of time from daytime to nighttime.

As shown in item (a) of FIG. 22, the brightness decreases gradually with the passage of time from daytime to nighttime and results in almost total darkness after time t3. Item (a) of FIG. 22 shows the brightness representing the substantial amount of visible light and indicates that almost no visible light is present after time t3.

The controller 7 can determine the environmental brightness based on a brightness level of image signals (image data) input from the image processing unit 5. As shown item (b) of FIG. 22, the mode switching unit 72 selects the normal mode when the brightness is predetermined threshold Th1 (first threshold) or greater, selects the intermediate mode when the brightness is less than the threshold Th1 and predetermined threshold Th2 (second threshold) or greater, and selects the night-vision mode when the brightness is less than the threshold Th2.

The imaging device according to the present embodiment automatically switches the modes in such a manner as to select the normal mode by time t1 at which the brightness reaches the threshold Th1, select the intermediate mode in the period from time t1 to time t2 at which the brightness reaches the threshold Th2, and select the night-vision mode after time t2. In item (b) of FIG. 22, the intermediate mode may be either the first intermediate mode or the second intermediate mode, and the night-vision mode may be either the first night-vision mode or the second night-vision mode.

Although the brightness immediately before time t3 at which almost no visible light remains is defined as the threshold Th2 in item (a) of FIG. 22, the brightness at time t3 may be determined as the threshold Th2.

As shown in item (c) of FIG. 22, the mode switching unit 72 may divide the intermediate mode into two periods: a first half period toward time t1 as the first intermediate mode in which the amount of visible light is relatively high; and a second half period toward time t2 as the second intermediate mode in which the amount of visible light is relatively low. In item (c) of FIG. 22, the night-vision mode may be either the first night-vision mode or the second night-vision mode.

In the imaging device according to the present embodiment, the projection controller 71 controls the ON/OFF state of the infrared projector 9, and the mode switching unit 72 switches the respective members in the image processing unit 5 between the active state and the inactive state, so as to implement the respective modes.

As shown in FIG. 23, the normal mode is a state where the infrared projector 9 is turned OFF, the surrounding pixel adding unit 521, the same-position pixel adding unit 522 and the synthesizing unit 523 are inactive, and the demosaicing unit 54 is active.

The first intermediate mode is implemented in a state where the infrared projector 9 is turned ON, the surrounding pixel adding unit 521 is inactive, and the same-position pixel adding unit 522, the synthesizing unit 523 and the demosaicing unit 54 are active. The second intermediate mode is implemented in a state where the infrared projector 9 is turned ON, the surrounding pixel adding unit 521 and the same-position pixel adding unit 522 are inactive, and the synthesizing unit 523 and the demosaicing unit 54 are active.

The same-position pixel adding unit 522 can be easily switched between the active state and the inactive state by appropriately setting the coefficients ka to ki in the formulae (1) to (3) as described above.

The first night-vision mode is implemented in a state where the infrared projector 9 is turned ON, and the surrounding pixel adding unit 521, the same-position pixel adding unit 522, the synthesizing unit 523 and the demosaicing unit 54 are all active. The second night-vision mode is implemented in a state where the infrared projector 9 is turned ON, the same-position pixel adding unit 522 is inactive, and the surrounding pixel adding unit 521, the synthesizing unit 523 and the demosaicing unit 54 are active.

Here, the surrounding pixel adding unit 521 can be activated for the processing of adding the surrounding pixels by setting the coefficient to more than 0 (for example, 1) by which the surrounding pixel data is multiplied in the calculation formula for adding the surrounding pixel data to the pixel data of the target pixel.

The surrounding pixel adding unit 521 can be inactivated for the processing of adding the surrounding pixels by setting the coefficient to 0 by which the surrounding pixel data is multiplied in the calculation formula.

The surrounding pixel adding unit 521 thus can also be easily switched between the active state and the inactive state by setting the coefficients as appropriate.

<First Modified Example of Imaging Device>

The method of detecting the environmental brightness by the controller 7 is not limited to the method based on the brightness level of the image signals.

Figure 24:
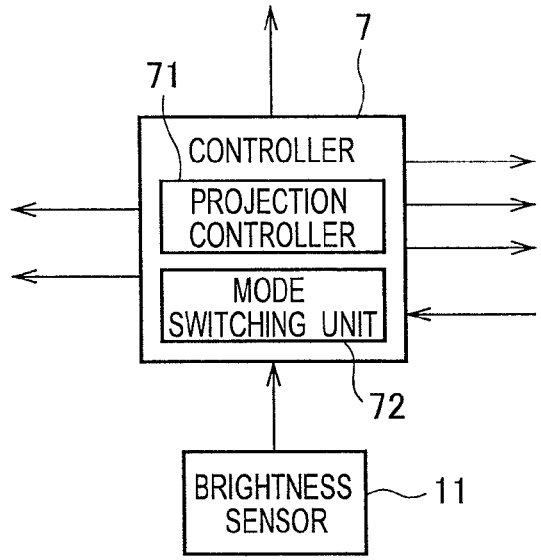
FIG. 24 is a partial block diagram showing a first modified example of the imaging device of the embodiment.

As shown in FIG. 24, the environmental brightness may be detected by a brightness sensor 11. In FIG. 24, the environmental brightness may be determined based on both the brightness level of the image signals and the environmental brightness detected by the brightness sensor 11.

<Second Modified Example of Imaging Device>

The controller 7 may briefly estimate the environmental brightness based on the season (date) and the time (time zone) during a year, instead of the direct detection of the environmental brightness, so that the mode switching unit 72 switches the modes.

Figure 25:
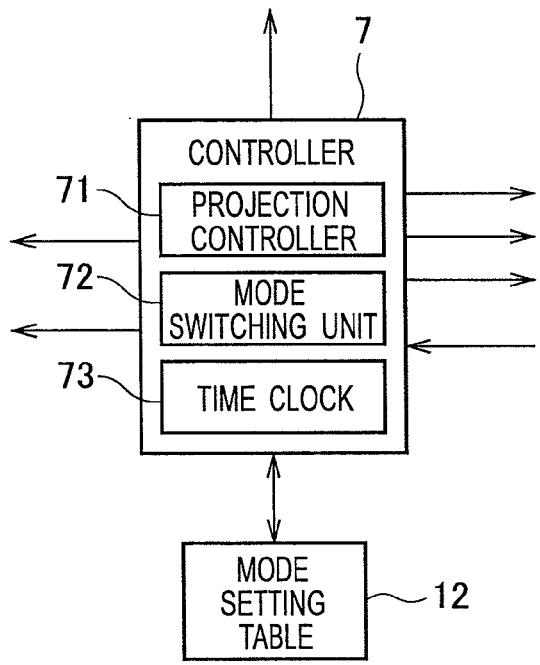
FIG. 25 is a partial block diagram showing a second modified example of the imaging device of the embodiment.

As shown in FIG. 25, the normal mode, the intermediate mode and the night-vision mode are set in a mode setting table 12 depending on the combination of the date and time. A time clock 73 in the controller 7 manages the date and the time. The controller 7 refers to the date and the time indicated on the time clock 73 to read out the mode set in the mode setting table 12.

The projection controller 71 and the mode switching unit 72 control the imaging device so that the mode read from the mode setting table 12 is selected.

<Third Modified Example of Imaging Device>

Figure 26:
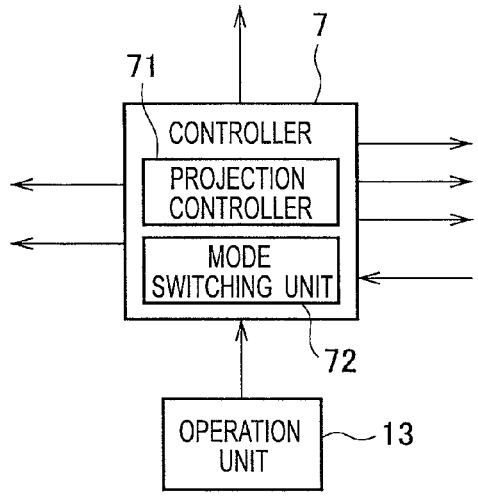
FIG. 26 is a partial block diagram showing a third modified example of the imaging device of the embodiment.

As shown in FIG. 26, a user may control the imaging device with an operation unit 13 by manually selecting one of the modes so as to set the projection controller 71 and the mode switching unit 72 to the selected mode. The operation unit 13 may be operated using operation buttons provided on the casing of the imaging device or by a remote controller.

<Image Signal Processing Method Regarding Mode Switch>

The image signal processing method regarding the mode switch executed by the imaging device shown in FIG. 1 is again explained with reference to FIG. 27.

Figure 27:
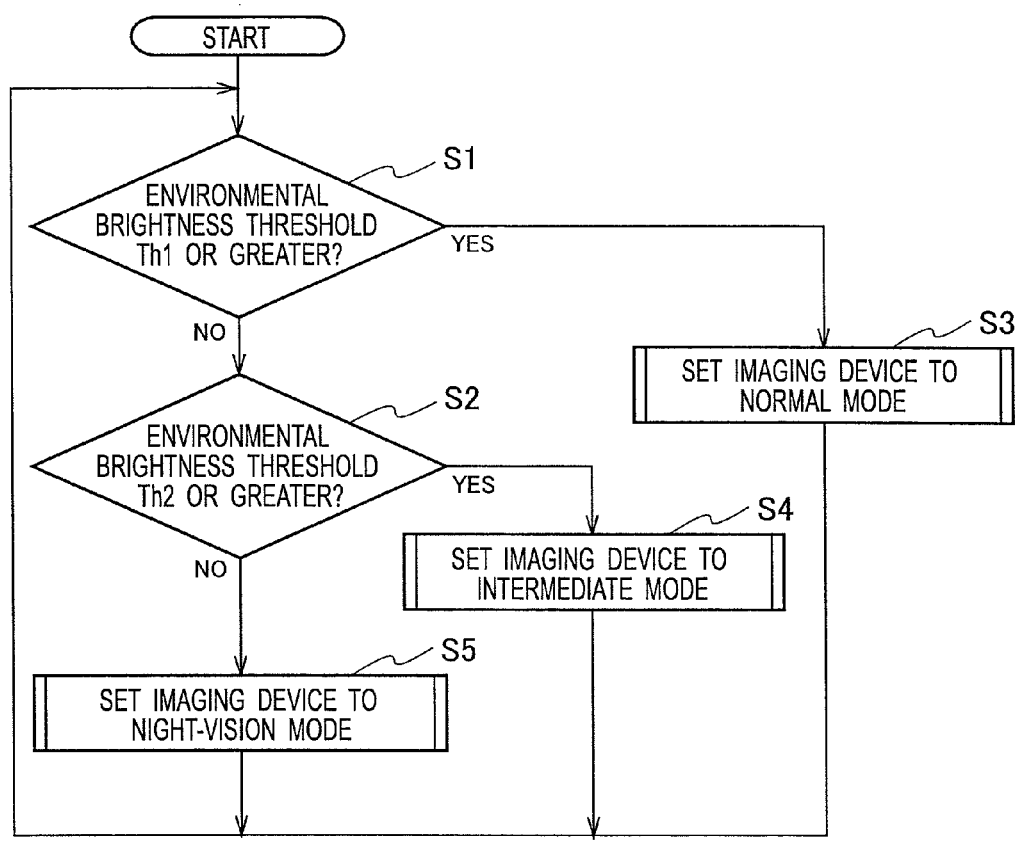
FIG. 27 is a flowchart showing an image signal processing method with regard to the mode switch.

In FIG. 27, once the imaging device starts operating, the controller 7 determines whether the environmental brightness is the threshold Th1 or greater in step S1. When the environmental brightness is the threshold Th1 or greater (YES), the controller 7 executes the processing in the normal mode in step S3. When the environmental brightness is not the threshold Th1 or greater (NO), the controller 7 determines whether the environmental brightness is threshold Th2 or greater in step S2.

When the environmental brightness is the threshold Th2 or greater (YES), the controller 7 executes the processing in the intermediate mode in step S4. When the environmental brightness is not the threshold Th2 or greater (NO), the controller 7 executes the processing in the night-vision mode in step S5.

The controller 7 returns to the processing in step S1 after executing the processing from steps S3 to S5 and repeats the respective following steps.

Figure 28:
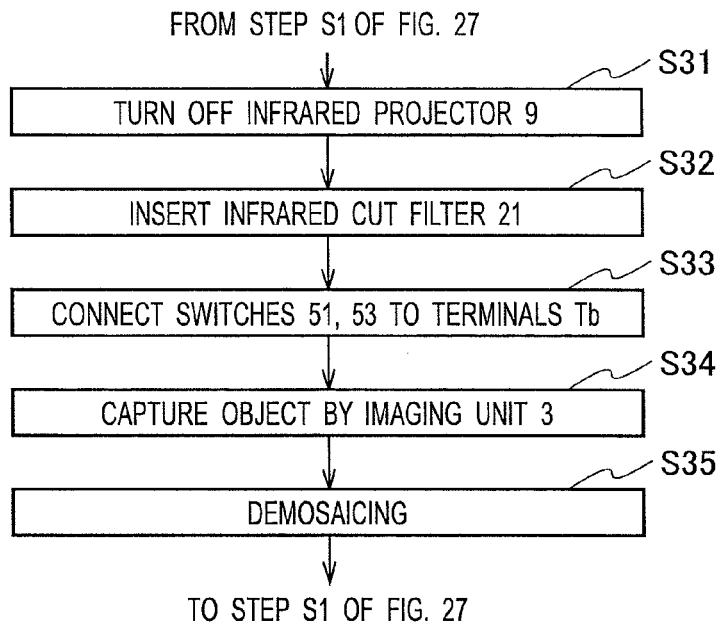
FIG. 28 is a flowchart showing a specific processing step in the normal mode shown in step S3 of FIG. 27.

FIG. 28 shows the specific processing in the normal mode in step S3. In FIG. 28, the controller 7 (the projection controller 71) turns off the infrared projector 9 in step S31. The controller 7 inserts the infrared cut filter 21 in step S32. The controller 7 (the mode switching unit 72) connects the switches 51 and 53 to the respective terminals Tb in step S33. The execution order from steps S31 to S33 is optional. The steps S31 to S33 can be executed simultaneously.

The controller 7 directs the imaging unit 3 to image an object in step S34. The controller 7 controls the image processing unit 5 in step S35 so that the demosaicing unit 54 subjects, to demosaicing, a frame composing image signals generated when the imaging unit 3 images the object.

Figure 29:
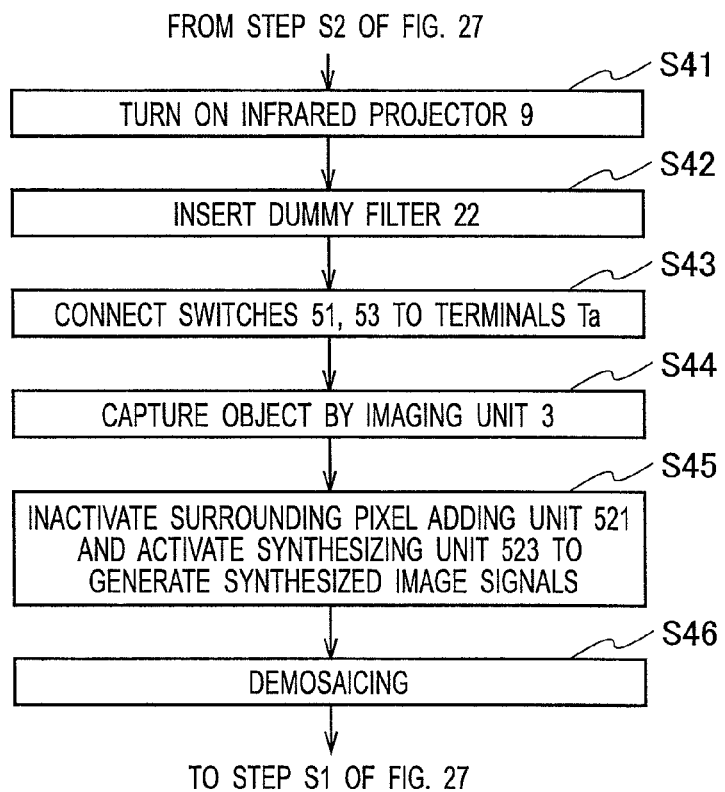
FIG. 29 is a flowchart showing a specific processing step in the intermediate mode shown in step S4 of FIG. 27.

FIG. 29 shows the specific processing in the intermediate mode in step S4. In FIG. 29, the controller 7 (the projection controller 71) turns on the infrared projector 9 in step S41 so that the projecting portions 91 to 93 project infrared light with the respective wavelengths IR1 to IR3 in a time division manner.

The controller 7 inserts the dummy glass 22 in step S42. The controller 7 (the mode switching unit 72) connects the switches 51 and 53 to the respective terminals Ta in step S43. The execution order from steps S41 to S43 is optional. The steps S41 to S43 may be executed simultaneously.

The controller 7 directs the imaging unit 3 to image an object in step S44. The imaging unit 3 images the object in a state where the infrared light with the wavelength IR1 assigned to R, the infrared light with the wavelength IR2 assigned to G and the infrared light with the wavelength IR3 assigned to B, are each projected.

The controller 7 (the mode switching unit 72) controls the pre-signal processing unit 52 in step S45 so as to inactivate the surrounding pixel adding unit 521 and activate the synthesizing unit 523 to generate synthesized image signals.

The respective frames composing the image signals generated when the imaging unit 3 images the object in the state where the infrared light with the respective wavelengths IR1, IR2 and IR3 is projected, are defined as a first frame, a second frame, and a third frame.

The synthesizing unit 523 arranges the pixel data for the three primary colors based on the pixel data for R in the first frame, the pixel data for G in the second frame and the pixel data for B in the third frame so as to have the same array as the filter elements in the color filter 32. The synthesizing unit 523 thus generates the synthesized image signals in a manner such that the image signals in the first to third frames are synthesized in one frame.

The controller 7 controls the image processing unit 5 in step S46 so that the demosaicing unit 54 subjects the frame composing the synthesized image signals to demosaicing.

The demosaicing unit 54 executes, based on the frame of the synthesized image signals, demosaicing for generating an R frame, a G frame and a B frame so as to sequentially generate the frames of the three primary colors subjected to demosaicing.

The demosaicing unit 54 can generate the R frame by interpolating the pixel data for R in the pixel positions where no pixel data for R is present. The demosaicing unit 54 can generate the G frame by interpolating the pixel data for G in the pixel positions where no pixel data for G is present. The demosaicing unit 54 can generate the B frame by interpolating the pixel data for B in the pixel positions where no pixel data for B is present.

When executing the operations in the first intermediate mode, the controller 7 activates the same-position pixel adding unit 522 in step S45. When executing the operations in the second intermediate mode, the controller 7 inactivates the same-position pixel adding unit 522 in step S45.

Figure 30:
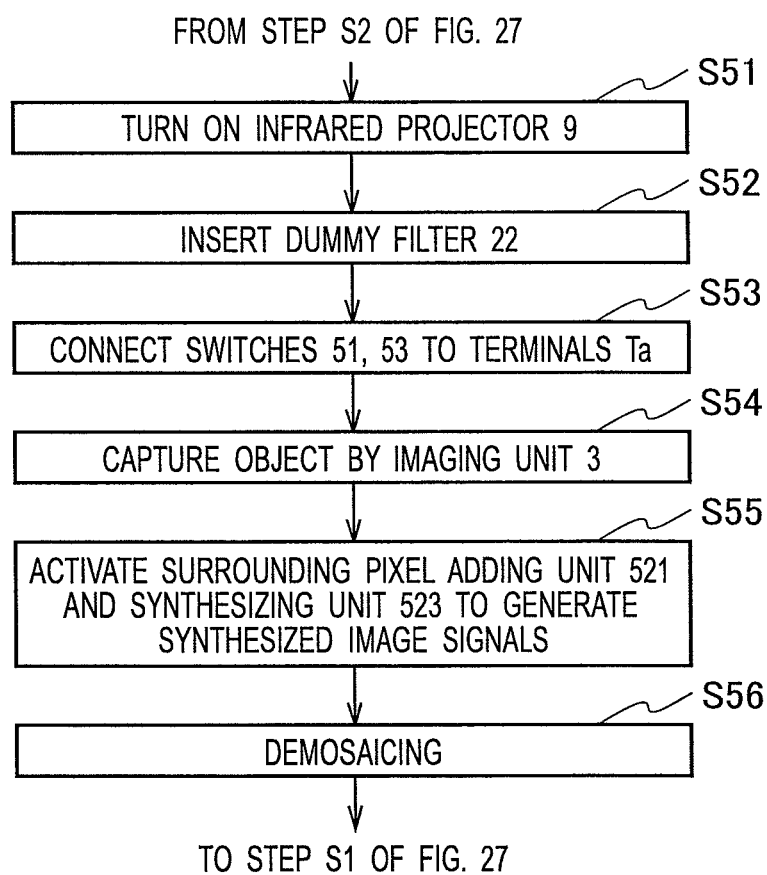
FIG. 30 is a flowchart showing a specific processing step in the night-vision mode shown in step S5 of FIG. 27.

FIG. 30 shows the specific processing in the night-vision mode in step S5. In FIG. 30, the controller 7 (the projection controller 71) turns on the infrared projector 9 in step S51 so that the projecting portions 91 to 93 project infrared light with the respective wavelengths IR1 to IR3 in a time division manner.

The controller 7 inserts the dummy glass 22 in step S52. The controller 7 (the mode switching unit 72) connects the switches 51 and 53 to the respective terminals Ta in step S53. The execution order from steps S51 to S53 is optional. The steps S51 to S53 may be executed simultaneously.

The controller 7 directs the imaging unit 3 to image an object in step S54. The controller 7 (the mode switching unit 72) controls the pre-signal processing unit 52 in step S55 so as to activate the surrounding pixel adding unit 521 and the synthesizing unit 523 to generate synthesized image signals.

The controller 7 controls the image processing unit 5 in step S56 so that the demosaicing unit 54 subjects the frame composing the synthesized image signals to demosaicing.

When executing the operations in the first night-vision mode, the controller 7 activates the same-position pixel adding unit 522 in step S55. When executing the operations in the second night-vision mode, the controller 7 inactivates the same-position pixel adding unit 522 in step S55.

<Image Signal Processing Program Regarding Mode Switch>

In FIG. 1, the controller 7 or the integrated portion of the image processing unit 5 and the controller 7 may be composed of a computer (microcomputer), and an image signal processing program (computer program) may be executed by the computer so as to implement the same operations as those in the imaging device described above. The integrated portion may further include the image output unit 6 so as to be composed of the computer.

Figure 31:
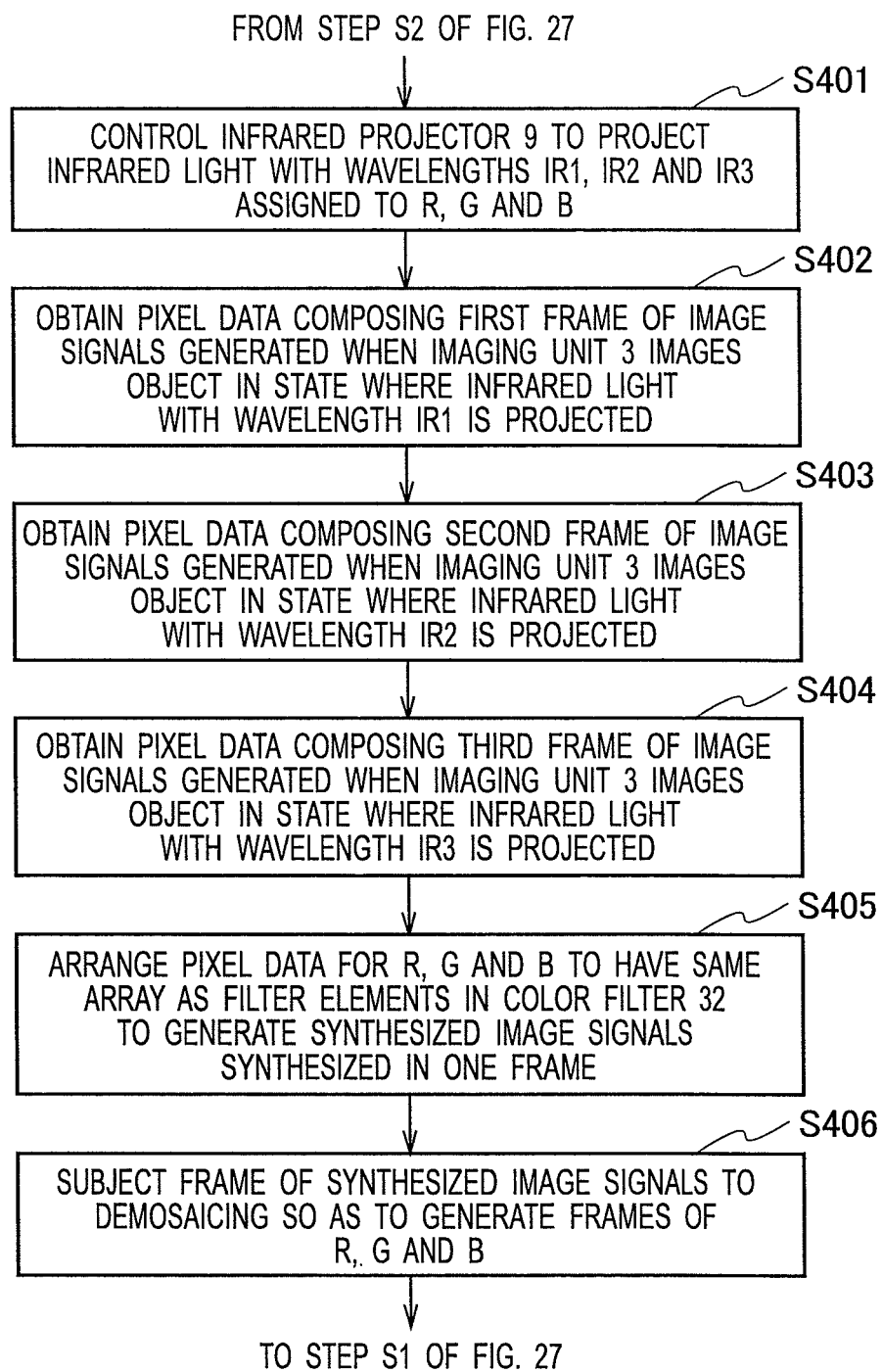
FIG. 31 is a flowchart showing steps of processing executed by a computer directed by an image signal processing program with regard to the mode switch.

An example of a procedure of the processing executed by the computer when the processing in the intermediate mode executed in step S4 shown in FIG. 27 is included in the image signal processing program, is explained below with reference to FIG. 31. FIG. 31 shows the processing executed by the computer directed by the image signal processing program regarding the mode switch.

In FIG. 31, the image signal processing program directs the computer to control the infrared projector 9 in step S401 to project infrared light with the wavelengths IR1, IR2 and IR3 assigned to R, G and B, respectively.

The step in step S401 may be executed by an external unit outside of the image signal processing program. In FIG. 31, the step of inserting the dummy glass 22 is omitted. The step of inserting the dummy glass 22 may be executed by the external unit outside of the image signal processing program.

The image signal processing program directs the computer in step S402 to obtain the pixel data composing the first frame of the image signals generated when the imaging unit 3 images the object in the state where the infrared light with the wavelength IR1 is projected.

The image signal processing program directs the computer in step S403 to obtain the pixel data composing the second frame of the image signals generated when the imaging unit 3 images the object in the state where the infrared light with the wavelength IR2 is projected.

The image signal processing program directs the computer in step S404 to obtain the pixel data composing the third frame of the image signals generated when the imaging unit 3 images the object in the state where the infrared light with the wavelength IR3 is projected. The execution order from steps S402 to 404 is optional.

The image signal processing program directs the computer in step S405 to arrange the respective pixel data for R, G and B in such a manner as to have the same array as the filter elements in the color filter 32 so as to generate the synthesized image signals synthesized in one frame.

In the intermediate mode, the image signal processing program does not direct the computer to execute the processing of adding the surrounding pixels in step S405.

The image signal processing program directs the computer in step S406 to subject the frame of the synthesized image signals to demosaicing so as to generate the frames of R, G and B.

Although not illustrated in the drawing, the image signal processing program may direct the computer to execute the processing of adding the surrounding pixels in step S405 in FIG. 31 when the processing in the night-vision mode executed in step S5 shown in FIG. 27 is included in the image signal processing program.

The image signal processing program may be a computer program recorded in a readable storage medium. The image signal processing program may be provided in a state of being stored in the storage medium, or may be provided via a network such as Internet in a manner such that the image signal processing program is downloaded to the computer. The storage medium readable on the computer may be an arbitrary non-transitory storage medium such as CD-ROM and DVD-ROM.

The imaging device configured as shown in FIG. 1 may include two or more sets of the respective members as necessary so as to execute the intermediate mode and the night-vision mode simultaneously. In such a case, the image output unit 6 may output both the image signals generated in the intermediate mode and the image signals generated in the night-vision mode.

The mode switching unit 72 may switch between a state where the image output unit 6 outputs the image signals generated in the intermediate mode and a state where the image output unit 6 outputs the image signals generated in the night-vision mode. In such a case, the mode switching unit 72 may switch the states depending on the environmental brightness or the time, as described above. In addition, the image processing unit 5 may be provided separately from the other members.

Further, the normal mode may be switched directly to the night-vision mode, or the night-vision mode may be switched directly to the normal mode, bypassing the intermediate mode.

When the intermediate mode is not present, either the normal mode or the night-vision mode may be selected and used even under the condition that the intermediate mode is appropriate. In such a case, although fine color image signals are not obtained as in the case of using the intermediate mode, images can be captured.

Even the imaging device only equipped with the normal mode and the night-vision mode can image objects in variable conditions of environmental brightness, such as a case where a surveillance camera captures objects throughout the day.

Further, the normal mode may be switched to the intermediate mode, and the intermediate mode may be switched to the normal mode, instead of using the night-vision mode. If the night-vision mode is constantly inactive, the night-vision mode may be eliminated from the imaging device.

The night-vision mode is not necessarily used in an area where, for example, electric lighting is equipped. The imaging device only equipped with the normal mode and the intermediate mode may be used in the case where the night-vision mode is not necessarily used.

When the night-vision mode is not present, the intermediate mode may be used even under the condition that the night-vision mode is appropriate. In such a case, although fine color image signals are not obtained as in the case of using the night-vision mode, images can be captured.

Even the imaging device only equipped with the normal mode and the intermediate mode can image objects in variable conditions of environmental brightness, as in the case described above.

<Method of Determining Relationship Between Visible Light Amount and Infrared Light Amount>

As described above, the relationship between the amount of visible light and the amount of infrared light varies depending on the surrounding environment. If the white balance of the image signals is adjusted based on the state where the amount of visible light and the amount of infrared light has a specific relationship, the white balance is lost once the amount of visible light and the amount of infrared light deviate from the specific relationship. In other words, if the relationship between the respective light amounts changes, the color of an object cannot be reproduced in high definition under the respective conditions.

In view of this, the determination unit 78 analyzes the superior-subordinate relationship between the respective light amounts according to a first example or a second example of a determination method described below. First, the spectral sensitive characteristics in the imaging unit 3 described in FIG. 3 are considered with reference to FIG. 32.

As described above, the wavelengths IR1, IR2 and IR3 are set to 780 nm, 940 nm and 870 nm, respectively. As shown in FIG. 32, R sensitivity in the wavelength IR1 assigned to R is defined as Str, G sensitivity in the wavelength IR2 assigned to G is defined as Stg, and B sensitivity in the wavelength IR3 assigned to B is defined as Stb.

Figure 32:
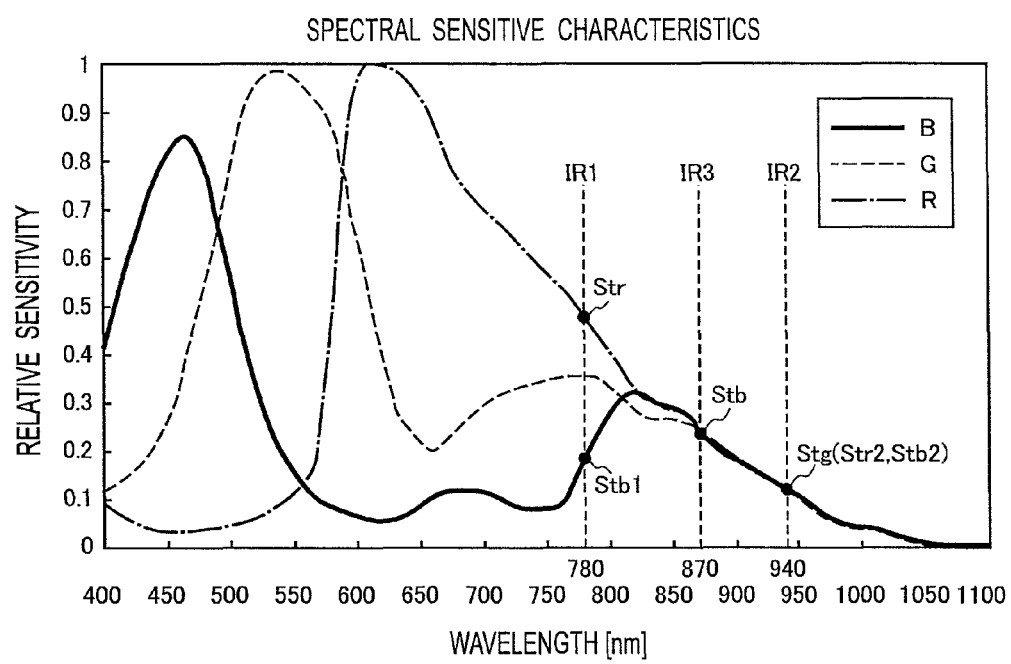
FIG. 32 is a characteristic diagram used for considering the spectral sensitive characteristics shown in FIG. 3.

As is apparent from FIG. 32, the values of Str, Stg and Stb greatly differ from each other. Therefore, when the emission power is constant in the infrared light with the respective wavelengths IR1, IR2 and IR3, the exposure amount of the imaging unit 3 varies depending on which infrared light is projected among the infrared light with the wavelengths IR1, IR2 and IR3.

<First Example of Determination Method>

The first example of the determination method is explained below with reference to FIG. 33 to FIG. 36 and FIG. 38. The infrared light with the wavelengths IR1 to IR3 is conceived to have the same emission power. As the first example, the determination unit 78 analyzes the superior-subordinate relationship between the respective light amounts by comparing the exposure amounts of the imaging unit 3 at least in two periods among the exposure amounts in the state where infrared light with the respective wavelengths IR1, IR2 and IR3 is selectively projected in each of predetermined periods.

Figure 33:
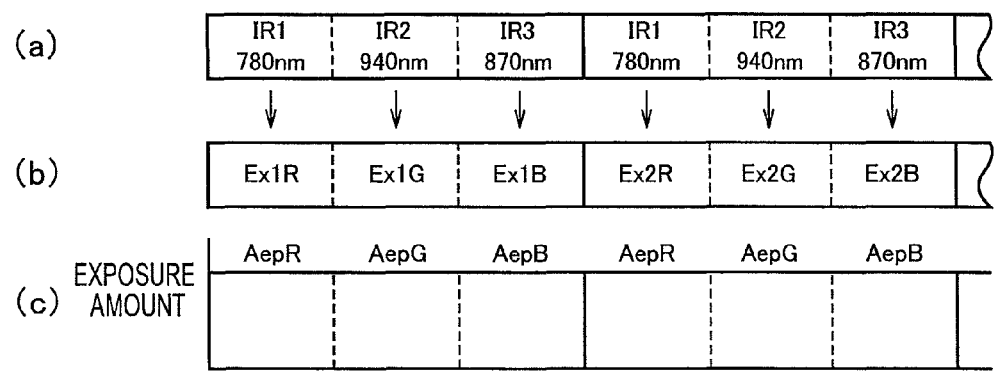
FIG. 33 is a view for explaining exposure amounts when infrared light is radiated in a state where visible light is the predominant light.

FIG. 33 shows a state where the amount of visible light is sufficiently greater than the amount of infrared light and thus the visible light is the predominant light. Items (a) and (b) of FIG. 33 partly show items (a) and (b) of FIG. 8, respectively. The infrared projector 9 selectively projects the infrared light with the respective wavelengths IR1 to IR3 as shown in item (a) of FIG. 33, and the imaging unit 3 emits the light as shown in item (b) of FIG. 33.

The exposure amount in the period in which the infrared light with the wavelength IR1 is projected is defined as AepR, the exposure amount in the period in which the infrared light with the wavelength IR2 is projected is defined as AepG, and the exposure amount in the period in which the infrared light with the wavelength IR3 is projected is defined as AepB.

When the visible light is the predominant light, the exposure amounts of the imaging unit 3 are hardly influenced by the infrared light projected from the infrared projector 9. Therefore, as shown in item (c) of FIG. 33, the exposure amounts AepR, AepG and AepB of the imaging unit 3 are substantially the same, whether the infrared light projected has the wavelength IR1, IR2 or IR3. The exposure amounts AepR, AepG and AepB of the imaging unit 3 are substantially the same in the state where the visible light is the predominant light.

Figure 34:
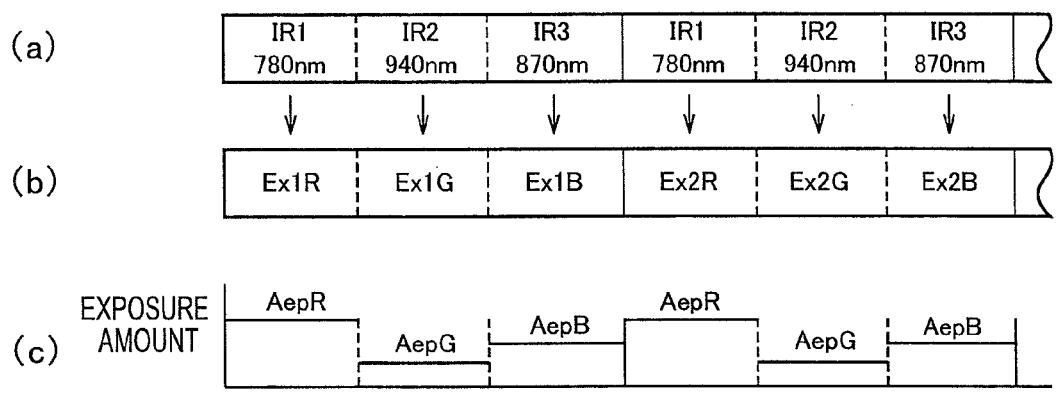
FIG. 34 is a view for explaining exposure amounts when infrared light is radiated in a state where infrared light is the predominant light.

FIG. 34 shows a state where the amount of infrared light is sufficiently greater than the amount of visible light and thus the infrared light is the predominant light. Items (a) and (b) of FIG. 34 are the same as items (a) and (b) of FIG. 33, respectively. When the infrared light is the predominant light, the exposure amounts of the imaging unit 3 are influenced by the infrared light projected from the infrared projector 9.

Therefore, as shown in item (c) of FIG. 34, the exposure amounts AepR, AepG and AepB of the imaging unit 3 differ from each other depending on which infrared light is projected among the infrared light with the wavelengths IR1, IR2 and IR3. The exposure amounts AepR, AepG and AepB fulfill the relationship of AepR>AepB>AepG, which is reflective of the difference among the sensitivities Str, Stg and Stb described in FIG. 32.

As is apparent from the comparison between item (c) of FIG. 33 and item (c) of FIG. 34, the determination unit 78 determines that the visible light is the predominant light when the exposure amounts of the imaging unit 3 are approximately uniform in the three-divided periods in one frame, and that the infrared light is the predominant light when the exposure amounts of the imaging unit 3 differ in the three-divided periods.

More particularly, it can be determined that the visible light is the predominant light when at least two of the exposure amounts AepR, AepG and AepB are compared, and the difference thereof is a predetermined threshold or less, and that the infrared light is the predominant light when the difference thereof exceeds the predetermined threshold. The determination accuracy can be improved by comparing the three exposure amounts AepR, AepG and AepB.

In case of the comparison between two of the exposure amounts AepR, AepG and AepB, the exposure amount AspR and the exposure amount AspG, of which difference is the largest, are preferably compared.

Figure 35:
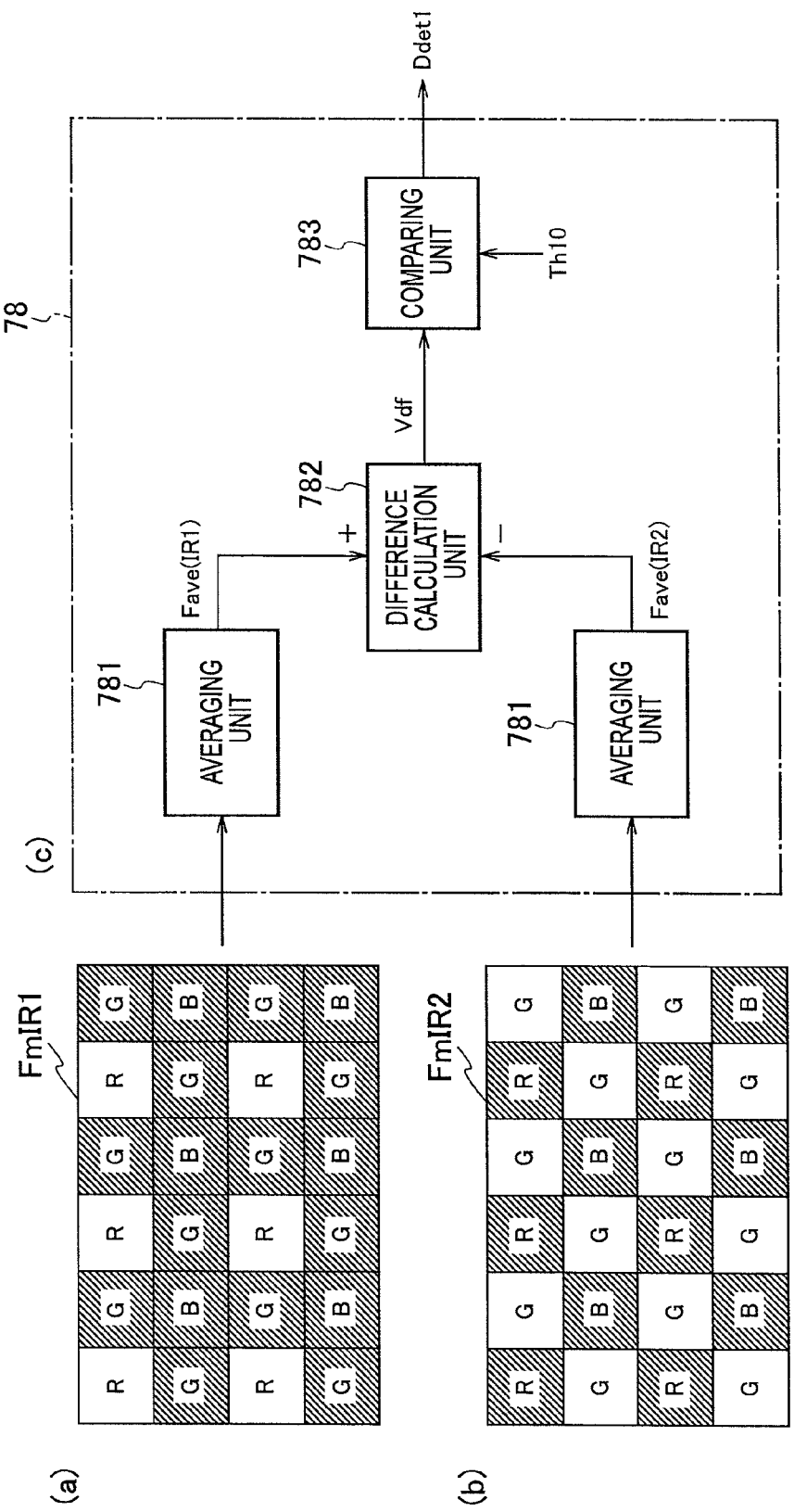
FIG. 35 is a schematic explanatory diagram of a determination unit that implements a first example of a method of determining a relationship between the amount of visible light and the amount of infrared light.

The specific configuration and operation of the determination unit 78 implementing the first example of the determination method are explained in more detail below with reference to FIG. 35. FIG. 35 is a schematic view for explaining how to analyze the superior-subordinate relationship of the light amounts by comparing the exposure amount AspR with the exposure amount AspG.

Item (a) of FIG. 35 is the arbitrary frame FmIR1 of the image data generated at the point where the infrared light with the wavelength IR1 is being projected, as in the case of item (a) of FIG. 9. Item (b) of FIG. 35 is the arbitrary frame FmIR2 of the image data generated at the point where the infrared light with the wavelength IR2 is being projected, as in the case of item (b) of FIG. 9. Note that the pixel data Gr, Gb in FIG. 9 is indicated by G in FIG. 35 to which no index is added.

Item (c) of FIG. 35 is a block diagram schematically showing the determination unit 78 in the first example. As shown in item (c) of FIG. 35, the determination unit 78 includes averaging units 781, a difference calculation unit 782, and a comparing unit 783.

The two averaging units 781 separately show the averaging unit 781 used at the point where the pixel data in the frame FmIR1 is input and the averaging unit 781 used at the point where the pixel data in the frame FmIR2 is input.

The averaging unit 781 averages the pixel data within a predetermined region in the frame FmIR1 to generate average Fave (IR1). The averaging unit 781 averages the pixel data within a predetermined region in the frame FmIR2 to generate average Fave (IR2). The averages Fave (IR1) and Fave (IR2) are input to the difference calculation unit 782.

The predetermined region may be the entire frame, or may be part of the frame such as a central portion excluding the edge portions. The predetermined region may be plural frames. The predetermined region is conceived to be one frame in the following explanation.

The difference calculation unit 782 calculates the difference between the average Fave (IR1) and the average Fave (IR2) to generate difference Vdf. Although not illustrated in the drawing, the difference Vdf is absolutized by an absolute circuit and input into the comparing unit 783.

The comparing unit 783 compares the difference Vdf and threshold Th10 to generate determination data Ddet1, indicating that the visible light is the predominant light when the difference Vdf is equal to or less than the threshold Th10, and that the infrared light is the predominant light when the difference Vdf exceeds the threshold Th10.

The determination data Ddet1 may only include two values: "0" indicated when visible light is the predominant light; and "1" indicated when infrared light is the predominant light. The determination data Ddet1 is input into the color gain controller 79. Here, the determination data Ddet1 may be a value which varies depending on the difference Vdf so as to change the respective color gains depending on the value.

Figure 36:
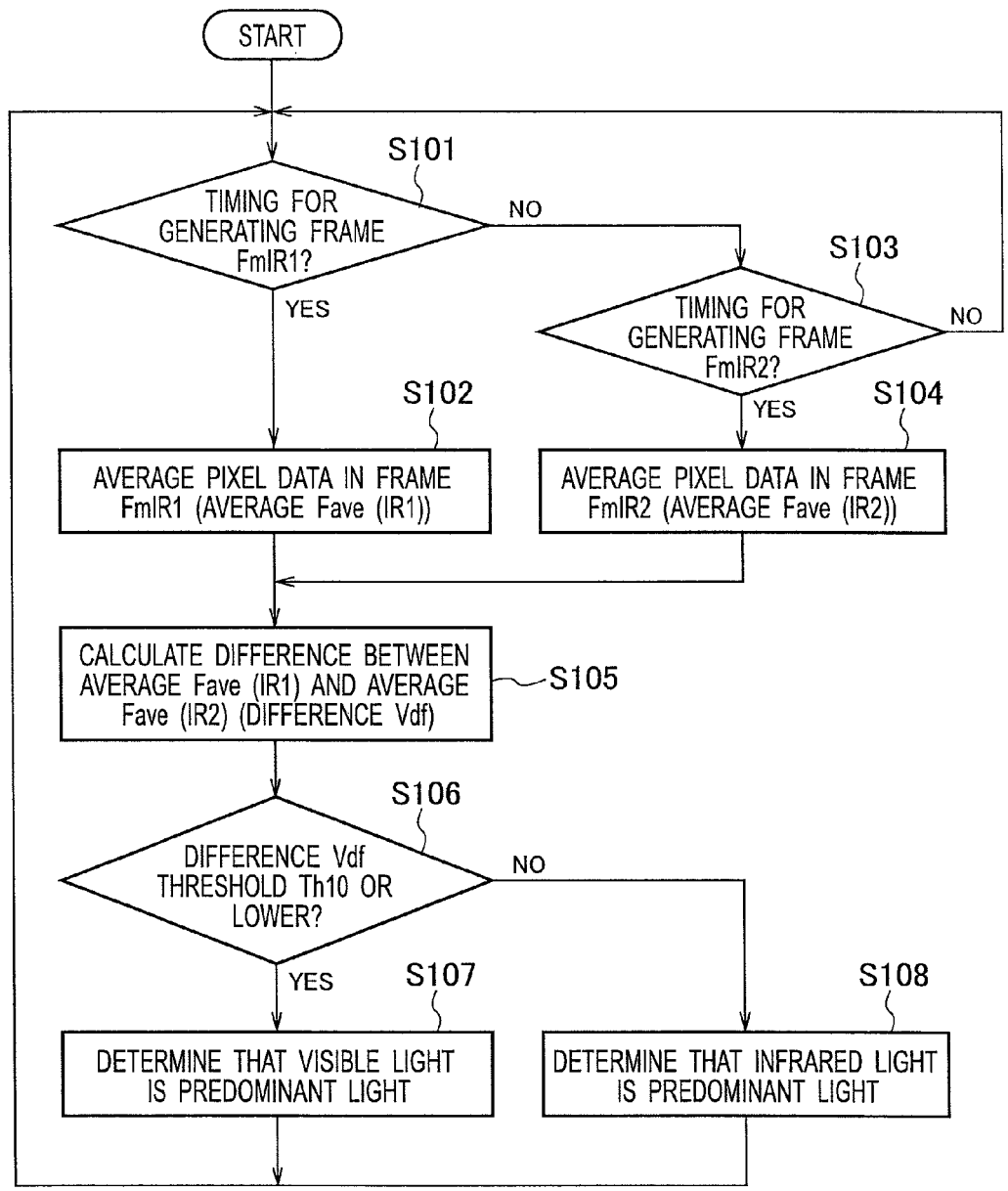
FIG. 36 is a flowchart showing the first example of the determining method.

The operation of the determination unit 78 is explained in more detail below with reference to the flowchart shown in FIG. 36. In FIG. 36, the determination unit 78 determines whether the frame FmIR1 should be generated now in step S101. When determining that the frame FmIR1 should be generated now (YES), the determination unit 78 averages the pixel data in the frame FmIR1 so as to generate the average Fave (IR1) in step S102.

When determining that the frame FmIR1 should not be generated yet (NO), the determination unit 78 then determines in step S103 whether the frame FmIR2 should be generated instead. When determining that the frame FmIR2 should be generated now (YES), the determination unit 78 averages the pixel data in the frame FmIR2 so as to generate the average Fave (IR2) in step S104. When determining that the frame FmIR2 should not be generated yet (NO), the determination unit 78 returns to the processing in step S101.

The determination unit 78 calculates the difference between the average Fave (IR1) and the average Fave (IR2) to generate the difference Vdf in step S105. The determination unit 78 determines whether the difference Vdf is equal to or less than the threshold Th10 in step S106.

When the difference Vdf is equal to or less than the threshold Th10 (YES), the determination unit 78 determines that the visible light is the predominant light in step S107 and returns to the processing in step S101. When the difference Vdf is not equal to or less than the threshold Th10 (NO), the determination unit 78 determines that the infrared light is the predominant light in step S108 and returns to the processing in step S101. The same procedure is repeated subsequently.

In the first example of the determination method described above, the signal levels of the image signals (image data) input into the controller 7, particularly the averages of the pixel signals (pixel data) in the respective frames, are compared so that the exposure amount AepR and the exposure amount AepG are substantially compared.

Figure 37:
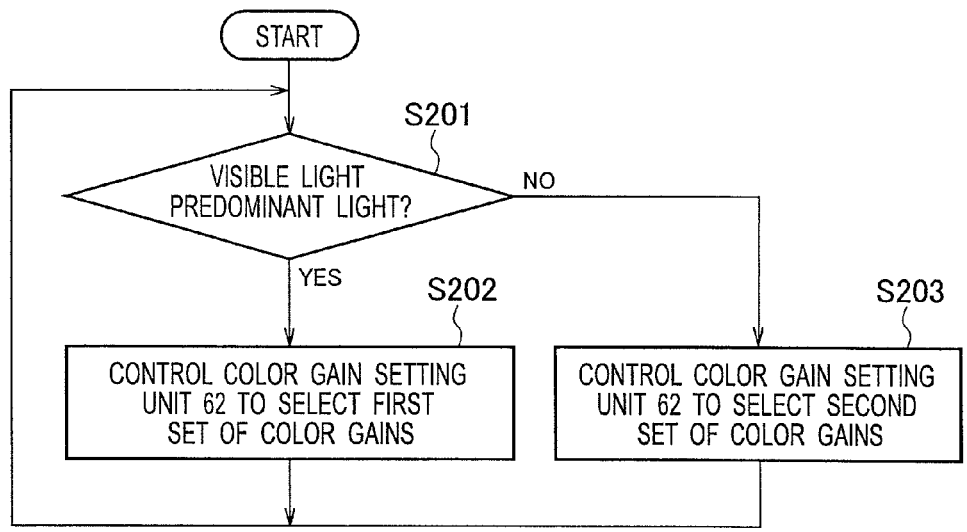
FIG. 37 is a flowchart showing processing in which a color gain controller controls a color gain setting unit based on the determination result.

As shown in FIG. 37, the color gain controller 79 determines whether the visible light is the predominant light based on the input determination data Ddet1 in step S201. When the visible light is the predominant light (YES), the color gain controller 79 controls the color gain setting unit 62 to select the first set of color gains in step S202 and returns to the processing in step S201.

When the visible light is not the predominant light (NO), the color gain controller 79 controls the color gain setting unit 62 to select the second set of color gains in step S203 and returns to the processing in step S201. The same procedure is subsequently repeated.

FIG. 34 and FIG. 35 each show the case where the emission power is constant in the infrared light with the respective wavelengths IR1 to IR3. Alternatively, the superior-subordinate relationship of the light amounts may be analyzed based on the exposure amounts AepR, AepG and AepB in such a manner as to intentionally vary the emission power in each case of the infrared light with the wavelengths IR1 to IR3.

Figure 38:
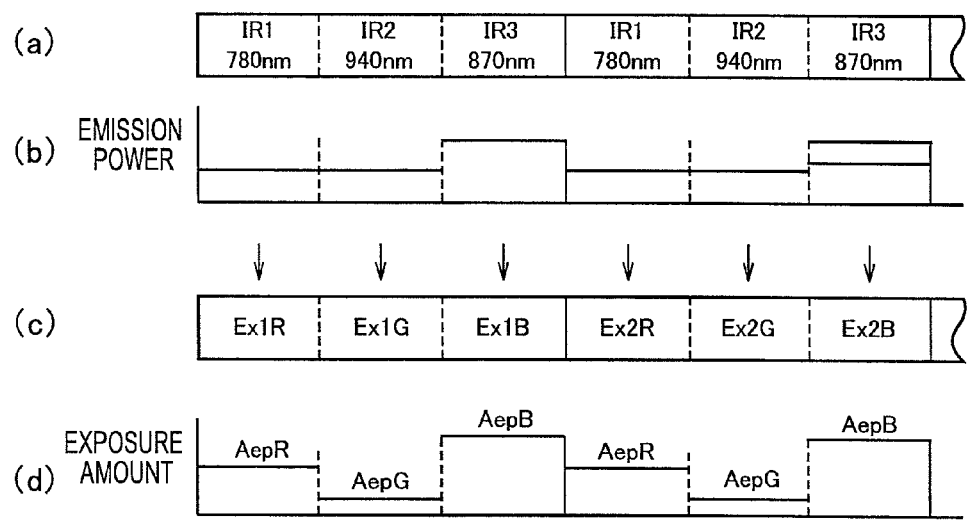
FIG. 38 is a view for explaining exposure amounts when emitting power of part of wavelengths of infrared light is changed in a state where infrared light is the predominant light.

FIG. 38 shows a state where infrared light is the predominant light, as in the case of FIG. 34. Items (a) and (c) of FIG. 38 are the same as items (a) and (b) of FIG. 34, respectively. As shown in item (b) of FIG. 38, for example, the emission power of infrared light with the wavelength IR3 is assumed to be greater than the emission power of infrared light with the wavelengths IR1 and IR2.

Item (d) of FIG. 38 shows the exposure amounts AepR, AepG and AepB in this case. The determination unit 78 may analyze the superior-subordinate relationship of the light amounts by comparing the exposure amount AepR with the exposure amount AepB, or may analyze the superior-subordinate relationship of the light amounts by comparing the exposure amount AepG with the exposure amount AepB. The determination unit 78 may recognize the presence or absence of a particular pattern of the large-small relationship among the exposure amounts AepR, AepG and AepB so as to determine that visible light is the predominant light when there is no particular pattern and determine that infrared light is the predominant light when the particular pattern is confirmed.

<Second Example of Determination Method>

The second example of the determination method is explained below with reference to FIG. 39 to FIG. 40. The infrared light with the respective wavelengths IR1 to IR3 is conceived to have the same emission power. As the second example, the determination unit 78 analyzes the superior-subordinate relationship of the light amounts by using pixel signals based on imaging signals generated in the state where the infrared light with the wavelength IR1 is projected and pixel signals based on imaging signals generated in the state where other infrared light is projected.

The determination unit 78 uses pixel signals of R and pixel signals of G or B. The other infrared light may be either the infrared light with the wavelength IR2 or the infrared light with the wavelength IR3.

As shown in FIG. 32, the sensitivity Str for R greatly differs from the sensitivities for G and B at the wavelength IR1. The difference between the sensitivity Str for R and the sensitivity Stb1 for B is particularly large. The sensitivities Str2 and Stb2 for R and B at the wavelength IR2 are substantially the same as the sensitivity Stg for G, and there is almost no difference therebetween. The difference between the sensitivity Stb for B and the sensitivities for R and G is also insignificant at the wavelength IR3.

In the second example of the determination method, the superior-subordinate relationship of the light amounts is analyzed by use of the difference among the sensitivities for R, G and B at the respective wavelengths IR1 to IR3.

Since the difference between the sensitivity Str for R and the sensitivity Stb1 for B is the largest at the wavelength IR1, the pixel signals of R are preferably compared with the pixel signals of B rather than compared with the pixel signals of G. Therefore, in this example, the determination unit 78 uses the pixel signals of R and the pixel signals of B in the state where the infrared light with the wavelength IR1 is projected.

Although the determination unit 78 may use either the pixel signals of R and B in the state where the infrared light with the wavelength IR2 is projected or the pixel signals of R and B in the state where the infrared light with the wavelength IR3 is projected, in this situation the determination unit 78 uses the former.

The specific configuration and operation of the determination unit 78 implementing the second example of the determination method are explained below with reference to FIG. 39. FIG. 39 is a schematic view for explaining how to analyze the superior-subordinate relationship of the light amounts, as in the case of FIG. 35.

Figure 39:
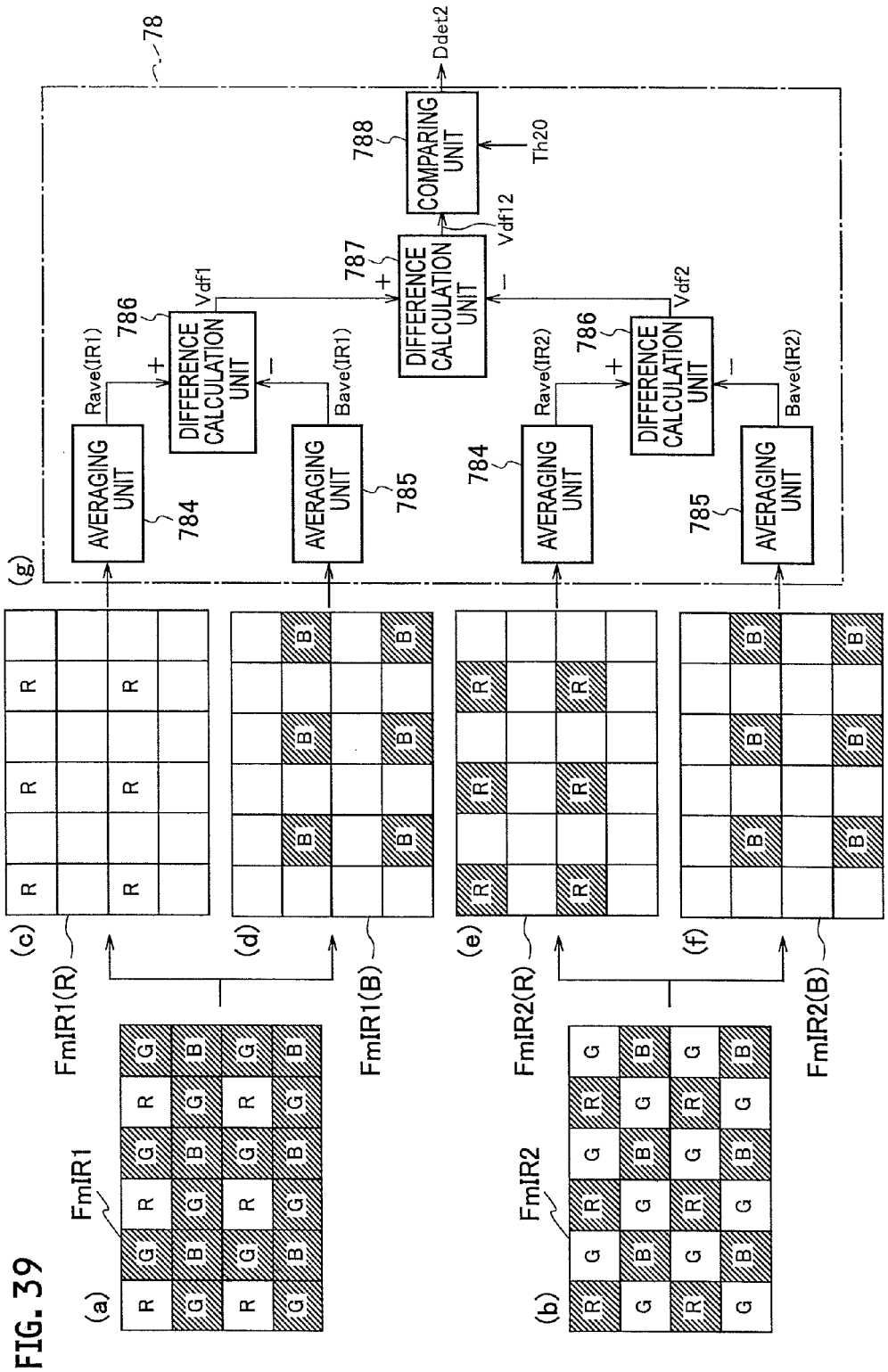
FIG. 39 is a schematic explanatory diagram of the determination unit that implements a second example of the method of determining the relationship between the amount of visible light and the amount of infrared light.

Item (a) of FIG. 39 is the arbitrary frame FmIR1 of the image data generated at the point where the infrared light with the wavelength IR1 is being projected, as in the case of item (a) of FIG. 35. Item (b) of FIG. 39 is the arbitrary frame FmIR2 of the image data generated at the point where the infrared light with the wavelength IR2 is being projected, as in the case of item (b) of FIG. 35.

Item (c) of FIG. 39 schematically shows a state where pixels for R in the frame FmIR1 are only extracted. Item (d) of FIG. 39 schematically shows a state where pixels for B in the frame FmIR1 are only extracted.

Item (e) of FIG. 39 schematically shows a state where pixels for R in the frame FmIR2 are only extracted. Item (f) of FIG. 39 schematically shows a state where pixels for B in the frame FmIR2 are only extracted.

Item (g) of FIG. 39 is a block diagram schematically showing the determination unit 78 in the second example. As shown in item (g) of FIG. 39, the determination unit 78 includes averaging units 784 and 785, difference calculation units 786 and 787, and a comparing unit 788.

The respective two averaging units 784 and 785 separately show the averaging units 784 and 785 used at the point where the pixel data for R and B in the frame FmIR1 are input and the averaging units 784 and 785 used at the point where the pixel data for R and B in the frame FmIR2 are input.

The averaging unit 784 averages the pixel data for R within one frame in the frame FmIR1 to generate average Rave (IR1). The averaging unit 785 averages the pixel data for B within one frame in the frame FmIR1 to generate average Bave (IR1).

The averaging unit 784 averages the pixel data for R within one frame in the frame FmIR2 to generate average Rave (IR2). The averaging unit 785 averages the pixel data for B within one frame in the frame FmIR2 to generate average Bave (IR2).

The timing for generating the averages Rave (IR1) and Rave (IR2) of the pixel data for R may be shifted from the timing for generating the averages Bave (IR1) and Bave (IR2) of the pixel data for B so that only one averaging unit is required. In such a case, the average generated first is temporarily stored.

The averages Rave (IR1) and Bave (IR1) and the averages Rave (IR2) and Bave (IR2) are input into the respective difference calculation units 786. The two difference calculation units 786 separately show the difference calculation unit 786 used at the point where the averages Rave (IR1) and Bave (IR1) are input and the difference calculation unit 786 used at the point where the averages Rave (IR2) and Bave (IR2) are input.

The difference calculation unit 786 calculates the difference between the average Rave (IR1) and the average Bave (IR1) to generate difference Vdf1. The difference calculation unit 786 calculates the difference between the average Rave (IR2) and the average Bave (IR2) to generate difference Vdf2. Although not illustrated in the drawing, the differences Vdf1 and Vdf2 are absolutized by an absolute circuit and input into the difference calculation unit 787.

The difference calculation unit 787 calculates the difference between the difference Vdf1 and the difference Vdf2 to generate difference Vdf12. Although not illustrated in the drawing, the difference Vdf12 is absolutized by an absolute circuit and input into the comparing unit 788.

The comparing unit 788 compares the difference Vdf12 and threshold Th20 to generate determination data Ddet2, indicating that visible light is the predominant light when the difference Vdf12 is equal to or less than the threshold Th20, and that infrared light is the predominant light when the difference Vdf12 exceeds the threshold Th20. The determination data Ddet2 may also only include two values. The determination data Ddet2 is input into the color gain controller 79.

Figure 40:
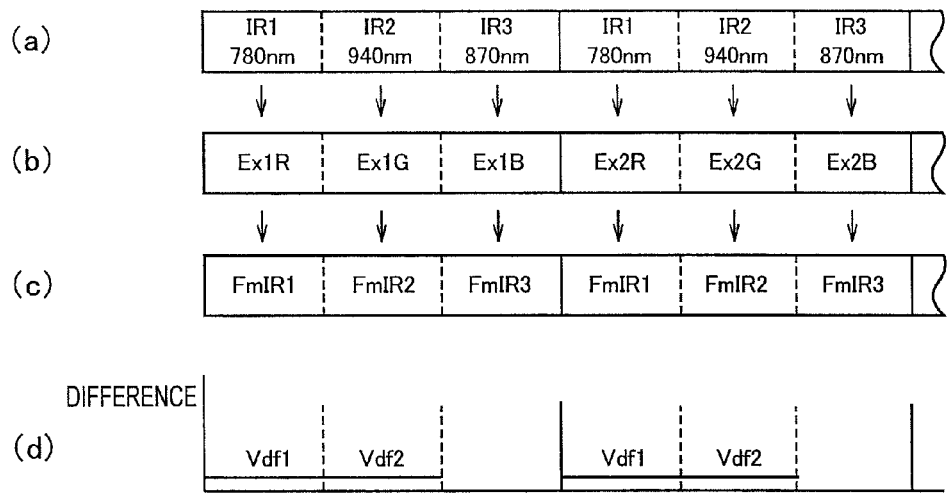
FIG. 40 is a view for explaining a difference generated by the determination unit when infrared light is radiated in a state where visible light is the predominant light.

FIG. 40 shows a state where visible light is the predominant light. Items (a) and (b) of FIG. 40 are the same as items (a) and (b) of FIG. 33, respectively. Item (c) of FIG. 40 shows the frames generated based on the exposures shown in item (b) of FIG. 40. Note that, although timing of the exposures in item (b) of FIG. 40 is shifted from timing of the frames in item (c) of FIG. 40 as described in FIG. 8, FIG. 40 shows a state where the respective positions in the time direction (left-right direction) coincide with each other while the difference of timing is not considered.

As is explained in FIG. 33, the exposure amounts AepR, AepG and AepB of the imaging unit 3 are substantially the same in the state where visible light is the predominant light, and are hardly influenced by the difference among the sensitivities of R, G and B at the respective wavelengths IR1 to IR3.

Therefore, as shown in item (d) of FIG. 40, the difference Vdf1 generated in the timing of the frame FmIR1 has substantially the same value as the difference Vdf2 generated in the timing of the frame FmIR2. Thus, the difference Vdf12 results in a small value.

Item (d) of FIG. 40 shows the respective differences Vdf1 and Vdf2 across the respective frames FmIR1 and FmIR2 for convenience of explanation. The differences Vdf1 and Vdf2 are actually generated at a predetermined point after the pixel data in the frames FmIR1 and FmIR2 are input into the determination unit 78.

Figure 41:
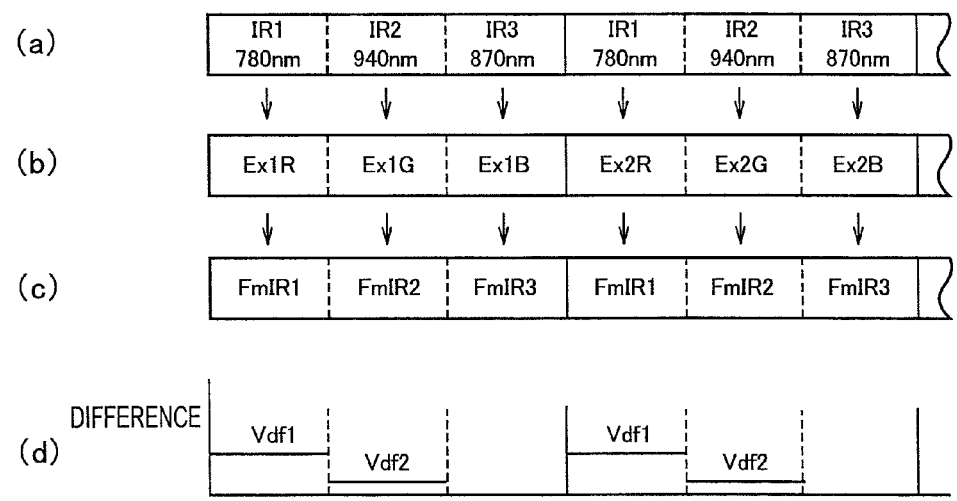
FIG. 41 is a view for explaining a difference generated by the determination unit when infrared light is radiated in a state where infrared light is the predominant light.

FIG. 41 shows a state where infrared light is the predominant light. Items (a) to (c) of FIG. 41 are the same as items (a) to (c) of FIG. 40, respectively. The exposure amounts are influenced by the difference among the sensitivities of R, G and B at the respective wavelengths IR1 to IR3.

Therefore, as shown in item (d) of FIG. 41, the difference Vdf1 generated in the timing of the frame FmIR1 greatly differs from the difference Vdf2 generated in the timing of the frame FmIR2. Thus, the difference Vdf12 results in a large value.

Figure 42:
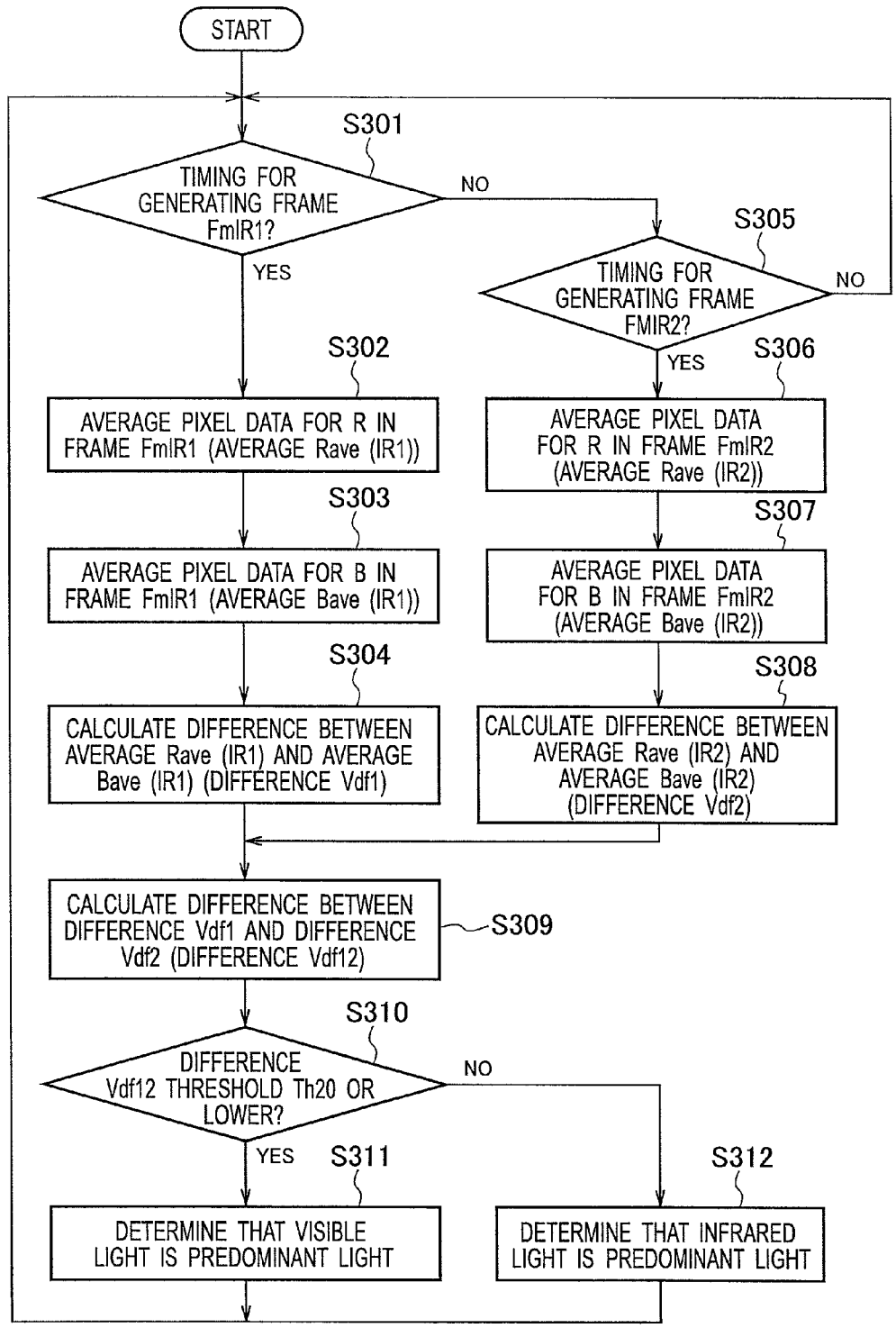
FIG. 42 is a flowchart showing a second example of the determining method.

The operation of the determination unit 78 is explained in detail below with reference to the flowchart shown in FIG. 42. In FIG. 42, the determination unit 78 determines whether the frame FmIR1 should be generated in step S301.

When determining that the frame FmIR1 should be generated now (YES), the determination unit 78 averages the pixel data for R in the frame FmIR1 so as to generate the average Rave (IR1) in step S302. The determination unit 78 then averages the pixel data for B in the frame FmIR1 so as to generate the average Bave (IR1) in step S303.

The determination unit 78 calculates the difference between the average Rave (IR1) and the average Bave (IR1) to generate the difference Vdf1 in step S304.

When determining in step S301 that the frame FmIR1 should not be generated yet (NO), the determination unit 78 then determines in step S305 whether the frame FmIR2 should be generated instead.

When determining that the frame FmIR2 should be generated now (YES), the determination unit 78 averages the pixel data for R in the frame FmIR2 so as to generate the average Rave (IR2) in step S306. The determination unit 78 then averages the pixel data for B in the frame FmIR2 so as to generate the average Bave (IR2) in step S307.

The determination unit 78 calculates the difference between the average Rave (IR2) and the average Bave (IR2) to generate the difference Vdf2 in step S308.

When determining in step S308 that the frame FmIR2 should not be generated yet (NO), the determination unit 78 returns to the processing in step S301.

The determination unit 78 calculates the difference between the difference Vdf1 and the difference Vdf2 to generate the difference Vdf12 in step S309. The determination unit 78 determines whether the difference Vdf12 is equal to or less than the threshold Th20 in step S310.

When the difference Vdf12 is equal to or less than the threshold Th20 (YES), the determination unit 78 determines that the visible light is the predominant light in step S311 and returns to the processing in step S301. When the difference Vdf12 is not equal to or less than the threshold Th20 (NO), the determination unit 78 determines that the infrared light is the predominant light in step S312 and returns to the processing in step S301. The same procedure is subsequently repeated.

The color gain controller 79 determines whether the visible light is the predominant light based on the input determination data Ddet2 in step S201 of FIG. 37.

When the visible light is the predominant light (YES), the color gain controller 79 controls the color gain setting unit 62 to select the first set of color gains in step S202 and returns to the processing in step S201.

When the visible light is not the predominant light (NO), the color gain controller 79 controls the color gain setting unit 62 to select the second set of color gains in step S203 and returns to the processing in step S201. The same procedure is subsequently repeated.

<Image Signal Processing Method Depending on Determination of Superior-Subordinate Relationship of Light Amounts>

The image signal processing method depending on the determination of the superior-subordinate relationship of the light amounts executed by the imaging device shown in FIG. 1 is again explained below with reference to FIG. 43.

Figure 43:
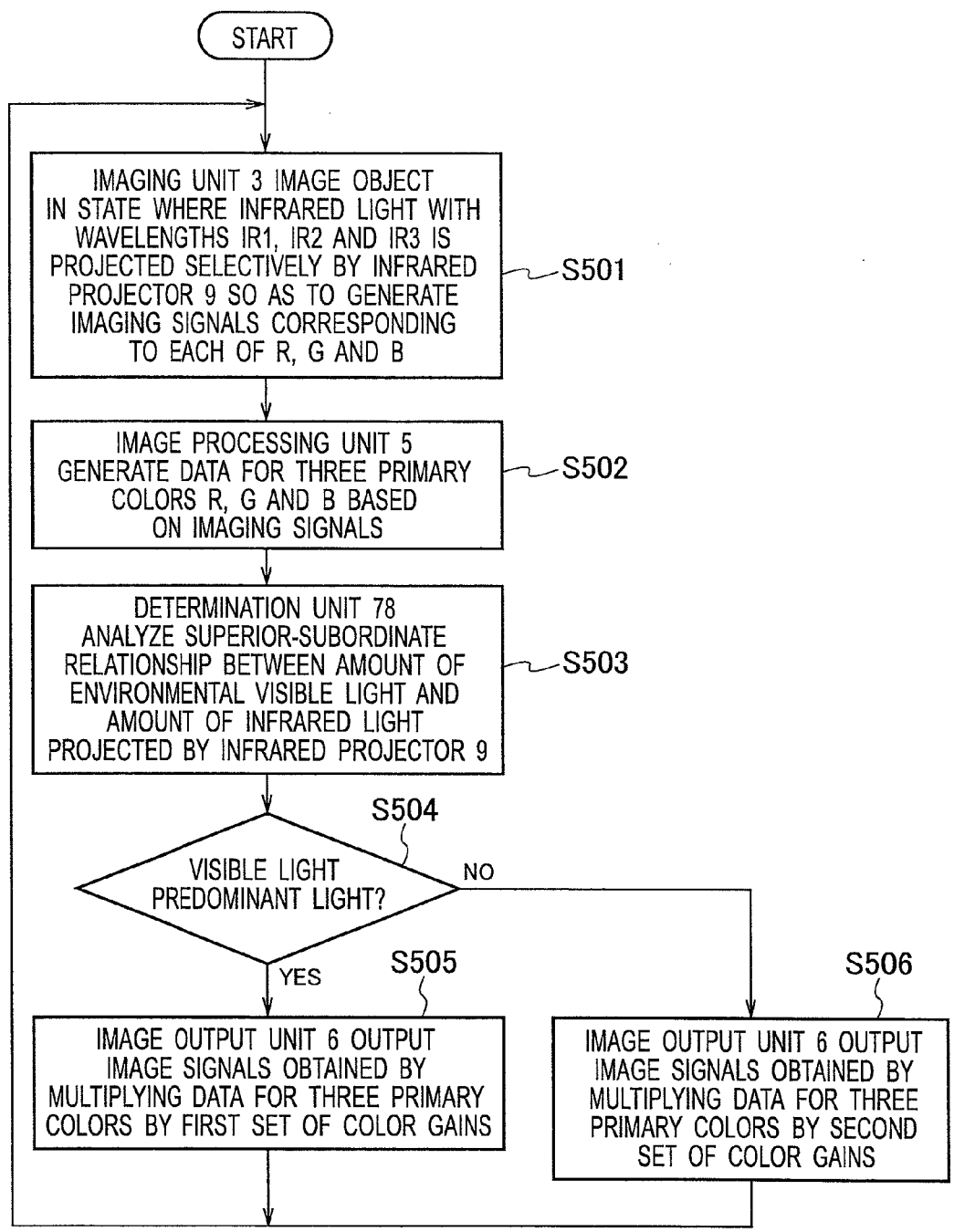
FIG. 43 is a flowchart showing an image signal processing method depending on the determination of the relationship between the respective light amounts.

In FIG. 43, the imaging unit 3 images the object in the state where infrared light with the respective wavelengths IR1, IR2 and IR3 is projected selectively by the infrared projector 9 so as to generate the imaging signals corresponding to each of R, G and B, in step S501.

The image processing unit 5 generates the data for the respective three primary colors R, G and B based on the imaging signals in step S502. The determination unit 78 analyzes the superior-subordinate relationship between the amount of environmental visible light and the amount of infrared light projected by the infrared projector 9, in step S503.

The color gain controller 79 controls the color gain setting unit 62 to select the first set of color gains when the visible light is the predominant light (YES) in step S504. The image output unit 6 thus outputs the image signals in step S505 obtained in such a manner as to multiply the data for the three primary colors by the first set of color gains.

The color gain controller 79 controls the color gain setting unit 62 to select the second set of color gains when the visible light is not the predominant light (NO) in step S504. The image output unit 6 thus outputs the image signals in step S506 obtained in such a manner as to multiply the data for the three primary colors by the second set of color gains.

According to the processing from step S504 to step S506, the imaging device selects one of the several sets of color gains by which the data for the three primary colors is multiplied in accordance with the analyzed superior-subordinate relationship and outputs the image signals obtained in such a manner as to multiply the data for the three primary colors by the selected set of color gains.

When the imaging device is set to the intermediate mode, the procedure of processing from step S501 to step S506 is repeated.

<Image Signal Processing Program for Controlling Operation of Imaging Device Including Determination of Superior-Subordinate Relationship of Light Amounts>

The image signal processing program when the operation of the imaging device including the determination of the superior-subordinate relationship of the light amounts is controlled by the computer program, is explained below with reference to FIG. 44.

Figure 44:
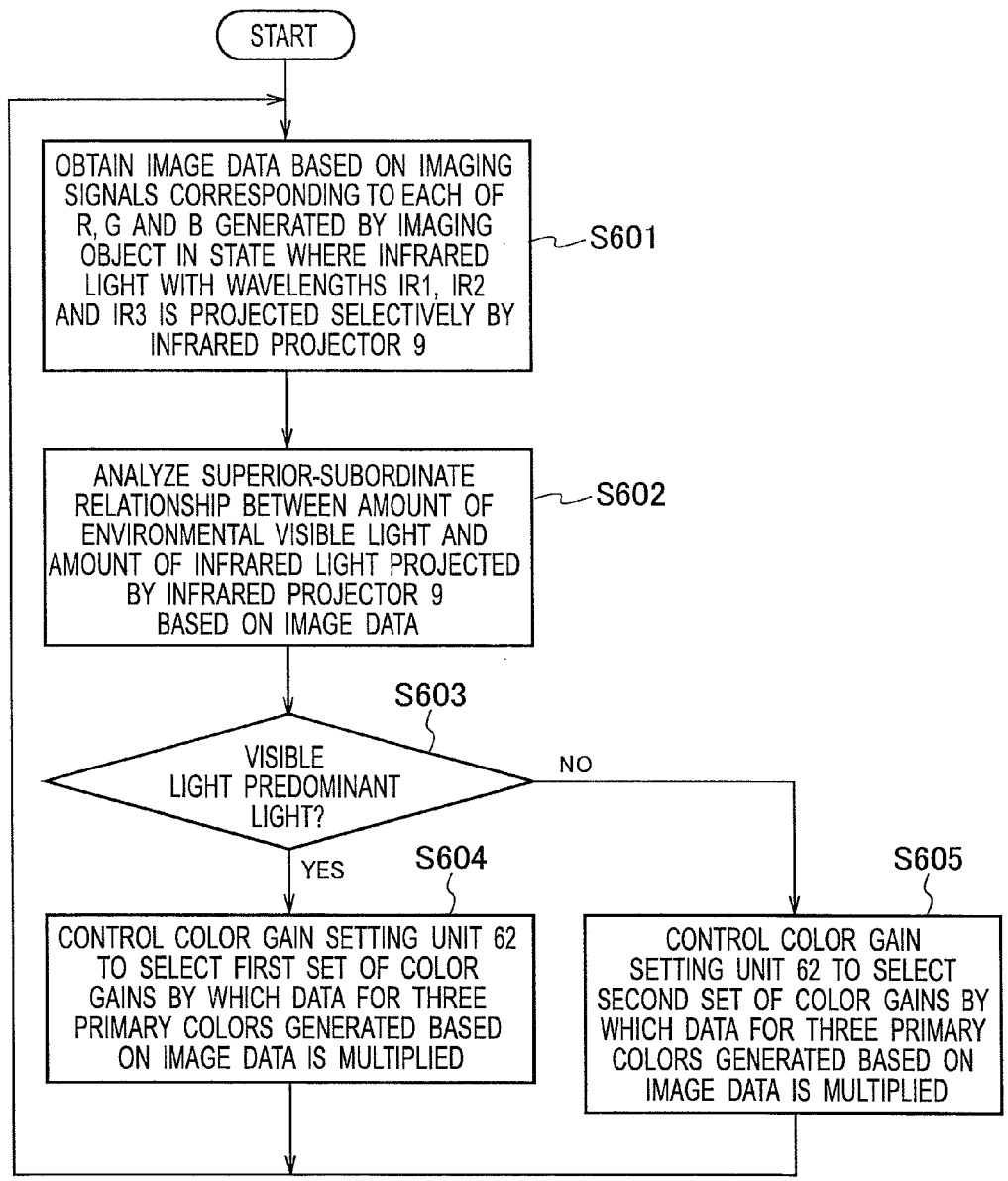
FIG. 44 is a flowchart showing steps of processing executed by a computer directed by an image signal processing program for controlling the operation of the imaging device including the determination of the relationship between the respective light amounts.

In FIG. 44, the image signal processing program directs the computer in step S601 to obtain the image data based on the imaging signals corresponding to each of R, G and B generated by imaging the object in the state where infrared light with the respective wavelengths IR1, IR2 and IR3 is projected selectively by the infrared projector 9.

The image signal processing program directs the computer in step S602 to analyze the relationship between the amount of environmental visible light and the amount of infrared light projected by the infrared projector 9 based on the image data. Although not illustrated in the drawing, the determination results are stored temporarily in the computer.

The image signal processing program directs the computer in step S603 to ascertain the stored determination results.

When the visible light is the predominant light (YES), the image signal processing program directs the computer in step S604 to control the color gain setting unit 62 to select the first set of color gains by which the data for the three primary colors generated based on the image data is multiplied.

When the visible light is not the predominant light (NO), the image signal processing program directs the computer in step S605 to control the color gain setting unit 62 to select the second set of color gains by which the data for the three primary colors generated based on the image data is multiplied.

According to the processing from step S603 to step S605, the image signal processing program controls the color gain setting unit 62 to select one of the several sets of color gains by which the data for the three primary colors is multiplied in accordance with the analyzed superior-subordinate relationship.

When the imaging device is set to the intermediate mode, the image signal processing program directs the computer to repeat the procedure of the processing from step S601 to step S605.

The image signal processing program for controlling the operation of the imaging device including the determination of the superior-subordinate relationship of the light amounts may also be a computer program recorded in a computer readable non-transitory storage medium. The image signal processing program may also be provided in the state of being stored in the storage medium or may be provided via a network.

<Example of Switching Sets of Color Gains>

Figure 45:
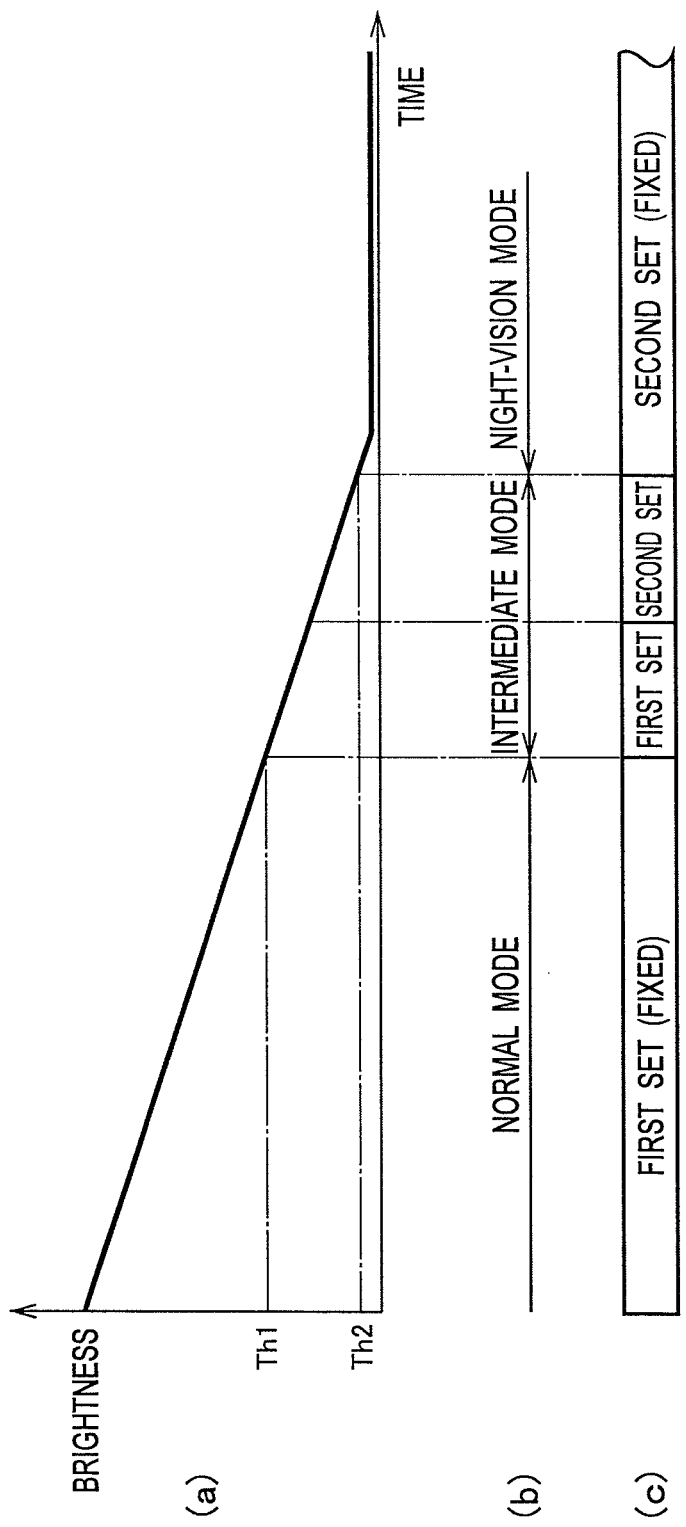
FIG. 45 is a view for explaining sets of color gains that the imaging device of the embodiment uses in the respective modes.

The process of how to switch the sets of color gains used by the color gain setting unit 62 is explained below with reference to FIG. 45. Items (a) and (b) of FIG. 45 are the same as items (a) and (b) of FIG. 22.

In the normal mode, since visible light is the predominant light, the set of color gains used by the color gain setting unit 62 is constantly the first set. In the night-vision mode, since infrared light is the predominant light, the set of color gains used by the color gain setting unit 62 is constantly the second set. The color gain setting unit 62 may select the first or second set depending on the mode switched by the mode switching unit 72.

In the intermediate mode, the first set is selected when the amount of visible light is relatively large, and the second set is selected when the amount of infrared light is relatively large, in accordance with the determination results of the first or second example of the determination method described above.

Therefore, when the mode is switched from the normal mode to the intermediate mode and switched from the intermediate mode to the night-vision mode, the color gain setting unit 62 uses the first set from the normal mode to the middle of the intermediate mode and uses the second set from the middle of the intermediate mode to the night-vision mode.

In item (c) of FIG. 45, the intermediate mode is divided into two periods for convenience of explanation, wherein the first set is assigned to the period toward the normal mode, and the second set is assigned to the period toward the night-vision mode. The timing of switching from the first set to the second set is actually determined depending on the setting conditions of the thresholds Th10 and Th20 or various kinds of other conditions.

The color gain setting unit 62 may hold at least three sets of color gains so that the third set different from the second set used in the intermediate mode is used in the night-vision mode.

As described above, the intermediate mode and the night-vision mode may be switched in accordance with the determination results of the superior-subordinate relationship of the light amounts. The intermediate mode may be selected when visible light is the predominant light as shown in FIG. 33 and FIG. 40, and the night-vision mode may be selected when infrared light is the predominant light as shown in FIG. 34 and FIG. 41.

Here, the state where visible light is the prominent light and infrared light is the subordinate light is not necessarily limited to the state where the amount of visible light is larger than the amount of infrared light. Similarly, the state where infrared light is the prominent light and visible light is the subordinate light is not necessarily limited to the state where the amount of infrared light is larger than the amount of visible light. The relationship between visible light and infrared light is not necessarily analyzed on the basis of a particular ratio of visible light to infrared light. For example, the relationship between visible light and infrared light may be analyzed in such a manner as to obtain image signals generated with higher resolution.

The present invention is not limited to the present embodiment described above, and various modifications and improvements can be made without departing from the scope of the present invention. For example, the imaging device shown in FIG. 1 may include the infrared projector 9 detachably from the casing of the imaging device. The infrared projector 9 may be an external component outside of the imaging device. The imaging device is only required to have a configuration capable of controlling the infrared projector 9 when the infrared projector 9 is attached thereto.

The relationship between visible light and infrared light may be analyzed based on the measurement results of the light amounts. The determination of the superior-subordinate relationship by the determination unit 78 includes the case based on the measurement results of the light amounts. The determination of the superior-subordinate relationship based on the image signals described above tends to easily reflect the relationship between visible light and infrared light in the vicinity of an object to be imaged. Therefore, the determination of the superior-subordinate relationship based on the image signals is better than the determination of the superior-subordinate relationship based on the measurement results of the light amounts.

The controller 7 may change various types of parameters according to the relationship between the amount of environmental visible light and the amount of infrared light. The present embodiment is applicable to the technique of changing various types of parameters, without being limited to the color gains, used for image processing of imaging signals imaged by the imaging unit 3.

The controller 7 may switch imaging modes of various types according to the relationship between the amount of environmental visible light and the amount of infrared light. The present embodiment is applicable to the technique of control of switching various known imaging modes without being limited to the intermediate mode or the night-vision mode. The present embodiment is applicable to other imaging techniques using infrared light.

The controller 7 and the image processing unit 5 may be composed of a processor (CPU) including one or more hardware components. The use of hardware or software is optional. The imaging device may only include hardware, or part of the imaging device may be composed of software.

As described above, the imaging device according to the embodiment can capture fine color images even in a state where visible light and infrared light for night-vision imaging coexist. The image processing device, the image signal processing method and the image signal processing program according to the embodiment can generate fine color image signals based on images captured even in the state where visible light and infrared light for night-vision imaging coexist.

What is claimed is:

1. An imaging device comprising:
    an imaging unit including a color filter in which filter elements of three primary colors of red, green, and blue are arranged with a predetermined array in a plane thereof, the imaging unit being configured to generate a first frame of an image signal by capturing an object in a state where a first infrared light having a first wavelength assigned to the red is projected, to generate a second frame of an image signal by capturing the object in a state where a second infrared light having a second wavelength assigned to the green is projected, and to generate a third frame of an image signal by capturing the object in a state where a third infrared light having a third wavelength assigned to the blue is projected;
    a same-position pixel adding unit configured to add pixel data for the red located at common pixel positions in the respective first to third frames to each other so as to generate a first added pixel data for the red, in such a manner that pixel data for the red in the first to third frames are respectively multiplied by first to third coefficients, the first coefficient being greater than the second and third coefficients, to add pixel data for the green located at common pixel positions in the respective first to third frames to each other so as to generate a second added pixel data for the green, in such a manner that pixel data for the green in the first to third frames are respectively multiplied by fourth to sixth coefficients, the fifth coefficient being greater than the fourth and sixth coefficients, and to add pixel data for the blue located at common pixel positions in the respective first to third frames to each other so as to generate a third added pixel data for the blue, in such a manner that pixel data for the blue in the first to third frames are respectively multiplied by seventh to ninth coefficients, the ninth coefficient being greater than the seventh and eight coefficients;
    a synthesizing unit configured to arrange pixel data for the three primary colors including the first added pixel data, the second added pixel data, and the third added pixel data generated by the same-position pixel adding unit in such a manner as to have an array identical to the array of the filter elements in the color filter so as to generate a synthesized image signal synthesized in one frame; and
    a demosaicing unit configured to execute, based on the frame of the synthesized image signal generated by the synthesizing unit, demosaicing for generating a frame of the red in such a manner as to interpolate pixel data for the red in a pixel position where the pixel data for the red is not present, generating a frame of the green in such a manner as to interpolate pixel data for the green in a pixel position where the pixel data for the green is not present and generating a frame of the blue in such a manner as to interpolate pixel data for the blue in a pixel position where the pixel data for the blue is not present, so as to generate frames of the three primary colors.

2. The imaging device according to claim 1, further comprising a surrounding pixel adding unit configured to add surrounding pixel data to pixel data in each pixel position in each of the first to third frames so as to generate fourth added pixel data in which the surrounding pixel data is added to the pixel data for the red, fifth added pixel data in which the surrounding pixel data is added to the pixel data for the green and sixth added pixel data in which the surrounding pixel data is added to the pixel data for the blue,
    wherein the same-position pixel adding unit adds each of the fourth to sixth added pixel data located at common pixel positions in the respective first to third frames to each other so as to generate the first to third added pixel data.

3. The imaging device according to claim 2, further comprising a mode switching unit configured to switch between a mode in which the surrounding pixel adding unit is inactivated and a mode in which the surrounding pixel adding unit is activated depending on environmental brightness when the object is captured.

4. The imaging device according to claim 2, further comprising:
    a projection controller configured to control an ON/OFF state of projection of the first to third infrared lights so that the imaging unit captures the object in a state where the first to third infrared lights are not projected when environmental brightness is equal to or greater than a first threshold and captures the object in a state where the first to third infrared lights are projected when the environmental brightness is less than the first threshold; and
    a mode switching unit configured to switch between a mode in which the synthesizing unit is inactivated when the environmental brightness is equal to or greater than the first threshold so that the demosaicing unit executes the demosaicing for generating the frame of the red, the frame of the green and the frame of the blue based on a frame of an image signal generated when the imaging unit captures the object in the state where the first to third infrared lights are not projected, and a mode in which the synthesizing unit is activated when the environmental brightness is less than the first threshold so that the demosaicing unit executes the demosaicing for generating the frame of the red, the frame of the green and the frame of the blue based on the frame of the synthesized image signal generated by the synthesizing unit.

5. The imaging unit according to claim 4, wherein the mode switching unit further switches between a mode in which the surrounding pixel adding unit is inactivated when the environmental brightness is less than the first threshold and equal to or greater than a second threshold, and a mode in which the surrounding pixel adding unit is activated when the environmental brightness is less than the second threshold.

6. An image signal processing method comprising:
by an imaging unit including a color filter in which filter elements of three primary colors of red, green, and blue are arranged with a predetermined array in a plane thereof, generating a first frame of an image signal by capturing an object in a state where a first infrared light having a first wavelength assigned to the red is projected;
generating, by the imaging unit, a second frame of an image signal by capturing the object in a state where a second infrared light having a second wavelength assigned to the green is projected;
generating, by the imaging unit, a third frame of an image signal by capturing the object in a state where a third infrared light having a third wavelength assigned to the blue is projected;
adding pixel data for the red located at common pixel positions in the respective first to third frames to each other so as to generate a first added pixel data for the red, in such a manner that pixel data for the red in the first to third frames are respectively multiplied by first to third coefficients, the first coefficient being greater than the second and third coefficients, adding pixel data for the green located at common pixel positions in the respective first to third frames to each other so as to generate a second added pixel data for the green, in such a manner that pixel data for the green in the first to third frames are respectively multiplied by fourth to sixth coefficients, the fifth coefficient being greater than the fourth and sixth coefficients, and adding pixel data for the blue located at common pixel positions in the respective first to third frames to each other so as to generate a third added pixel data for the blue, in such a manner that pixel data for the blue in the first to third frames are respectively multiplied by seventh to ninth coefficients, the ninth coefficient being greater than the seventh and eight coefficients;
arranging pixel data for the three primary colors including the first added pixel data, the second added pixel data and the third added pixel data in such a manner as to have an array identical to the array of the filter elements in the color filter so as to generate a synthesized image signal synthesized in one frame; and
executing, based on the frame of the synthesized image signal, demosaicing for generating a frame of the red in such a manner as to interpolate pixel data for the red in a pixel position where the pixel data for the red is not present, generating a frame of the green in such a manner as to interpolate pixel data for the green in a pixel position where the pixel data for the green is not present and generating a frame of the blue in such a manner as to interpolate pixel data for the blue in a pixel position where the pixel data for the blue is not present, so as to generate frames of the three primary colors.

7. An image signal processing program recorded stored in a non-transitory storage medium comprising instructions executable by a computer to implement the steps of:
obtaining pixel data composing a first frame of an image signal generated, by an imaging unit including a color filter in which filter elements of three primary colors of red, green, and blue are arranged with a predetermined array in a plane thereof, by capturing an object in a state where a first infrared light having a first wavelength assigned to the red is projected;
obtaining pixel data composing a second frame of an image signal generated by capturing the object by the imaging unit in a state where a second infrared light having a second wavelength assigned to the green is projected;
obtaining pixel data composing a third frame of an image signal generated by capturing the object by the imaging unit in a state where a third infrared light having a third wavelength assigned to the blue is projected;
adding pixel data for the red located at common pixel positions in the respective first to third frames to each other so as to generate a first added pixel data for the red, in such a manner that pixel data for the red in the first to third frames are respectively multiplied by first to third coefficients, the first coefficient being greater than the second and third coefficients, adding pixel data for the green located at common pixel positions in the respective first to third frames to each other so as to generate a second added pixel data for the green, in such a manner that pixel data for the green in the first to third frames are respectively multiplied by fourth to sixth coefficients, the fifth coefficient being greater than the fourth and sixth coefficients, and adding pixel data for the blue located at common pixel positions in the respective first to third frames to each other so as to generate a third added pixel data for the blue, in such a manner that pixel data for the blue in the first to third frames are respectively multiplied by seventh to ninth coefficients, the ninth coefficient being greater than the seventh and eight coefficients;
arranging pixel data for the three primary colors including the first added pixel data, the second added pixel data and the third added pixel data in such a manner as to have an array identical to the array of the filter elements in the color filter so as to generate a synthesized image signal synthesized in one frame; and
executing, based on the frame of the synthesized image signal, demosaicing for generating a frame of the red in such a manner as to interpolate pixel data for the red in a pixel position where the pixel data for the red is not present, generating a frame of the green in such a manner as to interpolate pixel data for the green in a pixel position where the pixel data for the green is not present and generating a frame of the blue in such a manner as to interpolate pixel data for the blue in a pixel position where the pixel data for the blue is not present, so as to generate frames of the three primary colors.

* * * * *